(12) United States Patent
Nakashima et al.

(10) Patent No.: US 9,131,481 B2
(45) Date of Patent: Sep. 8, 2015

(54) MOBILE STATION APPARATUS, COMMUNICATION SYSTEM, COMMUNICATION METHOD, AND INTEGRATED CIRCUIT

(75) Inventors: Daiichiro Nakashima, Osaka (JP); Shoichi Suzuki, Osaka (JP); Tatsushi Aiba, Osaka (JP); Wataru Ouchi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 187 days.

(21) Appl. No.: 13/819,423

(22) PCT Filed: Sep. 16, 2011

(86) PCT No.: PCT/JP2011/071269
§ 371 (c)(1),
(2), (4) Date: Mar. 20, 2013

(87) PCT Pub. No.: WO2012/036289
PCT Pub. Date: Mar. 22, 2012

(65) Prior Publication Data
US 2013/0188589 A1    Jul. 25, 2013

(30) Foreign Application Priority Data

Sep. 17, 2010  (JP) .................................. 2010-209173

(51) Int. Cl.
*H04L 5/00*       (2006.01)
*H04W 72/04*   (2009.01)
(Continued)

(52) U.S. Cl.
CPC ......... *H04W 72/0406* (2013.01); *H04B 7/0404* (2013.01); *H04L 1/00* (2013.01);
(Continued)

(58) Field of Classification Search
None
See application file for complete search history.

(56) References Cited

U.S. PATENT DOCUMENTS

2010/0296389 A1* 11/2010 Khandekar et al. ........... 370/216
2010/0331037 A1* 12/2010 Jen ................................ 455/522
(Continued)

OTHER PUBLICATIONS

3GPP,"3rd Generation Partnership Project; Technical Specification Group Radio Access Network; Feasibility study for Further Advancements for E-UTRA (LTE-Advanced) (Release 9)", 3GPP TR 36.912 V9.3.0 (Jun. 2010), pp. 1-61.
Huawei,"Multiple antenna for PUCCH", 3GPP TSG RAN WG1 #59bis R1-100260, Aug. 23, 2010, pp. 1-4.
International Search Report for PCT/JP2011/071269 mailed on Nov. 8, 2011.
(Continued)

*Primary Examiner* — Michael J Moore, Jr.
*Assistant Examiner* — Ayanah George
(74) *Attorney, Agent, or Firm* — Birch, Stewart, Kolasch & Birch, LLP

(57) ABSTRACT

A mobile station apparatus controls the transmission method of uplink signals to efficiently transmit uplink control information, while avoiding increase of overhead of the control information. The mobile station apparatus has a reception processing unit 401 which performs detection processing of a physical downlink control channel in a plurality of cells, an uplink control information generating unit 4051 which generates a reception confirmation response to data of one or more physical downlink shared channels for which assignment of a resource is indicated by downlink control information included in one or more physical downlink control channels detected in a same subframe by the reception processing unit 401, a control unit 405 which controls application of transmission diversity to a physical uplink control channel according to a situation of a cell in which the physical downlink shared channel has been detected by the reception processing unit 401, and a transmission processing unit 407 which transmits the reception confirmation response generated in the uplink control information generating unit according to a control result of the control unit 405, using the physical uplink control channel.

6 Claims, 18 Drawing Sheets

(51) Int. Cl.
  *H04B 7/04* (2006.01)
  *H04L 1/00* (2006.01)
  *H04L 27/26* (2006.01)
  *H04W 28/06* (2009.01)

(52) U.S. Cl.
  CPC ........... *H04L 5/0035* (2013.01); *H04L 5/0055* (2013.01); *H04L 27/2626* (2013.01); *H04L 27/2647* (2013.01); *H04W 28/06* (2013.01); *H04W 72/04* (2013.01)

(56) References Cited

U.S. PATENT DOCUMENTS

2011/0235599 A1* 9/2011 Nam et al. .................... 370/329
2012/0039280 A1* 2/2012 Chen et al. .................... 370/329

OTHER PUBLICATIONS

LG Electronics et al.,"Way Forward for PUCCH Transmit Diversity Scheme", 3GPP TSG RAN WG1 #58 R1-093704, Aug. 23, 2009, pp. 1-2.
LG Electronics,"Resource Allocation for SORTD", 3GPP TSG RAN WG1 #62 R1-104760, Aug. 23, 2010, pp. 1-6.
NTT DOCOMO et al.,"PUCCH A/N formats for Rel-10", 3GPP TSG RAN WG1 Meeting #62 R1-105016, Aug. 23, 2010, p. 1.
Panasonic,"Discussion on the application of SORTD for PUCCH", 3GPP TSG RAN WG1 Meeting #58 R1-093471, Aug. 24, 2009, pp. 1-3.
Samsung et al.,"Way Forward on PUCCH Resource Allocation", 3GPP TSG RAN WG1 Meeting #62 R1-105040, Aug. 23, 2010, pp. 1-2.

* cited by examiner

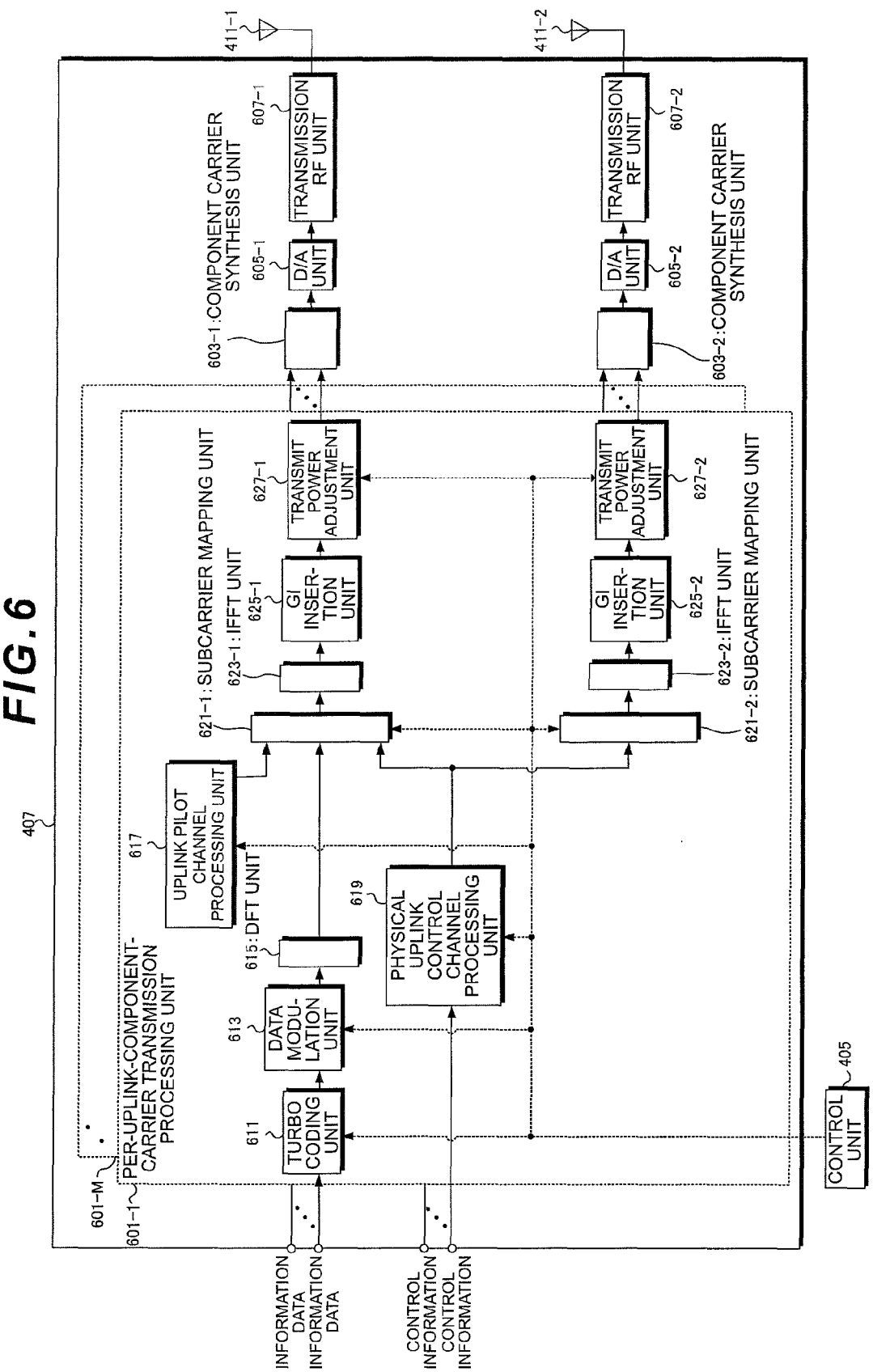

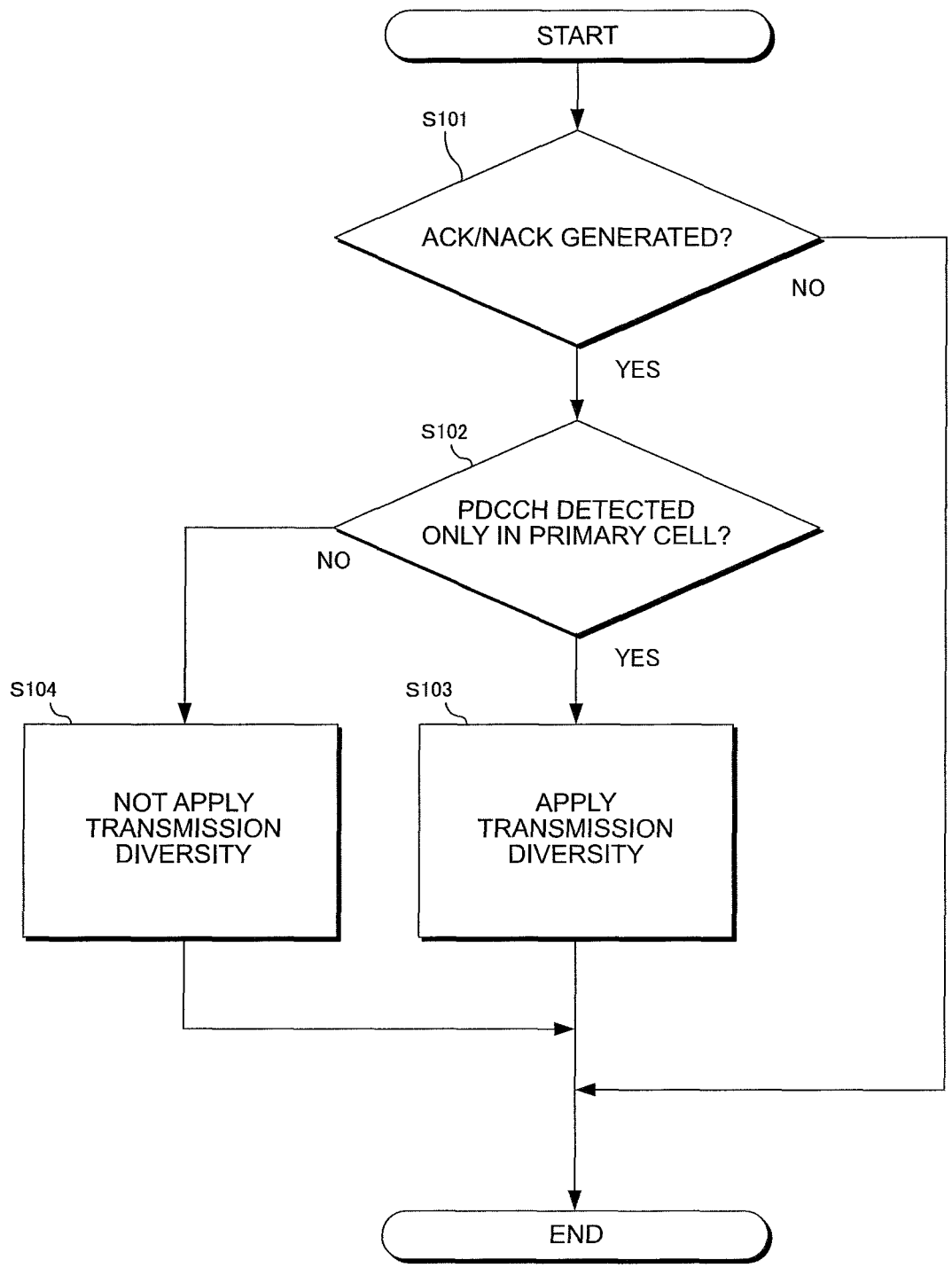

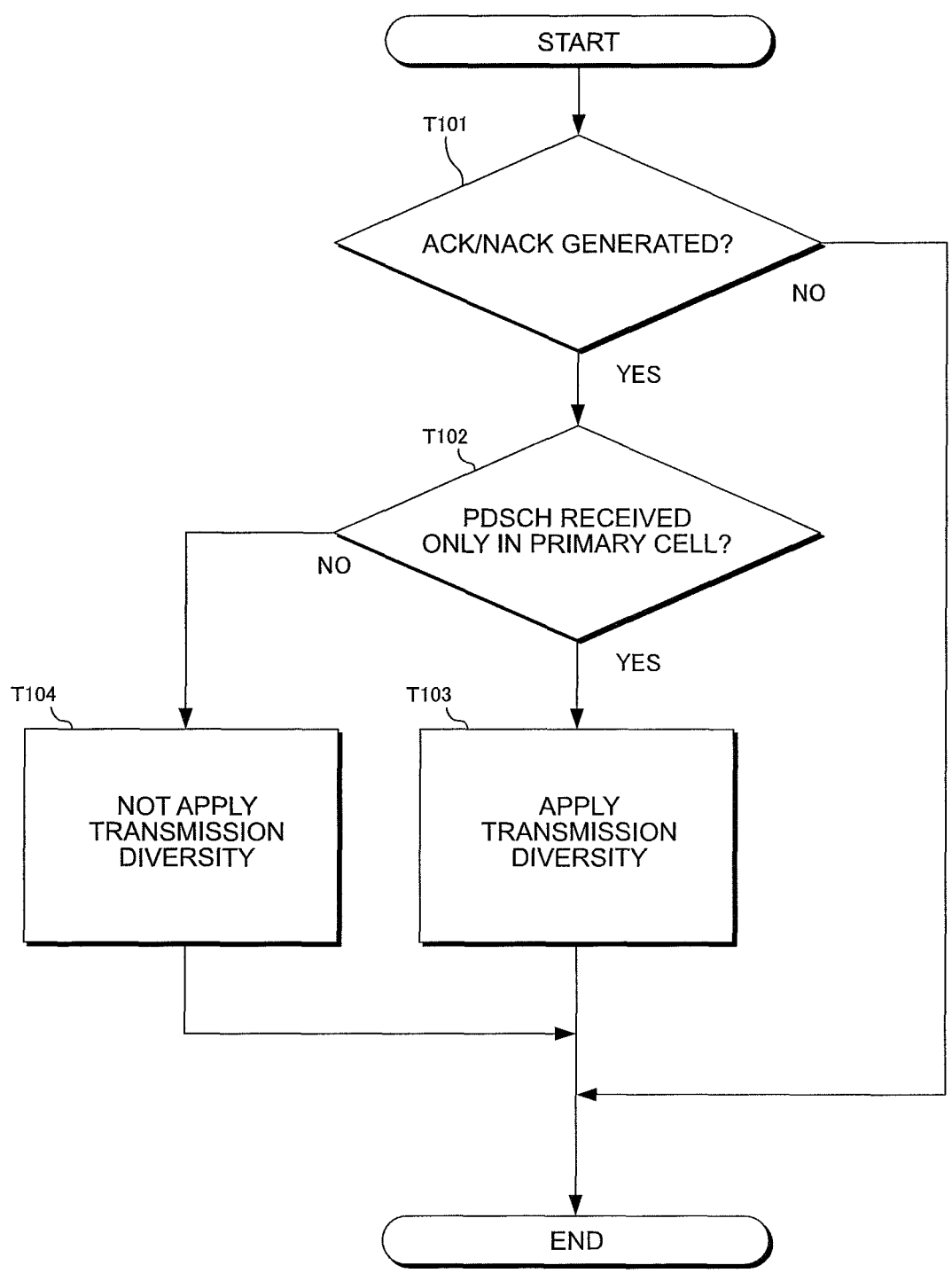

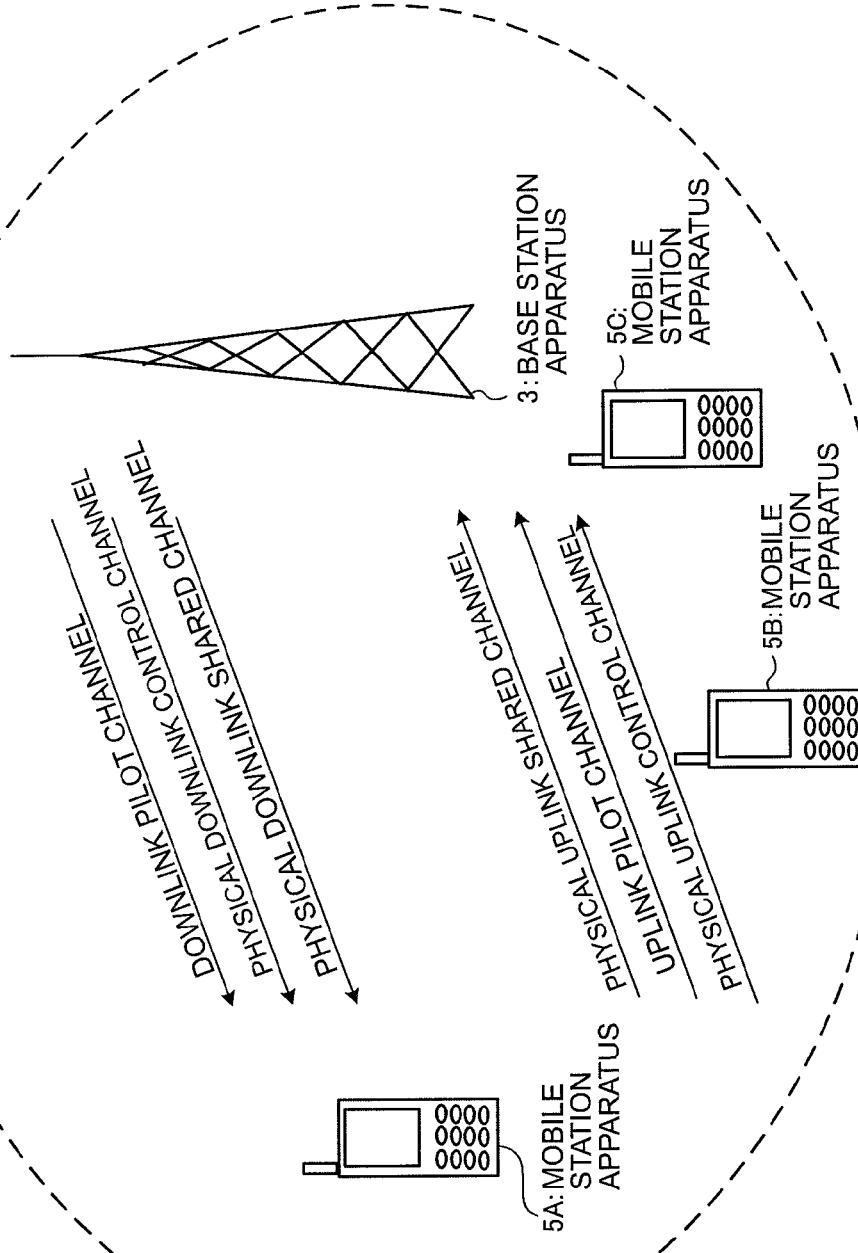

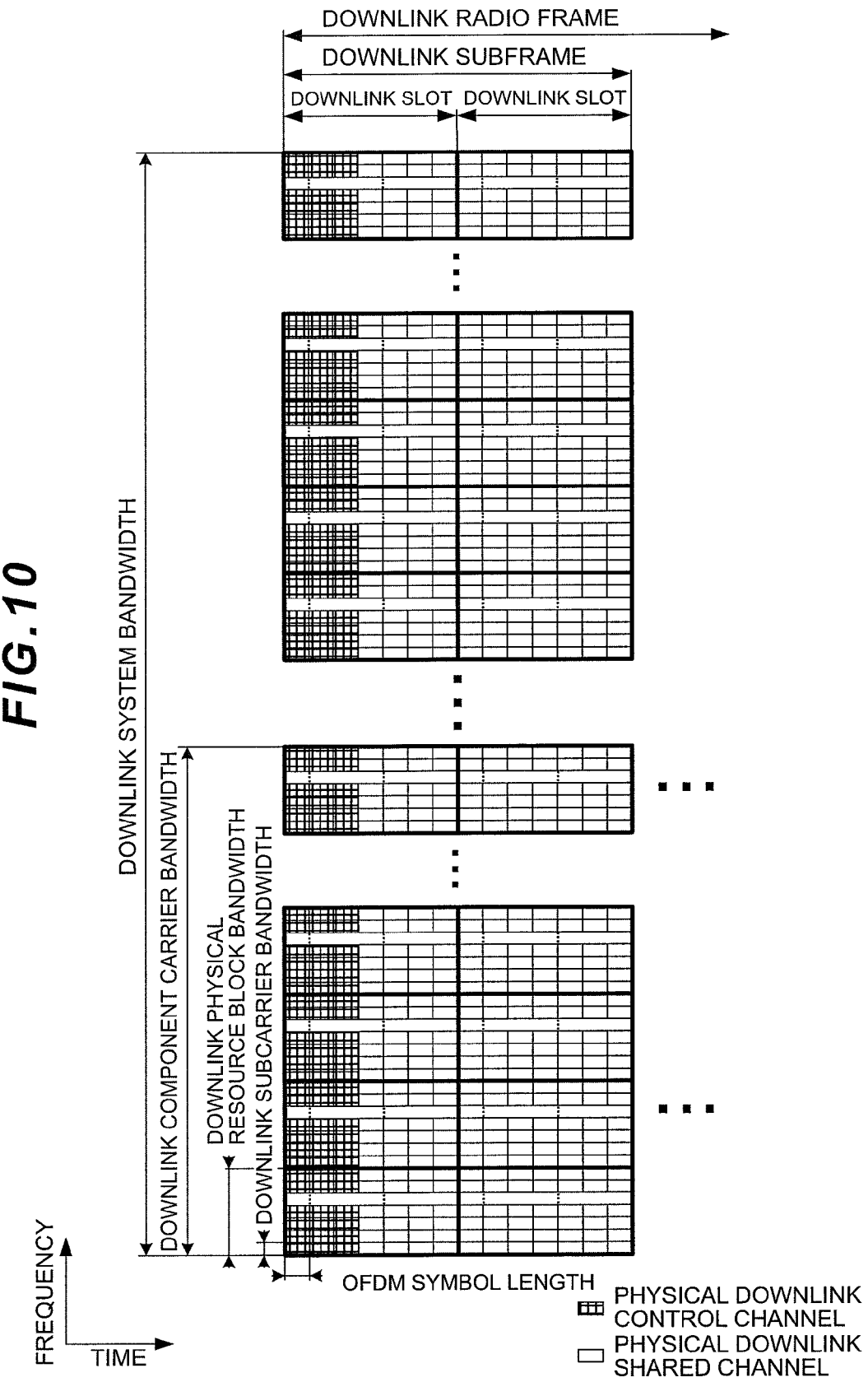

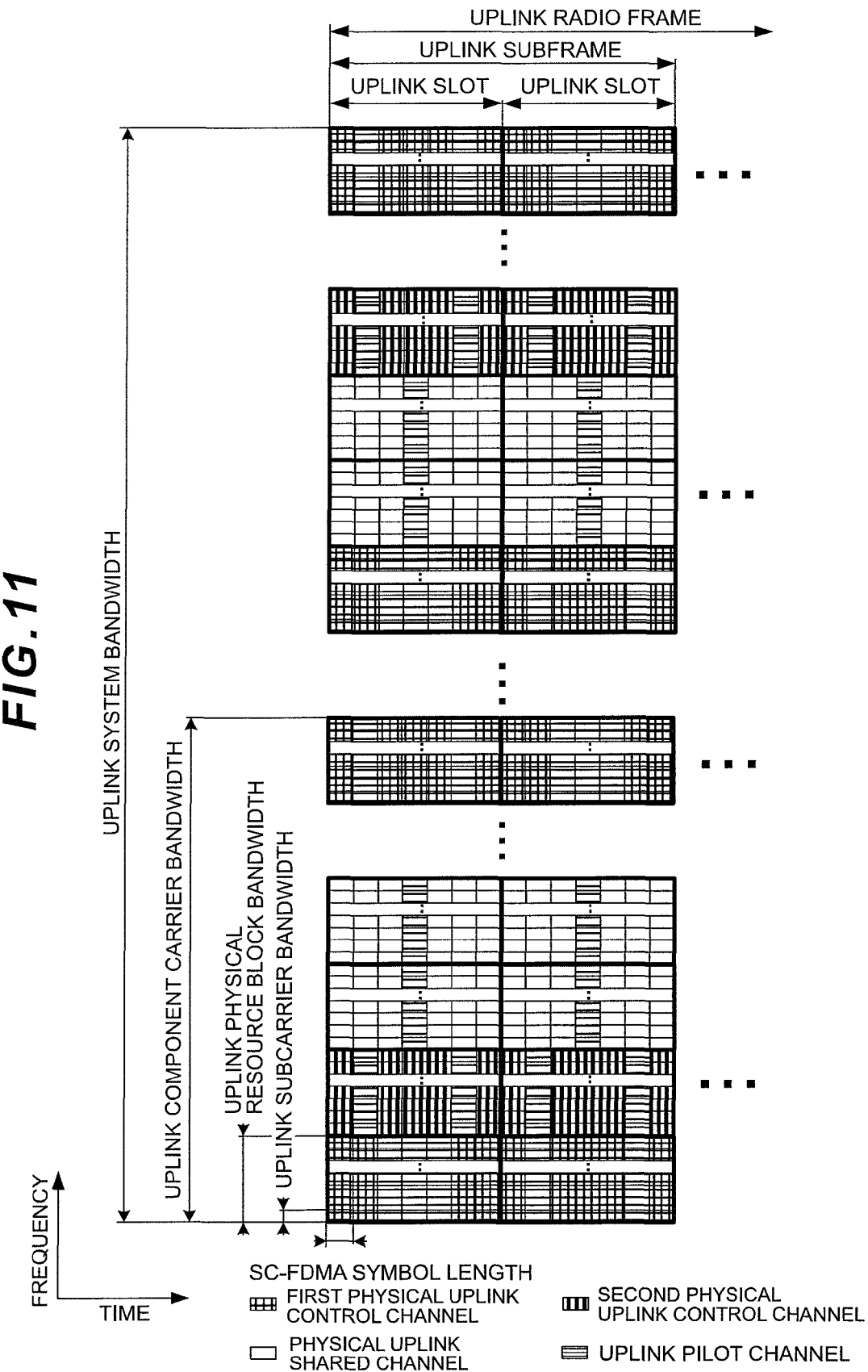

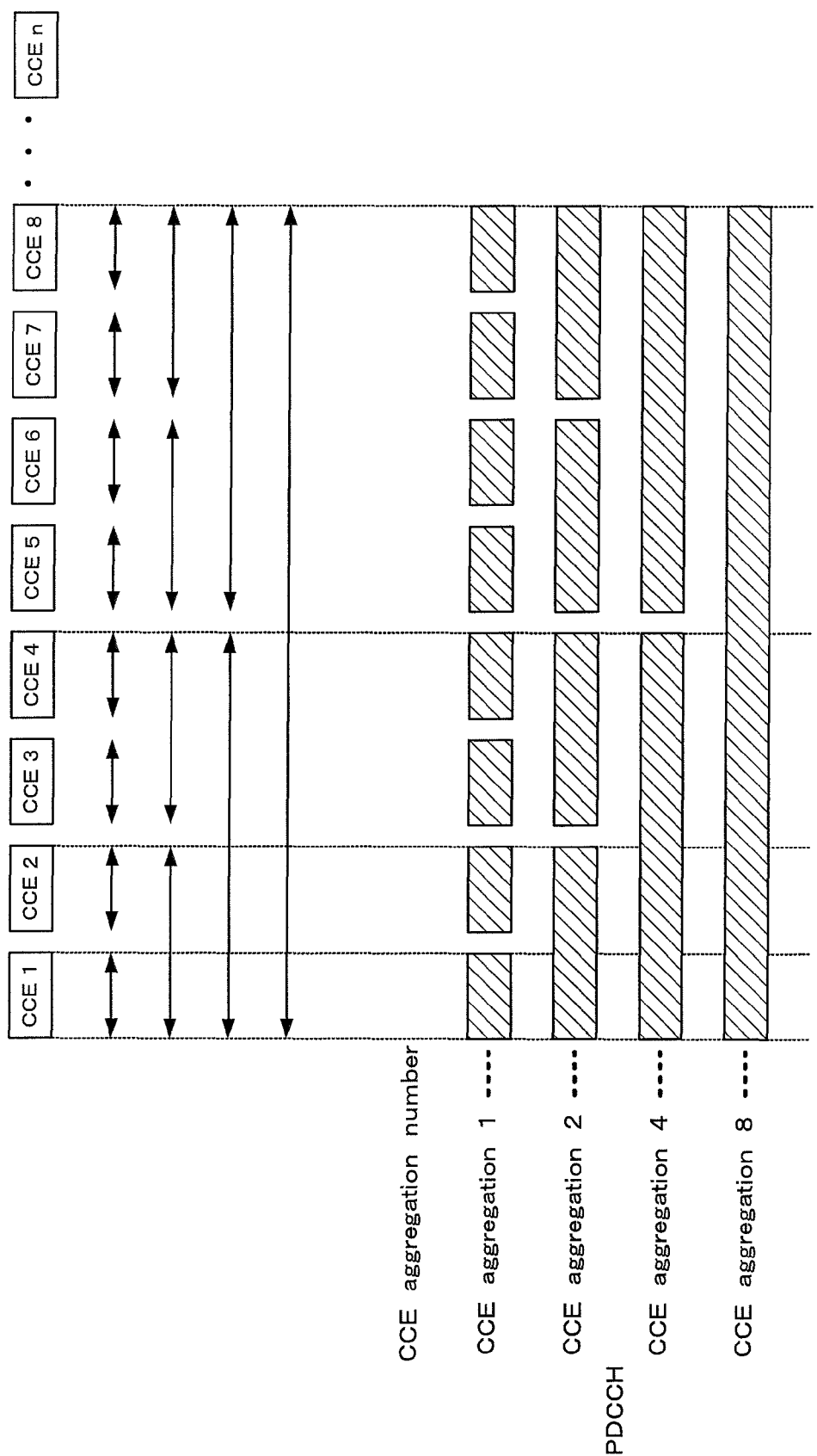

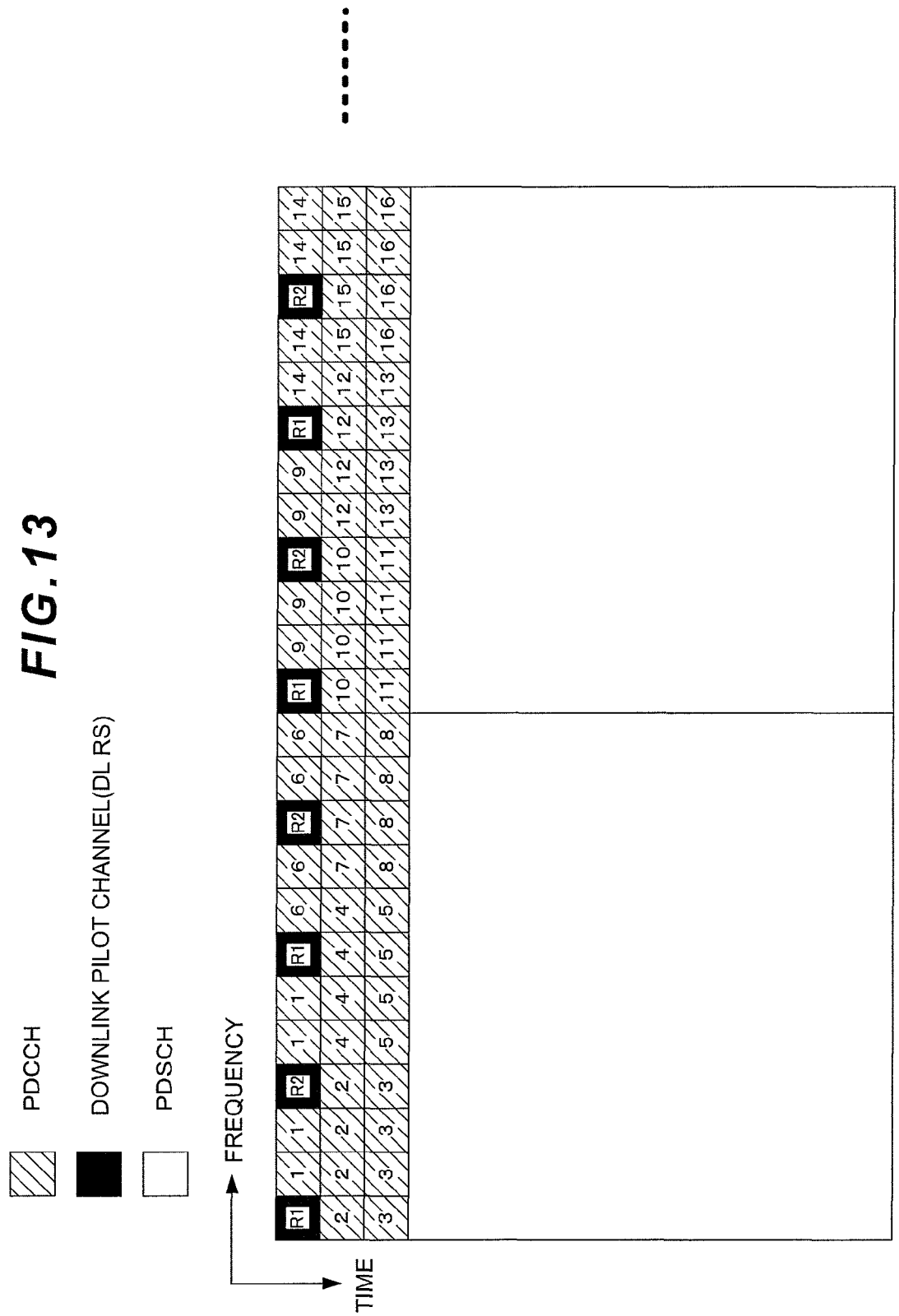

FIG.14

| PUCCH 1 | PRB pair 1 | FREQUENCY DOMAIN CODE 1 | TIME DOMAIN CODE 1 |
|---|---|---|---|
| PUCCH 2 | PRB pair 1 | FREQUENCY DOMAIN CODE 1 | TIME DOMAIN CODE 2 |
| PUCCH 3 | PRB pair 1 | FREQUENCY DOMAIN CODE 1 | TIME DOMAIN CODE 3 |
| PUCCH 4 | PRB pair 1 | FREQUENCY DOMAIN CODE 2 | TIME DOMAIN CODE 1 |
| PUCCH 5 | PRB pair 1 | FREQUENCY DOMAIN CODE 2 | TIME DOMAIN CODE 2 |
| PUCCH 6 | PRB pair 1 | FREQUENCY DOMAIN CODE 2 | TIME DOMAIN CODE 3 |
| PUCCH 7 | PRB pair 1 | FREQUENCY DOMAIN CODE 3 | TIME DOMAIN CODE 1 |
| PUCCH 8 | PRB pair 1 | FREQUENCY DOMAIN CODE 3 | TIME DOMAIN CODE 2 |
| PUCCH 9 | PRB pair 1 | FREQUENCY DOMAIN CODE 3 | TIME DOMAIN CODE 3 |
| PUCCH 10 | PRB pair 1 | FREQUENCY DOMAIN CODE 4 | TIME DOMAIN CODE 1 |
| PUCCH 11 | PRB pair 1 | FREQUENCY DOMAIN CODE 4 | TIME DOMAIN CODE 2 |
| PUCCH 12 | PRB pair 1 | FREQUENCY DOMAIN CODE 4 | TIME DOMAIN CODE 3 |
| PUCCH 13 | PRB pair 2 | FREQUENCY DOMAIN CODE 1 | TIME DOMAIN CODE 1 |
| PUCCH 14 | PRB pair 2 | FREQUENCY DOMAIN CODE 1 | TIME DOMAIN CODE 2 |
| PUCCH 15 | PRB pair 2 | FREQUENCY DOMAIN CODE 1 | TIME DOMAIN CODE 3 |
| PUCCH 16 | PRB pair 2 | FREQUENCY DOMAIN CODE 2 | TIME DOMAIN CODE 1 |
| PUCCH 17 | PRB pair 2 | FREQUENCY DOMAIN CODE 2 | TIME DOMAIN CODE 2 |
| PUCCH 18 | PRB pair 2 | FREQUENCY DOMAIN CODE 2 | TIME DOMAIN CODE 3 |
| PUCCH 19 | PRB pair 2 | FREQUENCY DOMAIN CODE 3 | TIME DOMAIN CODE 1 |
| PUCCH 20 | PRB pair 2 | FREQUENCY DOMAIN CODE 3 | TIME DOMAIN CODE 2 |
| PUCCH 21 | PRB pair 2 | FREQUENCY DOMAIN CODE 3 | TIME DOMAIN CODE 3 |
| PUCCH 22 | PRB pair 2 | FREQUENCY DOMAIN CODE 4 | TIME DOMAIN CODE 1 |
| PUCCH 23 | PRB pair 2 | FREQUENCY DOMAIN CODE 4 | TIME DOMAIN CODE 2 |
| PUCCH 24 | PRB pair 2 | FREQUENCY DOMAIN CODE 4 | TIME DOMAIN CODE 3 |

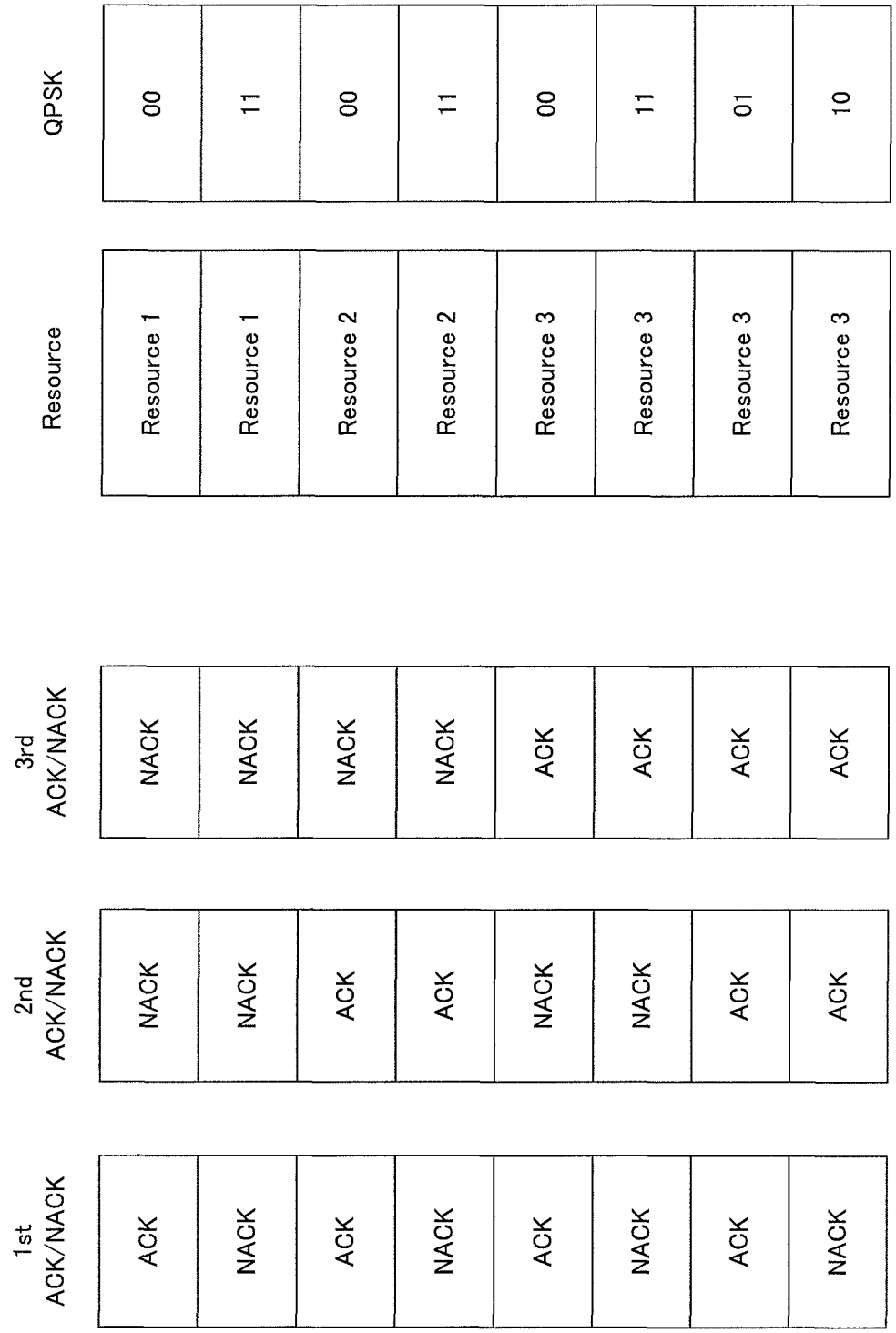

FIG.18

| 1st ACK/NACK | 2nd ACK/NACK | 3rd ACK/NACK | 4th ACK/NACK | Resource | QPSK |
|---|---|---|---|---|---|
| ACK | NACK | NACK | NACK | Resource 1 | 00 |
| NACK | NACK | NACK | NACK | Resource 1 | 11 |
| ACK | NACK | ACK | ACK | Resource 1 | 01 |
| ACK | ACK | ACK | NACK | Resource 1 | 10 |
| ACK | ACK | NACK | NACK | Resource 2 | 00 |
| NACK | ACK | NACK | NACK | Resource 2 | 11 |
| ACK | ACK | ACK | ACK | Resource 2 | 01 |
| NACK | ACK | ACK | ACK | Resource 2 | 10 |
| ACK | NACK | ACK | NACK | Resource 3 | 00 |
| NACK | NACK | ACK | NACK | Resource 3 | 11 |
| NACK | NACK | ACK | ACK | Resource 3 | 01 |
| NACK | ACK | ACK | NACK | Resource 3 | 10 |
| ACK | NACK | NACK | ACK | Resource 4 | 00 |
| NACK | NACK | NACK | ACK | Resource 4 | 11 |
| ACK | ACK | NACK | ACK | Resource 4 | 01 |
| NACK | ACK | NACK | ACK | Resource 4 | 10 |

MOBILE STATION APPARATUS, COMMUNICATION SYSTEM, COMMUNICATION METHOD, AND INTEGRATED CIRCUIT

TECHNICAL FIELD

The present invention relates to a mobile station apparatus, a communication system, a communication method, and an integrated circuit which, in a communication system including a plurality of mobile station apparatuses and a base station apparatus, controls a transmission method of uplink signals to allow the mobile station apparatuses to transmit signals suitable for the base station apparatus.

BACKGROUND ART

Specifications for evolution of radio access methods and radio networks of cellular mobile communication (referred to as "Long Term Evolution (LTE)", or "Evolved Universal Terrestrial Radio Access (EUTRA)" in the following) and are prepared in the 3rd Generation Partnership Project (3GPP). In LTE, Orthogonal Frequency Division Multiplexing (OFDM) method, which is multi-carrier transmission, is used as a communication method for radio communication from a base station apparatus to a mobile station apparatus (referred to as downlink; DL). Additionally, in LTE, Single-Carrier Frequency Division Multiple Access (SC-FDMA) method, which is single-carrier transmission, is used as a communication method for radio communication from a mobile station apparatus to a base station apparatus (referred to as uplink; UL). In LTE, Discrete Fourier Transform-Spread OFDM (DFT-Spread OFDM) method is used as SC-FDMA method.

In 3GPP, a radio access method and a radio network which realize much faster data communication using a wider frequency band than LTE (referred to as "Long Term Evolution-Advanced (LTE-A)" or "Advanced Evolved Universal Terrestrial Radio Access (A-EUTRA)" is under consideration. LTE-A is required to realize backward compatibility with LTE. It is required for LTE-A to allow an LTE-A-compatible base station apparatus to simultaneously communicate with both an LTE-A-compatible mobile station apparatus and an LTE-compatible mobile station apparatus, and for an LTE-A-compatible mobile station apparatus to communicate with an LTE-A-compatible base station apparatus and an LTE-compatible base station apparatus. In order to realize the requirement, in LTE-A, it is considered to support at least a channel structure which is identical to that of LTE. A channel implies a medium used for transmission of a signal, and there are, as types of channels, a Physical Downlink Shared CHannel (PDSCH) used for transmitting and receiving downlink data and control information, a Physical Downlink Control CHannel (PDCCH) used for transmitting and receiving downlink control information, a Physical Uplink Shared CHannel (PUSCH) used for transmitting and receiving uplink data and control information, a Physical Uplink Control CHannel (PUCCH) used for transmitting and receiving uplink control information, a Synchronization CHannel (SCH) used for establishing downlink synchronization, a Physical Random Access CHannel (PRACH) used for establishing uplink synchronization), and a Physical Broadcast CHannel (PBCH) used for transmitting downlink system information. The mobile station apparatus or the base station apparatus allocates, onto respective channels, signals generated from control information, data or the like, and transmits them.

The control information allocated to the physical uplink control channel is referred to as an Uplink Control Information (UCI). The uplink control information includes control information (ACK/NACK) indicating Acknowledgement (ACK) or Negative Acknowledgement (NACK) for the data allocated in the received physical downlink shared channel, control information (Scheduling Request: SR) indicating an assignment request of an uplink resource, or control information (Channel Quality Indicator: CQI) indicating downlink reception quality (also referred to as channel quality).

In LTE-A, a technique (also referred to as Spectrum aggregation, Carrier aggregation, Frequency aggregation, etc.) which uses a plurality of frequency bands having a channel structure which is identical to that of LTE (referred to as "Component Carrier: CC" in the following. Also referred to as element frequency band.) as a single frequency band (wide frequency band) is under consideration. Specifically, in communication using Carrier aggregation, a downlink channel is transmitted and received for each downlink CC (referred to as downlink component carrier; DL CC in the following), and an uplink channel is transmitted and received for each uplink CC (referred to as uplink component carrier; UL CC in the following). In other words, Carrier aggregation is a technique by which a base station apparatus and a mobile station apparatus transmit and receive signals simultaneously via a plurality of channels using a plurality of component carriers in downlink and uplink.

In LTE-A, a configuration in which the base station apparatus performs communication using an arbitrary frequency band is referred to as a "Cell". Carrier aggregation is communication via a plurality of cells using a plurality of frequency bands, which is also referred to as Cell aggregation. In Cell aggregation, a plurality of cells is defined as two different types of cells, with one cell defined as a Primary Cell (Pcell) and the other cell defined as a Secondary Cell (Scell). The base station apparatus performs setting of a primary cell and a secondary cell independently for each mobile station apparatus using Cell aggregation. A primary cell necessarily includes a set of one downlink component carrier and one uplink component carrier. A secondary cell includes at least one downlink component carrier, and may or may not include an uplink component carrier. A component carrier used in a primary cell is referred to as a Primary Component Carrier (Primary CC, PCC). A component carrier used in a secondary cell is referred to as a Secondary Component Carrier (Secondary CC, SCC). In a primary cell and a secondary cell, although data communication using a physical downlink shared channel and a physical uplink shared channel is performed in common, various other processes are performed in a different manner. To be brief, a plurality of processes is performed only in a primary cell but not performed in a secondary cell. For example, in a primary cell, acquisition of system information and determination of insufficient radio quality (RLF: Radio Link Failure) are performed in the downlink, whereas execution of random access procedure using a physical random access channel, transmission and reception of uplink control information using a physical uplink control channel, or the like are performed in the uplink. Basically, all the processes performed in LTE which does not use Cell aggregation are performed in a primary cell, whereas a plurality of processes other than data communication is not performed in a secondary cell.

A mobile station apparatus uses a physical uplink control channel to transmit a reception confirmation response (ACK/NACK) indicating Acknowledgement or Negative Acknowledgement for data received using a physical downlink shared channel. The base station apparatus performs retransmission control of a physical downlink shared channel, based on the reception confirmation response received from the mobile station apparatus. With LTE-A using Cell aggregation, the base station apparatus can simultaneously use a plurality of physical downlink shared channels to transmit data to a mobile station apparatus. A mobile station apparatus which receives a plurality of physical downlink shared channels using Cell aggregation must simultaneously notify a plurality of reception confirmation responses to the base station apparatus, using a resource for a physical uplink control channel of a primary cell. In LTE, the base station apparatus can only use a single physical downlink shared channel at a time to transmit data to a mobile station apparatus, and the mobile station apparatus which received a single physical downlink shared channel uses a physical uplink control channel to notify the base station apparatus of a single reception confirmation response. With LTE-A, introduction of a physical uplink control channel with a new transmission method and signal configuration is under consideration in order to allow a mobile station apparatus to transmit a plurality of reception confirmation responses to the base station apparatus (Non-patent document 1). A new transmission method (ACK/NACK channel selection) is under consideration, which uses a plurality of physical uplink control channels to implicitly indicate information of the reception confirmation response by selecting a physical uplink control channel to be used for signal transmission according to information of a plurality of reception confirmation responses, and also to explicitly indicate the information of reception confirmation response by transmitting a signal modulated in the selected physical uplink control channel. A physical uplink control channel using DFT-Spread-OFDM method is under consideration as a new signal configuration.

In LTE, assignment of a resource of a physical uplink control channel used for transmitting a reception confirmation response is implicitly performed based on a resource used for a physical downlink control channel. Implicit resource assignment means that information just for assigning a resource is not used but resource assignment is performed diverting other information. On the other hand, explicit resource assignment means that information just for assigning a resource is used and resource assignment is performed. A physical downlink control channel includes a plurality of Control Channel Elements (CCEs). Resources of the physical uplink control channel used for transmitting a reception confirmation response are preliminarily associated with the control channel elements, which are resources used for the physical downlink control channel. A CCE used between the base station apparatus and the mobile station apparatus is provided with a number for identifying the CCE. Numbering of a CCE is performed based on a preliminarily defined rule.

A physical downlink control channel includes a set of a plurality of CCEs (CCE Aggregation). The number of CCEs constituting the set is referred to as a "CCE aggregation number" in the following. A CCE aggregation number constituting a physical downlink control channel is set in the base station apparatus according to the coding rate set for the physical downlink control channel and the number of bits of the control information included in the physical downlink control channel. For example, the base station apparatus forms a physical downlink control channel by one CCE, two CCEs, four CCEs, eight CCEs, and so on. For example, the base station apparatus uses a physical downlink control channel having a small number of CCEs for a mobile station apparatus with a good channel quality, and uses a physical downlink control channel with a large number of CCEs for a mobile station apparatus with a poor channel quality. Additionally, for example, the base station apparatus uses a physical downlink control channel with a small number of CCEs when transmitting control information with a small number of bits, and uses a physical downlink control channel with a large number of CCEs when transmitting control information with a large number of bits.

A physical uplink control channel used for transmitting a reception confirmation response includes three-dimensional resources, namely, physical resource blocks, frequency domain codes, and time domain codes. For a combination of respective resources of a physical uplink control channel used for transmitting a reception confirmation response used in a communication system, a number for identifying the combination of respective resources is provided based on a preliminarily defined rule.

A CCE number and a resource number of a physical uplink control channel used for transmitting a reception confirmation response is preliminarily associated with each other, so that a CCE is associated with a resource of the physical uplink control channel both having a same number. A mobile station apparatus uses a resource of a physical uplink control channel having a number corresponding to a CCE having the smallest number among the CCEs used for the physical downlink control channel which has detected control information addressed to its own apparatus, and transmits a reception confirmation response to data of the physical downlink shared channel for which resource assignment is indicated by the physical downlink control channel. The base station apparatus, similarly recognizing the correspondence between the CCE number and the resource number of the physical uplink control channel used for transmitting a reception confirmation response as with the mobile station apparatus, assigns a CCE to be used in the physical downlink control channel, considering the resource of the physical uplink control channel to be assigned to the mobile station apparatus. In other words, the mobile station apparatus recognizes the resource of a physical uplink control channel used for transmitting a reception confirmation response assigned to its own apparatus, based on the CCE used for the physical downlink control channel which has detected the control information addressed to its own apparatus.

For LTE-A using Cell aggregation, a method of assigning a resource of a physical uplink control channel with a new transmission method and the signal configuration is under consideration, with regard to a reception confirmation response (Non-patent document 2). First, assignment of a resource of the physical uplink control channel when transmitting a reception confirmation response using ACK/NACK channel selection will be described. When transmitting a physical downlink control channel via a primary cell, a resource of the physical uplink control channel associated with the CCE of the physical downlink control channel is implicitly assigned to the mobile station apparatus, as with LTE. When transmitting a physical downlink control channel via a primary cell, the physical downlink shared channel having resource assignment information included in its physical downlink control channel is transmitted via a primary cell or a secondary cell. When transmitting a physical downlink control channel via a secondary cell, a resource of the physical uplink control channel is explicitly assigned to the mobile station apparatus using predetermined signaling, unlike LTE. As the predetermined signaling, a method of explicitly assigning a resource of the physical uplink control channel using RRC (Radio Resource Control) signaling, and a method of explicitly assigning a resource of the physical uplink control channel using control information of the physical downlink control channel are under consideration. With the method of explicitly assigning a resource of the physical uplink control channel using RRC signaling, a resource of the physical uplink control channel has been preliminarily assigned for the mobile station apparatus before starting data communication using Cell aggregation, and the mobile station apparatus, upon detecting a physical downlink control channel in a secondary cell, in other words, upon recognizing that a physical downlink control channel has been transmitted via a secondary cell, uses a resource of the physical uplink control channel preliminarily assigned by RRC signaling as resources to be used for selection of a physical uplink control channel performed in order to implicitly indicate the information. With the method of explicitly assigning a resource of the physical uplink control channel using control information of the physical downlink control channel, the mobile station apparatus, upon detecting a physical downlink control channel in a secondary cell, uses the resource of the physical uplink control channel indicated in the control information of the detected physical downlink control channel as resources to be used for selection of a physical uplink control channel in order to implicitly indicate the reception confirmation response information. With the method of explicitly assigning a resource of the physical uplink control channel by the control information of the physical downlink control channel, candidates of a plurality of resources of the physical uplink control channel have been preliminarily assigned to the mobile station apparatus by RRC signaling, and one of the candidates of the resources which has been set by RRC signaling using control information of the physical downlink control channel is presented.

As the control information indicating resources of the physical uplink control channel in the physical downlink control channel, control information which is usually used for other purposes may be diverted. Here, diverting control information means that a control information field for a first case is interpreted as first control information and that for a second case is interpreted as second control information, with the first case being different from the second case and the first control information being different from the second control information. For example, the control information field, which is interpreted as control information indicating a transmit power control value of the physical uplink control channel when transmitting the physical downlink control channel via a primary cell, may be interpreted as the control information indicating resources to be used in selection of a physical uplink control channel performed in order to implicitly indicate the reception confirmation response information when transmitting the physical downlink control channel via a secondary cell.

Next, assignment of a resource of the physical uplink control channel using DFT-Spread-OFDM method will be described. When a physical downlink shared channel is transmitted at least via a secondary cell, resources of the physical uplink control channel are explicitly assigned to the mobile station apparatus, using predetermined signaling, unlike LTE. As the predetermined signaling, a method of explicitly assigning a resource of the physical uplink control channel using control information of the physical downlink control channel is under consideration, as with the case of transmitting a reception confirmation response using ACK/NACK channel selection. When transmitting a physical downlink shared channel only via a primary cell, a method of implicitly assigning a resource of the physical uplink control channel associated with the CCE of the physical downlink control channel to the mobile station apparatus, as with LTE, and a method of explicitly assigning a resource of the physical uplink control channel to the mobile station apparatus using predetermined signaling, unlike LTE, are under consideration. When the method of implicitly assigning, to the mobile station apparatus, resources of the physical uplink control channel associated with the CCE of the physical downlink control channel in a case where a physical downlink shared channel is transmitted only via a primary cell, the signal configuration of the physical uplink control channel is not one that uses DFT-Spread-OFDM method but uses a physical uplink control channel with a signal configuration similar to that of LTE. A physical downlink control channel including resource assignment information of the physical downlink shared channel to be transmitted via a primary cell is transmitted only via a primary cell, whereas a physical downlink control channel including resource assignment information of the physical downlink shared channel to be transmitted via a secondary cell is transmitted via a primary cell or a secondary cell.

Additionally, in LTE-A, it is considered that a mobile station apparatus transmits signals by using a plurality of transmitting antennas to realize faster data communication than LTE or improve the signal error quality over the uplink. In LTE-A, it is considered to apply diversity transmission (also referred to as transmission diversity) using a plurality of transmitting antennas for the physical uplink control channel (Non-patent document 3). For example, as methods of diversity transmission to be used by a mobile station apparatus, there are methods under consideration such as a method modulating uplink control information by the mobile station apparatus, generating a plurality of signals obtained by multiplying different orthogonal codes to the modulated signal, and transmitting the signals obtained by multiplying the orthogonal codes respectively via different transmitting antennas; a method generating a plurality of signals obtained by multiplying a code sequence with a cyclic shift of different values applied to the modulated signal and transmitting the signals obtained by multiplying the code sequence respectively via different transmitting antennas; or a method generating a plurality of modulated signals and transmitting the signals allocated over different time/frequency resources via respectively different transmitting antennas. As a method of assigning a resource used for transmission diversity to a physical uplink control channel, which has neither a transmission method using a physical uplink control channel to be used for transmitting a reception confirmation response in LTE, in other words, using ACK/NACK channel selection in LTE-A, nor a signal configuration using a DFT-Spread-OFDM method, a method is considered in which a resource of the physical uplink control channel corresponding to the CCE having the smallest number among one or more CCEs constituting the physical downlink control channel is assigned for a first transmitting antenna, and a resource having the next number to the resource of the physical uplink control channel is assigned for a second transmitting antenna (Non-patent document 4). In other words, according to the method described above, a resource having the next number to the resource of the physical uplink control channel assigned to the first transmitting antenna is assigned for the second transmitting antenna.

PRIOR ART DOCUMENTS

Non-Patent Documents

[Non-patent document 1] 3GPP TSG RAN1 #62, Madrid, Spain, 23-27, Aug., 2010, R1-105016 "PUCCH A/N formats for Rel-10"

[Non-patent document 2] 3GPP TSG RAN1 #62, Madrid, Spain, 23-27, Aug., 2010, R1-105040 "Way Forward on PUCCH Resource Allocation"

[Non-patent document 3] 3GPP TSG RAN1 #58, Shenahen, China, 24-28, Aug., 2009, R1-093704 "Way Forward for PUCCH Transmit Diversity Scheme"

[Non-patent document 4] 3GPP TSG RAN1 #62, Madrid, Spain, 23-27, Aug., 2010, R1-104760 "Resource Allocation for SORTD"

PROBLEMS TO BE SOLVED BY THE INVENTION

Even a mobile station apparatus set to transmit a reception confirmation response using ACK/NACK channel selection has a problem that if transmission diversity is applied to a physical uplink control channel using a resource assignment method in which a resource having the next number to the resource of the physical uplink control channel assigned for the first transmitting antenna is assigned for the second transmitting antenna, it is required to reserve a large amount of resources of the physical uplink control channel for the mobile station apparatus, which may result in increased overhead. The problem of increased overhead will be described in further detail. For a mobile station apparatus set to transmit a reception confirmation response using ACK/NACK channel selection, it is necessary to preliminarily reserve, for the mobile station apparatus, resources of the physical uplink control channel to be used when the physical downlink control channel is transmitted via a secondary cell, or candidates of resources of the physical uplink control channel. There has been a problem that if transmission diversity is applied to the mobile station apparatus, it is required to reserve resources of the physical uplink control channel or candidates of resources of the physical uplink control channel twice as much as the case where transmission diversity is not applied, which may cause increase of overhead. Briefly speaking, there has been a problem that it is necessary to reserve a large amount of resources of the physical uplink control channel in order to explicitly assign a resource of the physical uplink control channel, which may cause increase of overhead. There has similarly been a problem of increased overhead also when the mobile station apparatus has been set to transmit a reception confirmation response using a physical uplink control channel using a DFT-Spread-OFDM method.

The present invention has been made in view of the above circumstances, and has an object to provide a mobile station apparatus, a communication system, a communication method, and an integrated circuit which, in a communication system using transmission diversity by a plurality of transmitting antennas, controls a transmission method of uplink signals to allow a mobile station apparatus to efficiently transmit an uplink control signal while avoiding increase of control information overhead.

DISCLOSURE OF THE INVENTION (1) In order to achieve the above object, the present invention has taken the following measures. That is, a mobile station apparatus of the present invention is a mobile station apparatus which communicates with a base station apparatus using a plurality of cells simultaneously, and includes: a reception processing unit which performs detection processing of a physical downlink control channel for the plurality of cells; an uplink control information generating unit which generates a reception confirmation response to data of one or more physical downlink shared channels for which assignment of a resource is indicated by downlink control information included in one or more physical downlink control channels detected in a same subframe; a control unit which controls application of transmission diversity to a physical uplink control channel according to a situation of a cell in which data of the physical downlink shared channel has been received; and a transmission processing unit which transmits the generated reception confirmation response according to a control result of the control unit, using the physical uplink control channel.

(2) Additionally, in the mobile station apparatus of the present invention, the transmission diversity uses a plurality of transmitting antenna ports to transmit signals generated from a same reception confirmation response between respective transmitting antenna ports, using orthogonal resources in a frequency domain and/or a code domain.

(3) In addition, in the mobile station apparatus of the present invention, the plurality of cells includes one primary cell and one or more secondary cells, and the situation of a cell in which data of the physical downlink shared channel has been received includes at least a third situation or a fourth situation; the third situation is a situation where the physical downlink shared channel has been detected only in a primary cell; and the fourth situation is a situation where at least one of cells in which the physical downlink shared channel has been detected is a secondary cell.

(4) In addition, in the mobile station apparatus of the present invention, the control unit controls so as to apply transmission diversity to the physical uplink control channel in the third situation, and controls so as not to apply transmission diversity to the physical uplink control channel in the fourth situation.

(5) In addition, in the mobile station apparatus of the present invention, the transmission processing unit transmits the physical uplink control channel using a resource implicitly associated with a control channel element used for the detected physical downlink control channel in the third situation, and transmits the physical uplink control channel using at least an explicitly indicated resource in the fourth situation.

(6) In addition, in the mobile station apparatus of the present invention, the transmission processing unit controls so as to use PUCCH format 1a or PUCCH format 1b for the physical uplink control channel in the third situation, and use PUCCH format 3 for the physical uplink control channel in the fourth situation.

(7) In addition, a communication system of the present invention is a comprising a plurality of mobile station apparatuses and a base station apparatus which communicates with the plurality of mobile station apparatuses, the communication system using a plurality of cells simultaneously to perform communication, in which the base station apparatus has a transmitting unit which transmits signals to the mobile station apparatus: and a receiving unit which receives a signal from the mobile station apparatus, and the mobile station apparatus has a reception processing unit which performs detection processing of a physical downlink control channel for the plurality of cells; an uplink control information generating unit which generates a reception confirmation response to data of one or more physical downlink shared channels for which assignment of a resource is indicated by downlink control information included in one or more physical downlink control channels detected in a same subframe; a control unit which controls application of transmission diversity to a physical uplink control channel according to a situation of a cell in which data of the physical downlink shared channel has been received; and a transmission processing unit which transmits the generated reception confirmation response according to a control result of the control unit, using the physical uplink control channel.

(8) In addition, a communication method of the present invention is a communication method used for a mobile station apparatus which communicates with a base station apparatus using a plurality of cells simultaneously, and the method includes the steps of: performing detection processing of a physical downlink control channel for the plurality of cells; generating a reception confirmation response to data of one or more physical downlink shared channels for which assignment of a resource is indicated by downlink control information included in one or more physical downlink control channels detected in a same subframe; controlling application of transmission diversity to a physical uplink control channel according to a situation of a cell in which data of the physical downlink shared channel has been received; and transmitting the generated reception confirmation response according to a control result of the application of transmission diversity, using the physical uplink control channel.

(9) In addition, an integrated circuit of the present invention is an integrated circuit mounted on a mobile station apparatus which communicates with a base station apparatus using a plurality of cells simultaneously, and the integrated circuit includes: a reception processing unit which performs detection processing of a physical downlink control channel for the plurality of cells; an uplink control information generating unit which generates a reception confirmation response to data of one or more physical downlink shared channels for which assignment of a resource is indicated by downlink control information included in one or more physical downlink control channels detected in a same subframe; a control unit which controls application of transmission diversity to a physical uplink control channel according to a situation of a cell in which data of the physical downlink shared channel has been received; and a transmission processing unit which transmits the generated reception confirmation response according to a control result of the control unit, using the physical uplink control channel.

EFFECTS OF THE INVENTION

According to the invention, a mobile station apparatus can efficiently transmit a reception confirmation response to a base station apparatus while avoiding increase of control information overhead.

BRIEF DESCRIPTION OF THE DRAWINGS

FIG. 6 is a schematic block diagram illustrating a configuration of a transmission processing unit 407 of the mobile station apparatus 5 according to an embodiment of the present invention;

FIG. 7 is a flow chart illustrating exemplary processing relating to control of application of transmission diversity to a PUCCH of a control unit 405 of the mobile station apparatus 5 according to an embodiment of the present invention;

FIG. 8 is a flow chart illustrating exemplary processing relating to control of application of transmission diversity to a PUCCH of the control unit 405 of the mobile station apparatus 5 according to an embodiment of the present invention;

FIG. 9 is an explanatory of the overview of a communication system according to an embodiment of the present invention;

FIG. 10 illustrates an outline configuration of a downlink radio frame from the base station apparatus 3 to the mobile station apparatus 5 according to an embodiment of the present invention;

FIG. 11 illustrates an outline configuration of an uplink radio frame from the mobile station apparatus 5 to the base station apparatus 3 according to an embodiment of the present invention;

FIG. 12 is an explanatory diagram of a logical relation between PDCCH and CCE of the communication system according to an embodiment of the present invention;

FIG. 13 illustrates an exemplary allocation of a resource element group in a downlink radio frame of the communication system according to an embodiment of the present invention;

FIG. 14 illustrates a configuration and numbering of resources of a first PUCCH for ACK/NACK of the communication system according to an embodiment of the present invention;

FIG. 17 is an explanatory diagram of a relation among ACK/NACK information, resources selected by ACK/NACK channel selection, and a signal point of the QPSK of the communication system according to an embodiment of the present invention; and FIG. 18 is an explanatory diagram of a relation among ACK/NACK information, resources selected by ACK/NACK channel selection, and a signal point of the QPSK of the communication system according to an embodiment of the present invention.

BEST MODES FOR CARRYING OUT THE INVENTION

Figure 1:
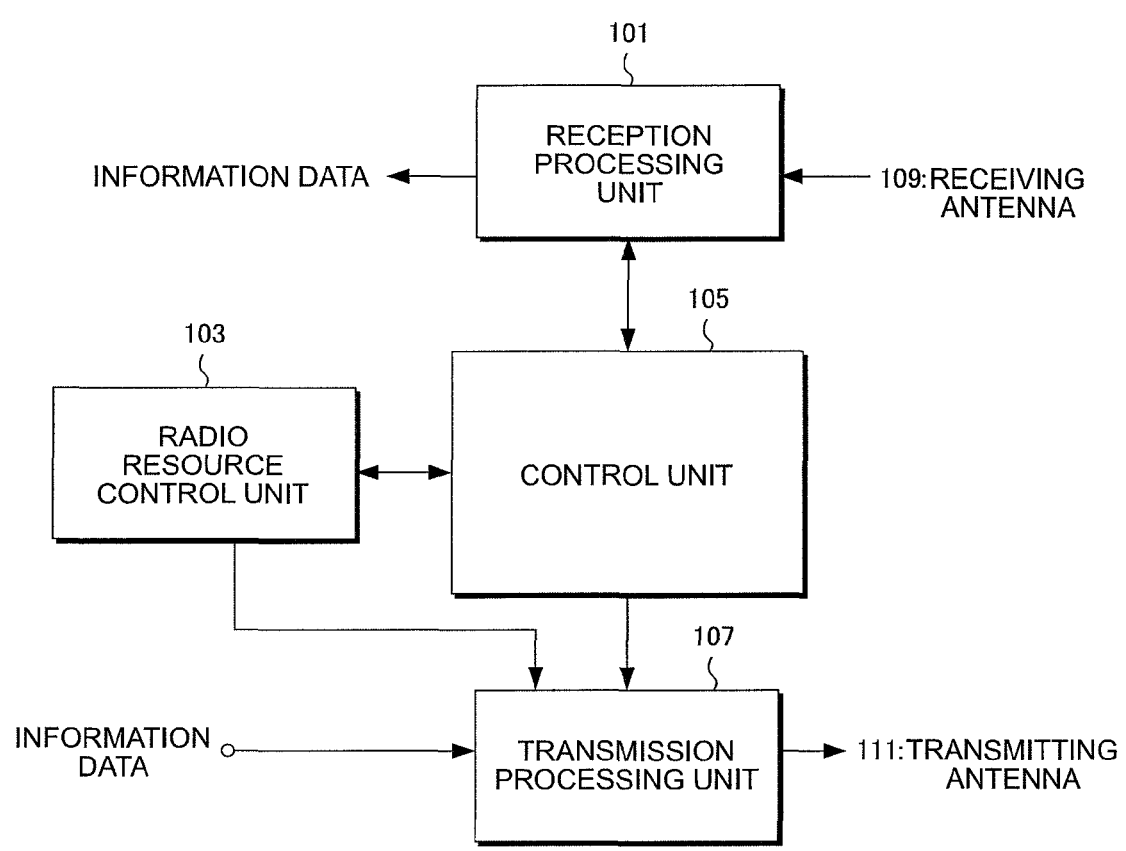
FIG. 1 is a schematic block diagram illustrating a configuration of a base station apparatus 3 according to an embodiment of the present invention.

In the following, an embodiment of the present invention will be described in detail, referring to the drawings. First, an overview of the communication system and a configuration of a radio frame according to the present embodiment will be described, referring to FIGS. 9 to 18. Next, a configuration of the communication system according to the present embodiment will be described, referring to FIGS. 1 to 6. Next, an operation and processing of the communication system according to the present embodiment will be described, referring to FIGS. 7 and 8.

<Overview of Communication System>

FIG. 9 is an explanatory diagram of an overview of a communication system according to an embodiment of the present invention. In a communication system 1 shown in the drawing, a base station apparatus (also referred to as eNodeB, NodeB) 3 communicates with a plurality of mobile station apparatuses (also referred to as UE: User Equipment) 5A, 5B and 5C. In addition, the drawing shows that a DL (also referred to as Downlink), which is the communication direction from the base station apparatus 3 to the mobile station apparatuses 5A, 5B and 5C, includes a downlink pilot channel, a PDCCH (also referred to as Physical Downlink Control CHannel) and a PDSCH (also referred to as Physical Downlink Shared CHannel). The drawing also shows that a UL (also referred to as Uplink), which is the communication direction from the mobile station apparatuses 5A, 5B and 5C to the base station apparatus 3, includes a PUSCH (also referred to as Physical Uplink Shared CHannel), an uplink pilot channel, and a PUCCH (also referred to as Physical Uplink Control CHannel). A channel refers to a medium used for transmitting signals. A PDSCH is a channel used for transmitting and receiving downlink data and control information. A PDCCH is a channel used for transmitting and receiving downlink control information. A PUSCH is a channel used for transmitting and receiving uplink data and control information. A PUCCH is a channel used for transmitting and receiving UCI (Uplink Control Information). As types of UCI, there are reception confirmation responses (ACK/NACK) indicating Acknowledgement (ACK) or Negative Acknowledgement (NACK) for downlink data of a PDSCH, and Scheduling Requests (SR) indicating whether or not to request assignment of a resource. The PUSCH is also used for transmitting and receiving the UCI. As types of other channels, there are an SCH (Synchronization CHannel) used for establishing downlink synchronization, a PRACH (Physical Random Access CHannel) used for establishing uplink synchronization, a PBCH (Physical Broadcast CHannel) used for transmitting downlink system information, or the like. The PDSCH is also used for transmitting downlink system information. In addition, an area controlled by the base station apparatus 3 is referred to as a Cell. In the present embodiment, description will be provided below, in which the mobile station apparatuses 5A, 5B and 5C are referred to as the mobile station apparatus 5.

<Carrier Aggregation/Cell Aggregation>

The communication system according to an embodiment of the present invention performs communication using a plurality of frequency bands having a predetermined frequency bandwidth (also referred to as Spectrum aggregation, Carrier aggregation, Frequency aggregation, etc.). Here, a frequency band is referred to as a CC (Component Carrier). Specifically, in a communication using Carrier aggregation, a downlink channel is transmitted and received for each downlink CC (also referred to as downlink component carrier, DL CC), and an uplink channel is transmitted and received for each uplink CC (also referred to as uplink component carrier, UL CC). In other words, in the communication system according to an embodiment of the present invention using Carrier aggregation, the base station apparatus 3 and the mobile station apparatuses 5 simultaneously transmit and receive signals via a plurality of channels using a plurality of CCs in the uplink and the downlink.

The base station apparatus performs communication using an arbitrary frequency band in a cell. Carrier aggregation is a communication via a plurality of cells using a plurality of frequency bands, which is also referred to as Cell aggregation. In Cell aggregation, one cell is defined as a Primary Cell (Pcell) and the rest of the cells are defined as Secondary Cells (Scells). Setting of a primary cell and secondary cells is performed independently for each mobile station apparatus.

The primary cell necessarily includes a set of a downlink component carrier and an uplink component carrier. The secondary cell includes at least one downlink component carrier, and may or may not include an uplink component carrier. For simplicity, explanation is provided in the present embodiment assuming that one secondary cell includes a set of a downlink component carrier and an uplink component carrier. The component carrier used in the primary cell is referred to as a Primary Component Carrier (Primary CC, PCC). The component carrier used in the secondary cells is referred to as a Secondary Component Carrier (Secondary CC, SCC). In the primary cell and the secondary cells, although data communication using a PDSCH and a PUSCH is performed in common, various other processes are performed in a different manner. Briefly speaking, a plurality of processes is performed only in the primary cell and not performed in the secondary cells. For example, in the primary cell, acquisition of system information (also referred to as SIB: System Information Block), determination of insufficient radio quality (RLF: Radio Link Failure), or the like are performed in the downlink, whereas execution of a random access procedure using PRACH, transmission and reception of UCI using PUCCH, or the like are performed in the uplink.

<Configuration of Downlink Radio Frame>

FIG. 10 illustrates an outline configuration of a radio frame of the downlink (referred to as downlink radio frame) from the base station apparatus 3 to the mobile station apparatus 5 according to an embodiment of the present invention. In the drawing, the horizontal axis represents the time domain and the vertical axis represents the frequency domain. A downlink radio frame is a unit of resource assignment or the like, and is composed of a pair (referred to as Physical Resource Block pair, PRB pair) of resource blocks (RB) (also referred to as Physical Resource Block: PRB) including a frequency band and a time zone with a predetermined width in the downlink. A physical resource block pair of the downlink (referred to as downlink physical resource block pair) is composed of two physical resource blocks (referred to as downlink physical resource blocks) which are contiguous in the downlink time domain.

Additionally, in the drawing, a downlink physical resource block is composed of 12 subcarriers (referred to as downlink subcarrier) in the downlink frequency domain, and is composed of 7 OFDM (Orthogonal Frequency Division Multiplexing) symbols in the time domain. A system band in the downlink (referred to as downlink system band) is a downlink communication band of the base station apparatus 3. The system bandwidth of the downlink (referred to as downlink system bandwidth) includes a bandwidth of a plurality of downlink component carriers in the downlink (referred to as downlink component carrier bandwidth). In the communication system 1, a component carrier in the downlink (referred to as downlink component carrier) (DL CC) is a band having a predetermined frequency bandwidth, and the downlink component carrier bandwidth is the frequency bandwidth of the downlink component carrier. For example, the downlink system band having a 40 MHz frequency bandwidth includes two downlink component carriers each having a 20 MHz frequency bandwidth.

In the downlink component carrier, a plurality of downlink physical resource blocks is allocated according to the downlink component carrier bandwidth. For example, a downlink component carrier having a 20 MHz frequency bandwidth is composed of 100 downlink physical resource blocks. In addition, for example, the downlink component carrier bandwidth is a frequency bandwidth usable for communication by the LTE-compatible mobile station apparatus 5, whereas the downlink system bandwidth is a frequency bandwidth usable for communication by the LTE-A-compatible mobile station apparatus 5. The LTE-compatible mobile station apparatus 5 can perform communication via only one cell simultaneously, whereas the LTE-A-compatible mobile station apparatus 5 can perform communication via a plurality of cells simultaneously. The downlink component carrier bandwidth is a downlink frequency bandwidth of a cell, and the downlink system bandwidth is an aggregation of downlink frequency bandwidths of a plurality of cells.

Additionally, in the time domain shown in the drawing, there are a slot including seven OFDM symbols (referred to as a downlink slot), a subframe including two downlink slots (referred to as a downlink subframe), and a downlink radio frame including ten downlink subframes. A unit composed of a downlink subcarrier and an OFDM symbol is referred to as a resource element (RE) (downlink resource element). In each downlink subframe, there are allocated at least a PDSCH used for transmitting information data (also referred to as Transport Block) and a PDCCH used for transmitting control information. In the drawing, the PDCCH includes the first to third OFDM symbols of the downlink subframe, and the PDSCH includes the fourth to fourteenth OFDM symbols of the downlink subframe. The number of OFDM symbols included in the PDCCH and the number of OFDM symbols included in the PDSCH may be changed for each downlink subframe.

Although not shown in the drawing, downlink pilot channels used for transmitting a reference signal (RS) in the downlink (referred to as downlink reference signal, and also referred to as Cell specific RS, DL RS) are allocated in a distributed manner over a plurality of downlink resource elements. Here, the downlink reference signal is a signal known to the communication system 1, and is used for estimating channel variation of the PDSCH and PDCCH. The number of downlink resource elements constituting the downlink reference signal depends on the number of transmitting antennas used in the base station apparatus 3 for communication with the mobile station apparatus 5.

A PDSCH includes one or more downlink physical resource blocks in a same downlink component carrier, and a PDCCH includes a plurality of downlink resource elements in a same downlink component carrier. A plurality of PDSCHs and a plurality of PDCCHs are allocated in a downlink system band. The base station apparatus 3 can allocate a PDCCH and a PDSCH including control information related to assignment of PDSCH resources in the same downlink component carrier in the same downlink subframe for one LTE-compatible mobile station apparatus 5, and can allocate a plurality of PDCCHs and a plurality of PDSCHs including control information related to assignment of PDSCH resources in the same downlink subframe for one LTE-A-compatible mobile station apparatus 5. Although the base station apparatus 3 can allocate a plurality of PDCCHs including control information related to assignment of a plurality of PDSCH resources in the same downlink component carrier in the same downlink subframe for one LTE-A-compatible mobile station apparatus 5, it cannot allocate a plurality of PDSCHs in the same downlink component carrier but can allocate respective PDSCHs to different downlink component carriers.

In a PDCCH, there are allocated signals generated from control information such as information indicating assignment of a downlink physical resource block to a PDSCH, information indicating assignment of an uplink physical resource block to a PUSCH, a mobile station identifier (referred to as Radio Network Temporary Identifier: RNTI), modulation scheme, coding rate, retransmission parameters, multi-antenna-related information, transmit power control command (TPC command), information indicating PUCCH resources, or the like. The control information included in a PDCCH is referred to as Downlink Control Information (DCI). DCI including information indicating assignment of downlink physical resource blocks to a PDSCH is referred to as Downlink assignment (also referred to as DL assignment or Downlink grant), and the DCI including information indicating assignment of uplink physical resource blocks to a PUSCH is referred to as Uplink grant (UL grant). Downlink assignment includes a transmit power control command to a PUCCH. Uplink assignment includes a transmit power control command to a PUSCH. A PDCCH includes only information indicating assignment of a PDSCH resource or information indicating assignment of a PUSCH resource, but does not include information indicating assignment of a plurality of PDSCH resources or information indicating assignment of a plurality of PUSCH resources.

<Configuration of Uplink Radio Frame>

FIG. 11 illustrates an outline configuration of a radio frame of the uplink (referred to as an uplink radio frame) from the mobile station apparatus 5 to the base station apparatus 3 according to an embodiment of the present invention. In the drawing, the horizontal axis represents the time domain and the vertical axis represents the frequency domain. An uplink radio frame is a unit of resource assignment or the like, and includes a pair (referred to as Uplink Physical Resource Block pair) of physical resource blocks including a frequency band a time zone with a predetermined width in the uplink. An uplink physical resource block pair is composed of two physical resource blocks of the uplink (referred to as Uplink Physical Resource Block) which are contiguous in the uplink time domain.

Additionally, in the drawing, an uplink physical resource block is composed of 12 subcarriers (referred to as uplink subcarrier) in the uplink frequency domain, and includes seven SC-FDMA (Single-Carrier Frequency Division Multiple Access) symbols in the time domain. A system band in the uplink (referred to as uplink system band) is an uplink communication band of the base station apparatus 3. The system bandwidth in the uplink (referred to as uplink system bandwidth) includes a bandwidth of a plurality of uplink component carriers in the uplink (referred to as uplink component carrier bandwidth). In the communication system 1, a component carrier in the uplink (referred to as uplink component carrier) (UL CC) is a band having a predetermined frequency bandwidth, and the uplink component carrier bandwidth is the frequency bandwidth of the uplink component carrier. For example, a system band of the uplink (referred to as Uplink system band) having a 40 MHz frequency bandwidth is composed of two uplink component carriers each having a 20 MHz frequency bandwidth.

In the uplink component carrier, a plurality of uplink physical resource blocks is allocated according to the uplink component carrier bandwidth. For example, an uplink component carrier having a 20 MHz frequency bandwidth is composed of 100 uplink physical resource blocks. In addition, for example, the uplink component carrier bandwidth is a frequency bandwidth usable for communication by the LTE-compatible mobile station apparatus 5, whereas the uplink system bandwidth is a frequency bandwidth usable for communication by the LTE-A-compatible mobile station apparatus 5. The LTE-compatible mobile station apparatus 5 can perform communication only via one cell simultaneously, whereas the LTE-A-compatible mobile station apparatus 5 can perform communication via a plurality of cells simultaneously. The uplink component carrier bandwidth is an uplink frequency bandwidth of a cell, and the uplink system bandwidth is an aggregation of uplink frequency bandwidths of a plurality of cells.

Additionally, in the time domain shown in the drawing, there are a slot composed of seven SC-FDMA symbols (referred to as uplink slot), a subframe composed of two uplink slots (referred to as uplink subframe), and an uplink radio frame composed of ten uplink subframes. A unit composed of an uplink subcarrier and an SC-FDMA symbol is referred to as a resource element (referred to as uplink resource element).

In each uplink subframe, there are allocated at least a PUSCH used for transmitting information data and a PUCCH used for transmitting Uplink Control Information (UCI). There are two types of PUCCHs, namely, a first PUCCH and a second PUCCH. The first PUCCH is used for transmitting a 4-bit or less UCI (ACK/NACK) indicating Acknowledgement (ACK) or Negative Acknowledgement (NACK) for data received using a PDSCH, a UCI (SR: Scheduling Request) indicating at least whether or not to request assignment of an uplink resource, or a UCI (CQI: Channel Quality Indicator) indicating downlink reception quality (also referred to as Channel Quality). The first PUCCH used for transmitting an ACK/NACK is not of the signal configuration using DFT-Spread-OFDM method. The first PUCCH is used for transmitting an ACK/NACK when Cell aggregation is not used. In addition, the first PUCCH is used for transmitting a 4-bit or less ACK/NACK when Cell aggregation is used, with ACK/NACK channel selection being used as the transmission method. Details of an ACK/NACK channel selection will be described below. The second PUCCH is used for transmitting a 5-bit or more UCI (ACK/NACK) indicating an ACK or NACK for data received using a PDSCH. The second PUCCH used for transmitting an ACK/NACK is of the signal configuration using DFT-Spread-OFDM method. The second PUCCH is not used for transmitting an ACK/NACK when Cell aggregation is not used. In addition, the second PUCCH is used for transmitting a 5-bit or more ACK/NACK when Cell aggregation is used as the transmission method, and ACK/NACK channel selection is not used as the transmission method.

The mobile station apparatus 5, when indicating, to the base station apparatus 3, requesting assignment of an uplink resource, transmits a signal via the first PUCCH for transmitting an SR. The base station apparatus 3 recognizes, from the result that the signal has been detected by a resource of the first PUCCH for transmitting an SR, that the mobile station apparatus 5 is requesting assignment of an uplink resource. The mobile station apparatus 5, when indicating, to the base station apparatus 3, not requesting assignment of an uplink resource, does not transmit any signal by a preliminarily assigned resource of the first PUCCH for transmitting an SR. The base station apparatus 3 recognizes, from the result that no signal has been detected by a resource of the first PUCCH for transmitting an SR, that the mobile station apparatus 5 is not requesting assignment of an uplink resource.

Here, the second PUCCH may be used for transmitting an SR or CQI. In addition, it may be used for transmitting control information (CSI: Channel State Information) indicating the first PUCCH and/or the downlink channel state. Additionally, the first PUCCH may be used for transmitting an ACK/NACK and a CQI simultaneously. In addition, different types of signal configuration are used for the first PUCCH according to cases of transmitting a UCI including ACK/NACK, transmitting a UCI including an SR, and transmitting a UCI including a CQI. The first PUCCH used for transmitting an ACK/NACK is referred to as the PUCCH format 1a or the PUCCH format 1b. With the PUCCH format 1a, BPSK (Binary Phase Shift Keying) is used as the modulation scheme of modulating information relating to ACK/NACK. With the PUCCH format 1a, 1-bit information is explicitly indicated by the modulated signal. With the PUCCH format 1b, QPSK (Quadrature Phase Shift Keying) is used as the modulation scheme of modulating information relating to ACK/NACK. With the PUCCH format 1b, 2-bit information is explicitly indicated by the modulated signal. In the ACK/NACK channel selection, the PUCCH format 1b is used. The first PUCCH used for transmitting an SR is referred to as a PUCCH format 1. The first PUCCH used for transmitting a CQI is referred to as a PUCCH format 2. The first PUCCH used for simultaneous transmission of a CQI and an ACK/NACK is referred to as a PUCCH format 2a or a PUCCH format 2b. With the PUCCH format 2b, the reference signal of the uplink pilot channel is multiplied by the modulated signal generated from information of an ACK/NACK. With the PUCCH format 2a, 1-bit information relating to ACK/NACK and information of a CQI are transmitted. With the PUCCH format 2b, 2-bit information relating to an ACK/NACK and information of a CQI are transmitted. The second PUCCH used for transmitting an ACK/NACK is referred to as a PUCCH format 3.

A PUSCH is composed of one or more uplink physical resource blocks in the same uplink component carrier, a first PUCCH is composed of two uplink physical resource blocks which are in symmetry relation in the frequency domain in the same uplink component carrier and located in different uplink slots, and a second PUCCH is composed of two uplink physical resource blocks in the same uplink component carrier. For example, in FIG. 11, a pair of uplink physical resource blocks used for the first PUCCH includes, in an uplink subframe in the uplink component carrier having the lowest frequency, the uplink physical resource block having the lowest frequency in the first uplink slot and the uplink physical resource block having the highest frequency in the second uplink slot. For example, in FIG. 11, a pair of uplink physical resource blocks used for the second PUCCH includes, in an uplink subframe in the uplink component carrier having the lowest frequency, the uplink physical resource block having the second lowest frequency in the first uplink slot and the uplink physical resource block having the second lowest frequency in the second uplink slot. In an embodiment of the present invention, although the second PUCCH is assumed to include a pair of uplink physical resource blocks, it may include two uplink physical resource blocks which are in symmetry relation in the frequency domain in the same uplink component carrier and located in different uplink slots, or may include a plurality of uplink physical resource block pairs.

In an uplink system band, there are allocated one or more PUSCHs and one or more first PUCCHs. In addition, when communication using Cell aggregation is performed between the base station apparatus 3 and the mobile station apparatus 5, one or more second PUCCHs are allocated in the uplink system band. The LTE-compatible mobile station apparatus 5 can allocate a first PUCCH resource and a PUSCH resource in the same uplink component carrier and transmit them. Although the base station apparatus 3 can assign a different first PUCCH resource for each ACK/NACK or an SR or CQI to the LTE-compatible mobile station apparatus 5, the LTE-compatible mobile station apparatus 5 uses only a single first PUCCH resource in the same uplink subframe. In addition, the LTE-compatible mobile station apparatus 5 uses only the PUSCH resource when the first PUCCH resource and the PUSCH resource are assigned in the same uplink subframe.

In addition, the base station apparatus 3 can assign a PUSCH resource for each uplink component carrier for an LTE-A-compatible mobile station apparatus 5. When the PUSCH resource is assigned via a plurality of uplink component carriers in the same uplink subframe, the LTE-A-compatible mobile station apparatus 5 can use a plurality of PUSCH resources. Here, the base station apparatus 3 cannot assign a plurality of PUSCH resources in the same uplink component carrier in the same uplink subframe for an LTE-A-compatible mobile station apparatus 5, but can assign each PUSCH resource to different uplink component carrier. In addition, the base station apparatus 3 can assign one or more first PUCCH resources to an uplink component carrier for an LTE-A-compatible mobile station apparatus 5. When a plurality of first PUCCH resources is assigned in the same uplink subframe, the LTE-A-compatible mobile station apparatus 5 uses any one of the first PUCCH resources. In such a case, which of the first PUCCH resources will be selected by the mobile station apparatus 5 is determined according to a predetermined rule. In addition, the base station apparatus 3 can assign a second PUCCH resource to an uplink component carrier for an LTE-A-compatible mobile station apparatus 5. The first PUCCH resource and the second PUCCH resource assigned to the mobile station apparatus 5 include a resource in the same uplink component carrier. The uplink component carrier assigned with the first PUCCH resource and/or the second PUCCH resource is an uplink primary component carrier, and is a primary cell. When the first PUCCH resource and the second PUCCH resource are assigned in the same uplink subframe, the LTE-A-compatible mobile station apparatus 5 uses the second PUCCH resource. In addition, when the LTE-A-compatible mobile station apparatus 5 is configured not to perform simultaneous transmission of the PUSCH and PUCCH, it uses only the PUSCH resource when the PUCCH resource and the PUSCH resource are assigned in the same uplink subframe. In addition, when the LTE-A-compatible mobile station apparatus 5 is configured to perform simultaneous transmission of the PUSCH and PUCCH, it can basically use both the PUCCH resource and the PUSCH resource when the PUCCH resource and the PUSCH resource are assigned in the same uplink subframe.

The uplink pilot channel is allocated in different SC-FDMA symbols or same SC-FDMA symbols according to cases of being allocated in the same uplink physical resource block as with the PUSCH, allocated in the same uplink physical resource block as with the first PUCCH, and allocated in the same uplink physical resource block as with the second PUCCH. The uplink pilot channel is used for transmitting an Uplink Reference Signal (UL RS). Here, an uplink reference signal is a known signal in the communication system 1 used for estimating channel variation of the PUSCH and PUCCH.

When the uplink pilot channel is allocated in the same uplink physical resource block as with the PUSCH, it is allocated in the fourth SC-FDMA symbol in the uplink slot. When the uplink pilot channel is allocated in the same uplink physical resource block as with the first PUCCH including ACK/NACK, it is allocated in the third, the fourth, and the fifth SC-FDMA symbol in the uplink slot. When the uplink pilot channel is allocated in the same uplink physical resource block as with the first PUCCH including an SR, it is allocated in the third, the fourth, and the fifth SC-FDMA symbol in the uplink slot. When the uplink pilot channel is allocated in the same uplink physical resource block as with the first PUCCH including a CQI, it is allocated in the second and the sixth SC-FDMA symbol in the uplink slot. When the uplink pilot channel is allocated in the same uplink physical resource block as with the second PUCCH, it is allocated in the second and the sixth SC-FDMA symbol in the uplink slot. Unlike the allocation of uplink pilot channels described above, the uplink pilot channel may be allocated in different SC-FDMA symbol. For example, when the uplink pilot channel is allocated in the same uplink physical resource block as with the second PUCCH, a configuration such as allocating them in the third, the fourth, and the fifth SC-FDMA symbol in the uplink slot may be used.

Although FIG. 11 illustrates a case where the first PUCCH is allocated in an uplink physical resource block at the furthest end of each uplink component carrier, the second or the third uplink physical resource block from the end of the uplink component carrier may be used for the first PUCCH. Additionally, although FIG. 11 illustrates a case where the second PUCCH is allocated in the second uplink physical resource block from the end of the uplink component carrier, the third or the fourth uplink physical resource block from the end of the uplink component carrier may be used for the second PUCCH.

With the first PUCCH, code multiplexing in the frequency domain and code multiplexing in the time domain are used. Code multiplexing in the frequency domain is processed by multiplying each code in the code sequence by the modulated signal modulated from the uplink control information for each subcarrier. Code multiplexing in the time domain is processed by multiplying each code in the code sequence by the modulated signal modulated from the uplink control information for each SC-FDMA symbol. A plurality of first PUCCHs is allocated in the same uplink physical resource block, and each of the first PUCCHs is assigned with different code sequence, thus realizing code multiplexing in the frequency domain or the time domain by the assigned code sequence. With the first PUCCH used for transmitting an ACK/NACK (PUCCH format 1a, PUCCH format 1b), code multiplexing in the frequency domain and the time domain is used. With the first PUCCH used for transmitting an SR (PUCCH format 1), code multiplexing in the frequency domain and the time domain is used. With the first PUCCH used for transmitting a CQI (PUCCH format 2), code multiplexing in the frequency domain is used. Additionally, with the second PUCCH used for transmitting an ACK/NACK (PUCCH format 3), code multiplexing in the time domain is used. A plurality of second PUCCHs is allocated in the same uplink physical resource block, and different code sequence is used for each of the second PUCCHs, thus realizing code multiplexing in the time domain. For simplicity, explanation with regard to code multiplexing of a PUCCH is omitted as appropriate.

In the communication system 1 according to an embodiment of the present invention, an OFDM method is applied in the downlink, and an NxDFT-Spread OFDM method is applied in the uplink. Here, an NxDFT-Spread OFDM method is a method of transmitting and receiving a signal using the DFT-Spread OFDM method for each uplink component carrier, that is, a method of performing communicate using a plurality of processing units relating to DFT-Spread OFDM transmission and reception in an uplink subframe of the communication system 1 using a plurality of uplink component carriers.

PDSCH resources are allocated, in the time domain, in the same downlink subframe as with the downlink subframe allocated with a PDCCH resource including a downlink assignment used for assigning the PDSCH resource, and allocated, in the frequency domain, in the same downlink component carrier as with a PDCCH including a downlink assignment used for assigning the PDSCH resource, or in a different downlink component carrier.

DCI includes information (referred to as "carrier indicator" in the following) indicating which downlink component carrier is the one that transmits the PDSCH the downlink assignment corresponds to, or which uplink component carrier is the one that transmits the PUSCH the uplink grant corresponds to. If no carrier indicator is included in the downlink assignment, the downlink assignment corresponds to the PDSCH of the same downlink component carrier as with the downlink component carrier to which the downlink assignment has been transmitted. If no carrier indicator is included in the uplink grant, the uplink grant corresponds to the PUSCH of the uplink component carrier preliminarily associated with the downlink component carrier to which the uplink grant has been transmitted. Information indicating the association between the downlink component carrier and the uplink component carrier used for interpretation of resource assignment of the uplink grant in the case where no carrier indicator is included in the DCI is notified from the base station apparatus 3 to the mobile station apparatus 5 using system information, before communication of information data is performed.

<Cross-CC Scheduling>

A PDCCH and a PDSCH including a downlink assignment corresponding to the PDCCH can be allocated in different downlink component carriers (referred to as Cross CC scheduling). The downlink component carrier allocated with a PDSCH is referred to as a physical downlink shared channel component carrier (PDSCH CC). The downlink component carrier allocated with a PDCCH is referred to as a physical downlink control channel component carrier (PDCCH CC). If there is a possibility that a PDSCH is allocated in all the downlink component carriers used in Carrier aggregation, all the downlink component carriers are PDSCH CCs.

A downlink component carrier allocated with a PDCCH and a downlink component carrier associated, via system information, with an uplink component carrier allocated with a PUSCH including an uplink grant corresponding to the PDCCH can be set in a different manner. The system information is notified to each downlink component carrier, the system information includes information indicating an uplink component carrier associated with the downlink component carrier. The system information including information indicating the association is referred to as SIB2 (System Information Block Type2), and the association between a downlink component carrier and an uplink component carrier indicated by SIB2 is referred to as SIB2 linkage. The uplink component carrier allocated with a PUSCH is referred to as a physical uplink shared channel component carrier (PUSCH CC).

The base station apparatus 3 determines which of a plurality of downlink component carriers used for Cell aggregation will be used as a PDCCH CC. Next, the base station apparatus 3 determines which of the PDSCH CCs and which of the PUSCH CCs each PDCCH CC will be associated with. Here, association between a PDCCH CC and a PDSCH CC means that a PDCCH including control information relating to assignment of a PDSCH resource to be allocated in the PDSCH CC is allocated in a PDCCH CC associated with the PDSCH CC. More specifically, association between a PDCCH CC and a PDSCH CC is downlink assignment corresponding to a PDSCH allocated in a PDSCH CC, and means that a PDCCH including a downlink assignment also forming a carrier indicator is allocated in a PDCCH CC associated with the PDSCH CC. Here, association between a PDCCH CC and a PUSCH CC means that a PDCCH including control information relating to assignment of a PUSCH resource to be allocated in the PUSCH CC is allocated in a PDCCH CC associated with the PUSCH CC. More specifically, association between a PDCCH CC and a PUSCH CC is an uplink grant corresponding to a PUSCH allocated in a PUSCH CC, and means that a PDCCH including an uplink grant also forming a carrier indicator is allocated in a PDCCH CC associated with the PUSCH CC. The association described here is different from the association between a downlink component carrier and an uplink component carrier (SIB2 linkage) for a PDCCH which does not include a carrier indicator as described above. Each of a plurality of PDSCH CCs used for Cell aggregation may be associated with a same PDCCH CC, or each of a plurality of PDSCH CCs used for Cell aggregation may be associated with different PDCCH CC. For example, when a PDCCH CC is associated with a plurality of PDSCH CCs, it is recognized by the carrier indicator which PDSCH CC is the one the PDSCH resource assignment of which is indicated by a PDCCH transmitted by the PDCCH CC.

The base station apparatus 3 notifies the mobile station apparatus 5 of information indicating a downlink component carrier associated with each PDSCH CC as a PDCCH CC. This information is notified using radio link control (RRC: Radio Resource Control) signaling. Based on the information notified from the base station apparatus 3 using RRC signaling, the mobile station apparatus 5 recognizes a downlink component carrier which may be allocated with a PDCCH including a downlink assignment with a carrier indicator of a PDSCH of each PDSCH CC. A PDCCH including a downlink assignment of a PDSCH transmitted via a primary cell is transmitted only via a primary cell, whereas a PDCCH including a downlink assignment of a PDSCH transmitted via a secondary cell is transmitted via a primary cell or a secondary cell. In other words, a PDCCH CC and a PDSCH CC are necessarily formed in a primary cell, and furthermore, the PDCCH CC and the PDSCH CC formed in a primary cell are associated with each other. In addition, the PUSCH CC of a primary cell is associated with the PDCCH CC of the primary cell. The PDSCH CC and the PUSCH CC of the primary cell have an SIB2 linkage. Although PDSCH CCs are formed in a secondary cell, PDCCH CCs need not be formed. PDCCH CCs associated with PDSCH CCs formed in a secondary cell may be formed in a primary cell, or may be formed in other secondary cells. In a cell formed with PDCCH CCs, PDSCH CCs and PUSCH CCs are necessarily formed, and PDCCH CCs and PDSCHs CC, as well as PDCCH CCs and PUSCH CCs in a same cell are associated with each other. RRC signaling is notified via a PDSCH. Since a PDSCH CC in a primary cell and a PDSCH CC associated with a PUSCH CC are necessarily formed in the same primary cell, information indicating the relation is not notified to the mobile station apparatus 5. In addition, when Cross-CC scheduling is not applied, information indicating the association between the PDSCH CC and the PDCCH CC is not notified from the base station apparatus 3 to the mobile station apparatus 5. When Cross-CC scheduling is not applied, no carrier indicator is included in the downlink assignment.

<Configuration of PDCCH>

A PDCCH includes a plurality of Control Channel Elements (CCEs). The number of CCEs used in each downlink component carrier depends on the downlink component carrier bandwidth, the number of OFDM symbols constituting the PDCCH, and the number of downlink reference signals of the downlink pilot channel according to the number of transmitting antennas of the base station apparatus 3 used for communication. A CCE includes a plurality of downlink resource elements as will be described below.

FIG. 12 is an explanatory diagram of the logical relation between a PDCCH and a CCE of a communication system according to an embodiment of the present invention. A CCE used between the base station apparatus 3 and the mobile station apparatus 5 is provided with a number for identifying the CCE. Numbering of CCEs is performed based on a predetermined rule. Here, CCE t indicates a CCE having a CCE number t. A PDCCH is formed by a set (CCE Aggregation) including a plurality of CCEs. The number of CCEs included in the set is referred to as a "CCE aggregation number" in the following. The CCE aggregation number constituting a PDCCH is set in the base station apparatus 3 in accordance with the coding rate which is set in the PDCCH, and the number of bits of DCI included in the PDCCH. In addition, a set including n CCEs is referred to as "CCE aggregation n" in the following. For example, the base station apparatus 3 forms a PDCCH by one CCE (CCE aggregation 1), a PDCCH by two CCEs (CCE aggregation 2), a PDCCH by four CCEs (CCE aggregation 4), and a PDCCH by eight CCEs (CCE aggregation 8). For example, the base station apparatus 3 uses a CCE aggregation number having a small number of CCEs constituting a PDCCH for a mobile station apparatus 3 with a good channel quality, and uses a CCE aggregation number having a large number of CCEs constituting a PDCCH for a mobile station apparatus 3 with a poor channel quality. Additionally, for example, the base station apparatus 3 uses a CCE aggregation number having a small number of CCEs constituting a PDCCH when transmitting DCI with a small number of bits, and uses a CCE aggregation number having a large number of CCEs constituting a PDCCH when transmitting DCI with a large number of bits.

A plurality of downlink resource elements constituting a CCE includes a plurality of resource element groups (also referred to as REG, mini-CCE). A resource element group includes a plurality of downlink resource elements. For example, a resource element group includes four downlink resource elements. FIG. 13 illustrates an exemplary allocation of resource element groups in a downlink radio frame of the communication system according to an embodiment of the present invention. Here, a case is shown where a PDCCH includes a first to a third OFDM symbols, and downlink reference signals corresponding to downlink pilot channels of two transmitting antennas (transmitting antenna 1 and transmitting antenna 2) are allocated. In the drawing, the vertical axis represents the frequency domain, and the horizontal axis represents the time domain.

In the exemplary allocation of FIG. 13, a resource element group includes four adjacent downlink resource elements in the frequency domain. FIG. 13 shows that downlink resource elements provided with a same code of the PDCCH belong to a same resource element group. A resource element group is formed, skipping resource elements R1 (signal of a downlink pilot channel of the transmitting antenna 1) and R2 (signal of a downlink pilot channel of the transmitting antenna 2) allocated with a downlink pilot channel. FIG. 13 shows that numbering is first performed for a resource element group of the first OFDM symbol having the lowest frequency (code 1), then for a resource element group of the second OFDM symbol having the next lowest frequency (code 2), and for a resource element group of the third OFDM symbol having the next lowest frequency (code 3). In addition, FIG. 13 shows that numbering (code 4) is performed for a resource element group adjacent to the frequency of the resource element group for which numbering (code 2) of the second OFDM symbol for which no downlink pilot channel will be allocated next has been performed, and that numbering (code 5) is performed for a resource element group adjacent to the frequency of the resource element group for which numbering (code 3) of the third OFDM symbol for which no downlink pilot channel will be allocated next has been performed. FIG. 13 further shows that numbering (code 6) is performed for a resource element group adjacent to the frequency of the resource element group for which numbering (code 1) of the first OFDM symbol has been performed next, that numbering (code 7) is performed for a resource element group adjacent to the frequency of the resource element group for which numbering (code 4) of the second OFDM symbol has been performed next, and that numbering (code 8) is performed for the resource element group adjacent to the frequency of the resource element group for which numbering (code 5) of the third OFDM symbol has been performed next. Similar numbering will also be performed for subsequent resource element groups.

A CCE includes a plurality of resource element groups as shown in FIG. 13. For example, a CCE includes nine different resource element groups distributed over the frequency domain and the time domain. Specifically, interleaving is performed over all the downlink component carriers, for each resource element group using a block interleaver for all the resource element groups for which numbering has been performed as shown in the drawing, and a CCE is formed by nine resource element groups having successive numbers after interleaving.

<Implicit Assignment of CCE and PUCCH Resource for ACK/NACK>

The first PUCCH (PUCCH format 1a, PUCCH format 1b) resource used for transmitting an ACK/NACK without using Cell aggregation is implicitly assigned based on a CCE used for a PDCCH. When a PDCCH is detected in a primary cell with a setting having been made to transmit an ACK/NACK using ACK/NACK channel selection and using Cell aggregation, the resource to be used for selection of the first PUCCH (PUCCH format 1b) performed to implicitly indicate ACK/NACK information is implicitly assigned to the mobile station apparatus 5 based on the CCE used for the PDCCH. When a PDCCH is detected only in a primary cell with a setting having been made to transmit the second PUCCH (PUCCH format 3) basically using DFT-Spread-OFDM method and using Cell aggregation, the resource to be used for the first PUCCH (PUCCH format 1a, the PUCCH format 1b) of a signal configuration used for a case where DFT-Spread-OFDM method is not used and Cell aggregation is not used is implicitly assigned based on the CCE used for the PDCCH. Implicit resource assignment means that resource assignment is performed diverting other information, without using information just for assigning a resource. On the other hand, explicit resource assignment means that resource assignment is performed using information just for assigning a resource.

Association between a CCE and a first PUCCH resource used for transmitting an ACK/NACK will be described. All the CCEs in a downlink component carrier are provided with identification numbers based on a predetermined rule. All the first PUCCH resources formed in an uplink component carrier of a primary cell and used for transmitting an ACK/NACK are provided with identification numbers based on a predetermined rule. For example, a CCE and a first PUCCH resource having a same identification number are associated with each other.

FIG. 14 illustrates the configuration and the number of first PUCCH resources for ACK/NACK of the communication system according to an embodiment of the present invention. FIG. 14 shows a case where 24 first PUCCH resources for ACK/NACK are formed in each uplink radio frame. In addition, FIG. 14 shows a case where two uplink physical resource block pairs (PRB pair) (PRB pair1, PRB pair2), four code sequences in the frequency domain (Code in the frequency domain) (Code 1 in the frequency domain, Code 2 in the frequency domain, Code 3 in the frequency domain, and Code 4 in the frequency domain), three code sequences in the time domain (Code in the time domain) (Code 1 in the time domain, Code 2 in the time domain, and Code 3 in the time domain) are used for the first PUCCH resources for ACK/NACK. A different number, from that shown in FIG. 14, of uplink physical resource block pairs, of code sequences in the frequency domain, or of code sequences in the time domain may be used, and a different number, from that shown in FIG. 14, of the first PUCCH resources may be formed in the uplink component carrier. The number of uplink physical resource block pair shown here indicates the number of uplink physical resource block pair used for the first PUCCH resource for ACK/NACK, but not uniquely indicate the number of uplink physical resource block pair having the lowest frequency in the uplink system band, for example. The first PUCCH resources shown in FIG. 14 include different combinations of uplink physical resource block pairs, code sequences in the frequency domain, and code sequences in the time domain, and are in an orthogonal relation in the frequency domain, the code domain in the frequency domain, or the code domain in the time domain.

The CCEs shown in FIG. 12 and the first PUCCH resources for ACK/NACK shown in FIG. 14 are associated with each other based on a predetermined rule. Identification numbers of the CCEs and identification numbers of the first PUCCH resources for ACK/NACK are preliminarily associated with each other such that, for example, a CCE and a first PUCCH resource for ACK/NACK having a same identification number are associated with each other. For example, CCE 1 corresponds to the PUCCH 1, and CCE 2 corresponds to the PUCCH 2. The mobile station apparatus 5 uses the first PUCCH resource of a number corresponding to the CCE having the smallest number, among the CCEs used for the PDCCH on which DCI addressed to its own apparatus has been detected, to transmit ACK/NACK for the data of a PDSCH for which resource assignment has been indicated by the PDCCH. For example, the mobile station apparatus 5 allocates a modulated signal to the first PUCCH resource of a number corresponding to the CCE having the smallest number, among the CCEs used for the PDCCH on which DCI addressed to its own apparatus has been detected, and transmits the signal. This operation is performed by the mobile station apparatus 5 when Cell aggregation is not used, or when Cell aggregation is used and a PDCCH is detected only in a primary cell. In addition, for example, the mobile station apparatus 5 uses the first PUCCH resource of a number corresponding to the CCE having the smallest number among the CCEs used for the PDCCH on which DCI addressed to its own apparatus has been detected for selection of the first PUCCH resource performed to implicitly indicate ACK/NACK information, to transmit the selected first PUCCH resource together with a modulated signal allocated therein. This operation is performed by the mobile station apparatus 5 when Cell aggregation is used, a setting of using ACK/NACK channel selection has been made, and the PDCCH is detected only in a primary cell, or when Cell aggregation is used, a setting of using ACK/NACK channel selection has been made, and the PDCCH is detected in both a primary cell and a secondary cell. The base station apparatus 3 recognizes the association between a CCE and the first PUCCH resource for ACK/NACK as with the mobile station apparatus 5, and assigns a CCE to be used for the PDCCH, considering the first PUCCH resource for ACK/NACK to be assigned to the mobile station apparatus 5. In other words, the mobile station apparatus 5 recognizes the first PUCCH resource for ACK/NACK assigned to its own apparatus, based on the CCE used for the PDCCH on which DCI addressed to its own apparatus has been detected.

The first PUCCH resources used in explicit resource assignment also include different combinations of uplink physical resource block pairs, code sequences in the frequency domain, and code sequences in the time domain, as with FIG. 14. The second PUCCH resources used in explicit resource assignment include different combinations of uplink physical resource block pairs, and code sequences in the time domain. The second PUCCH resources used in explicit resource assignment, the first PUCCH resources used in explicit resource assignment, and the first PUCCH resources used in implicit resource assignment include different uplink physical resource block pairs.

<Transmission Method of an ACK/NACK>

When Cell aggregation is not used, the mobile station apparatus 5 transmits a signal obtained by modulating information indicating an ACK or NACK, using a first PUCCH resource associated with the CCE used for the PDCCH on which DCI addressed to its own apparatus has been detected. In other words, when Cell aggregation is not used, the mobile station apparatus 5 transmits the PUCCH format 1a or the PUCCH format 1b using a resource assigned by implicit resource assignment.

When Cell aggregation is used and ACK/NACK channel selection has been set, the mobile station apparatus 5 selects a resource basically from a plurality of the first PUCCH resources, and transmits a signal obtained by modulating ACK/NACK information. In other words, when Cell aggregation is used and ACK/NACK channel selection has been set, the mobile station apparatus 5 transmits the PUCCH format 1b using a resource assigned by implicit resource assignment and/or explicit resource assignment. In ACK/NACK channel selection, ACK/NACK information is implicitly indicated by selecting a resource from a plurality of the first PUCCH resources, and ACK/NACK information is explicitly indicated by transmitting the modulated signal. In ACK/NACK channel selection, the mobile station apparatus 5 can notify the base station apparatus 3 of a plurality of pieces of ACK/NACK information by using two types of information presentation method together. The information indicated in ACK/NACK channel selection is one or more pieces of ACK/NACK information for data of one or more PDSCHs indicating assignment of a resource by a downlink assignment included in one or more PDCCHs received in a same subframe.

Candidates of selection of a resource used for implicitly indicating ACK/NACK information of an ACK/NACK channel selection are assigned implicitly or explicitly. When the PDCCH is detected only in a primary cell, the mobile station apparatus 5 uses the first PUCCH resource implicitly assigned based on the CCE of each PDCCH as a candidate for ACK/NACK channel selection of a resource to be used for implicitly indicating ACK/NACK information. When only one PDCCH is detected only in a primary cell, the mobile station apparatus 5 does not implicitly indicate ACK/NACK information by selecting a resource, but only explicitly indicates ACK/NACK information by transmitting the modulated signal. When the PDCCH is detected in a primary cell and a secondary cell, the mobile station apparatus 5 uses the first PUCCH resource implicitly assigned based on the CCE of one or more PDCCHs of the primary cell and the first PUCCH resource explicitly assigned in one or more PDCCHs of the secondary cell as a candidate of selecting a resource used for implicitly indicating ACK/NACK information of an ACK/NACK channel selection. The PDCCH of a secondary cell explicitly includes information indicating the first PUCCH resource. Candidates of a plurality of the first PUCCH resources are preliminarily assigned to the mobile station apparatus 5 by RRC signaling, and one of the candidates of a plurality of the first PUCCH resources which are set by RRC signaling using information included in the PDCCH of a secondary cell are shown. Here, instead of explicitly including information indicating the first PUCCH resource in the PDCCH of a secondary cell, the first PUCCH resource may be explicitly assigned beforehand by RRC signaling, and the first PUCCH resource which has been explicitly assigned beforehand in a case where the PDCCH is detected in a secondary cell may be used as a candidate of selection of a resource used for implicitly indicating ACK/NACK information of an ACK/NACK channel selection. When the PDCCH is detected only in a secondary cell, the mobile station apparatus 5 uses the first PUCCH resource explicitly assigned in one or more PDCCHs of a secondary cell as a candidate of selection of a resource used for implicitly indicating ACK/NACK information of an ACK/NACK channel selection. When only one PDCCH is detected only in a secondary cell, the mobile station apparatus 5 does not implicitly indicate ACK/NACK information by selecting a resource, but only explicitly indicates ACK/NACK information by transmitting the modulated signal by the first PUCCH resource indicated by the PDCCH.

As the control information indicating the first PUCCH resource included in the PDCCH, control information which is usually used for other purposes may be diverted. Here, diverting control information means that the control information field for a first case is interpreted as first control information and that for a second case is interpreted as second control information, with the first case being different from the second case and the first control information being different from the second control information. For example, when the PDCCH is transmitted via a primary cell, a control information field interpreted as control information (TPC command) indicating a transmit power control value of the PUCCH may be interpreted as control information indicating a candidate of selection of the first PUCCH resource used for implicitly indicating ACK/NACK information when the PDCCH is transmitted via a secondary cell.

When Cell aggregation is used and a setting has been made to transmit an ACK/NACK using the second PUCCH using a DFT-Spread-OFDM method, the mobile station apparatus 5 modulates ACK/NACK information basically by one of the second PUCCH resources assigned, and further transmits the signal modulated by DFT-Spread-OFDM. In other words, when Cell aggregation is used and a setting has been made to transmit an ACK/NACK using the second PUCCH using the DFT-Spread-OFDM method, the mobile station apparatus 5 either transmits the PUCCH format 3 using a resource assigned by explicit resource assignment, or transmits the PUCCH format 1a or the PUCCH format 1b using a resource assigned by implicit resource assignment. With the transmission method using a DFT-Spread-OFDM method, all of a plurality of pieces of ACK/NACK information is explicitly indicated but information is not implicitly indicated by selection of a resource.

The control information indicating the second PUCCH resource is included in a PDCCH including a downlink assignment for a PDSCH in a secondary cell. The PDCCH including the control information indicating the second PUCCH resource is transmitted via a primary cell and/or a secondary cell. When the PDCCH is detected only in a primary cell and the PDSCH is received only in a primary cell, the mobile station apparatus 5 modulates ACK/NACK information by the first PUCCH resource implicitly assigned based on the CCE of the PDCCH, and transmits a signal which is not modulated by DFT-Spread-OFDM (PUCCH format 1a or PUCCH format 1b). When the PDCCH is detected only in a primary cell and the PDSCH is received only in a secondary cell, the mobile station apparatus 5 modulates ACK/NACK information by the second PUCCH resource indicated in the control information of the PDCCH, and further transmits a signal modulated by DFT-Spread-OFDM (PUCCH format 3). When the PDCCH is detected in a primary cell and a secondary cell and the PDSCH is received at least in a secondary cell, the mobile station apparatus 5 modulates ACK/NACK information by the second PUCCH resource indicated in the control information of the PDCCH, and further transmits a signal modulated by DFT-Spread-OFDM (PUCCH format 3). When the PDCCH is detected in a secondary cell and the PDSCH is received only in a secondary cell, the mobile station apparatus 5 modulates ACK/NACK information by the second PUCCH resource indicated in the control information of the PDCCH and further transmits a signal modulated by DFT-Spread-OFDM (PUCCH format 3).

<Example of an ACK/NACK Channel Selection>

Figure 15:
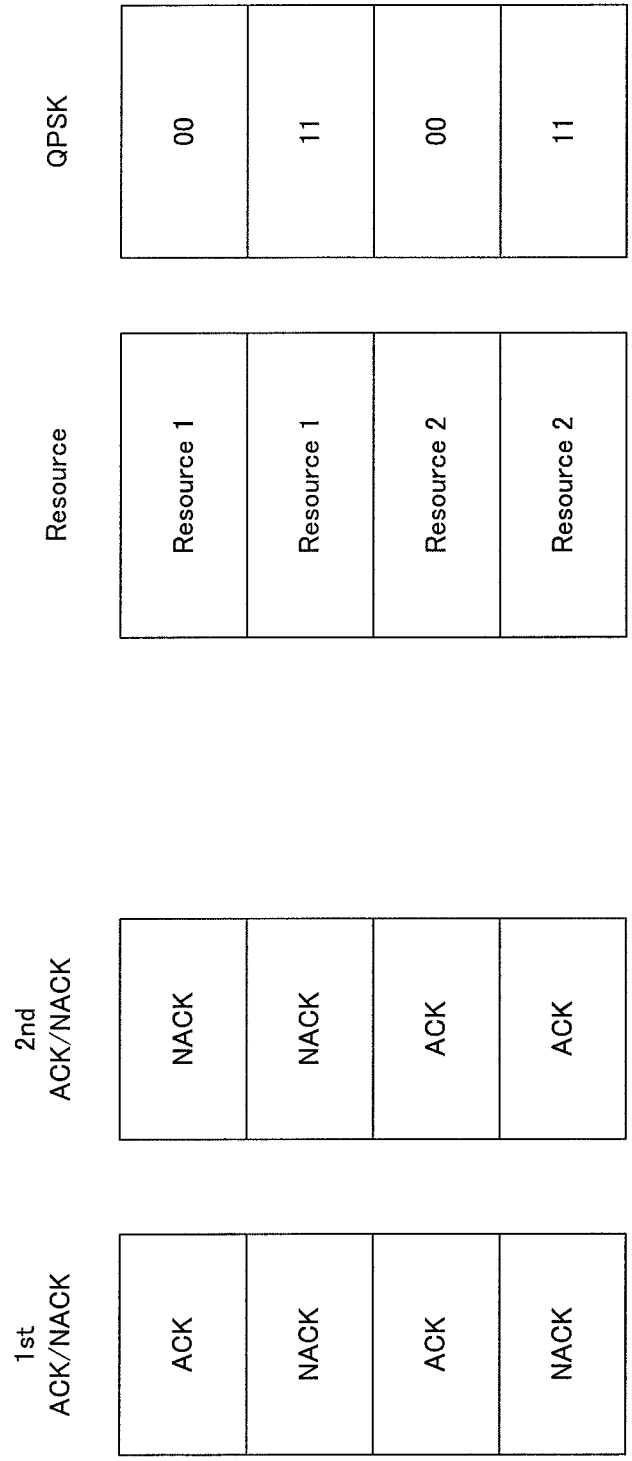
FIG. 15 is an explanatory diagram of a relation among ACK/NACK information, resources selected by ACK/NACK channel selection, and a signal point of the QPSK of the communication system according to an embodiment of the present invention.

An example of an ACK/NACK channel selection will be described. First, a case will be described where two cells are used for Cell aggregation and a single data transmission is performed in each cell. A single data transmission means that signals are transmitted by a single antenna port without using spatial multiplexing according to MIMO (Multi-Input Multi-Output) for transmitting the PDSCH. In this case, 2-bit ACK/NACK information is indicated using the first PUCCH. Four types of information indicated by 2 bits are divided into two groups, each group including two types of information. Which group is indicated as information implicitly indicated by selection of two of the first PUCCH resources, and what type of information in a group is indicated by a signal point of the QPSK. FIG. 15 is an explanatory diagram of a relation among ACK/NACK information, resources selected by ACK/NACK channel selection, and a signal point of the QPSK of the communication system according to an embodiment of the present invention. In FIG. 15, the 1st ACK/NACK indicates ACK/NACK information for a PDSCH of a primary cell and the 2nd ACK/NACK indicates ACK/NACK information for a PDSCH of a secondary cell. In FIG. 15, a Resource 1 is assigned based on a PDCCH including a downlink assignment corresponding to a PDSCH of a primary cell, and a Resource 2 is assigned based on a PDCCH including a downlink assignment corresponding to a PDSCH of a secondary cell. Since a PDCCH including a downlink assignment corresponding to a PDSCH of a primary cell is transmitted only via a primary cell, a resource assigned by implicit resource assignment based on the CCE of the PDCCH is used as the Resource 1. When a PDCCH including a downlink assignment corresponding to a PDSCH of a secondary cell is transmitted via a primary cell, a resource assigned by implicit resource assignment based on the CCE of the PDCCH is used as the Resource 2. When a PDCCH including a downlink assignment corresponding to a PDSCH of a secondary cell is transmitted via a secondary cell, a resource assigned by explicit resource assignment based on the control information explicitly included in the PDCCH is used as the Resource 2.

When indicating an ACK to a PDSCH of a primary cell and a NACK to a PDSCH of a secondary cell, the mobile station apparatus 5 selects the Resource 1 and transmits a signal generated from the QPSK of a "00" signal point. When indicating a NACK to a PDSCH of a primary cell and a NACK to a PDSCH of a secondary cell, the mobile station apparatus 5 selects the Resource 1 and transmits a signal generated from the QPSK of a "11" signal point. When indicating an ACK to a PDSCH of a primary cell and an ACK to a PDSCH of a secondary cell, the mobile station apparatus 5 selects the Resource 2 and transmits a signal generated from the QPSK of the "00" signal point. When signaling a NACK to a PDSCH of a primary cell and an ACK to a PDSCH of a secondary cell, the mobile station apparatus 5 selects the Resource 2 and transmits a signal generated from the QPSK of the "11" signal point.

Figure 16:
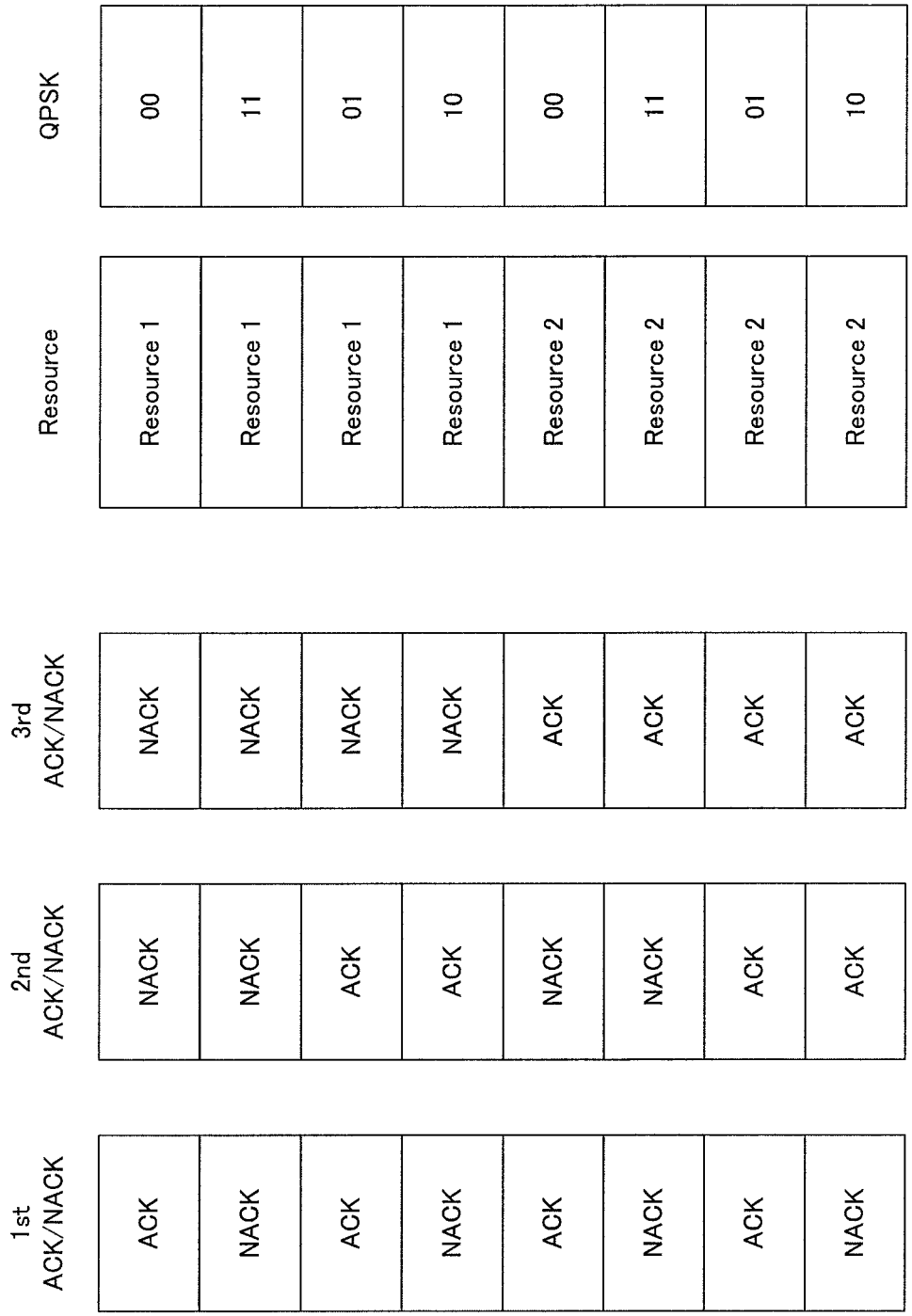
FIG. 16 is an explanatory diagram of a relation among ACK/NACK information, resources selected by ACK/NACK channel selection, and a signal point of the QPSK of a communication system according to an embodiment of the present invention.

Next, a case will be described where two cells are used for Cell aggregation, and two data transmissions are performed in a primary cell and a single data transmission is performed in a secondary cell. Two data transmissions mean that spatial multiplexing according to MIMO is used for transmitting the PDSCH, and signals of two sequences are simultaneously transmitted via a plurality of antenna ports. In this case, 3-bit ACK/NACK information is indicated using the first PUCCH. Eight types of information indicated by 3 bits are divided into two groups, each group including four types of information. Which group is indicated as information implicitly indicated by selection of the first PUCCH resource, and what type of information in a group is indicated by a signal point of the QPSK. FIG. 16 is an explanatory diagram of a relation among ACK/NACK information, resources selected by ACK/NACK channel selection, and a signal point of the QPSK of a communication system according to an embodiment of the present invention. In FIG. 16, the 1st ACK/NACK indicates ACK/NACK information for a first data sequence of a PDSCH of a primary cell, the 2nd ACK/NACK indicates ACK/NACK information for a second data sequence of a PDSCH of a primary cell, and the 3rd ACK/NACK indicates ACK/NACK information for a PDSCH of a secondary cell. In FIG. 16, the Resource 1 is assigned based on a PDCCH including a downlink assignment corresponding to a PDSCH of a primary cell, and the Resource 2 is assigned based on a PDCCH including a downlink assignment corresponding to a PDSCH of a secondary cell. Since a PDCCH including a downlink assignment corresponding to a PDSCH of a primary cell is transmitted only via a primary cell, a resource assigned by implicit resource assignment based on the CCE of the PDCCH is used as Resource 1. When a PDCCH including a downlink assignment corresponding to a PDSCH of a secondary cell is transmitted via a primary cell, a resource assigned by implicit resource assignment based on the CCE of the PDCCH is used as the Resource 2. When a PDCCH including a downlink assignment corresponding to a PDSCH of a secondary cell is transmitted via a secondary cell, a resource assigned by explicit resource assignment based on the control information explicitly included in the PDCCH is used as the Resource 2.

When indicating an ACK to a first data sequence of a PDSCH of a primary cell, a NACK to a second data sequence of a PDSCH of a primary cell, and a NACK to a PDSCH of a secondary cell, the mobile station apparatus 5 selects the Resource 1 and transmits a signal generated from a QPSK of a "00" signal point. When indicating a NACK to a first data sequence of a PDSCH of a primary cell, a NACK to a second data sequence of a PDSCH of a primary cell, and a NACK to a PDSCH of a secondary cell, the mobile station apparatus 5 selects the Resource 1 and transmits a signal generated from a QPSK of a "11" signal point. When indicating an ACK to a first data sequence of a PDSCH of a primary cell, an ACK to a second data sequence of a PDSCH of a primary cell, and a NACK to a PDSCH of a secondary cell, the mobile station apparatus 5 selects the Resource 1 and transmits a signal generated from a QPSK of a "01" signal point. When indicating an ACK to a first data sequence of a PDSCH of a primary cell, a NACK to a second data sequence of a PDSCH of a primary cell, and a NACK to a PDSCH of a secondary cell, the mobile station apparatus 5 selects the Resource 1 and transmits a signal generated from a QPSK of a "10" signal point. When indicating an ACK to a first data sequence of a PDSCH of a primary cell, a NACK to a second data sequence of a PDSCH of a primary cell, and an ACK to a PDSCH of a secondary cell, the mobile station apparatus 5 selects the Resource 2 and transmits a signal generated from the QPSK of the "00" signal point. When indicating a NACK to a first data sequence of a PDSCH of a primary cell, a NACK to a second data sequence of a PDSCH of a primary cell, and an ACK to a PDSCH of a secondary cell, the mobile station apparatus 5 selects the Resource 2 and transmits a signal generated from the QPSK of the "11" signal point. When indicating an ACK to a first data sequence of a PDSCH of a primary cell, an ACK to a second data sequence of a PDSCH of a primary cell, and an ACK to a PDSCH of a secondary cell, the mobile station apparatus 5 selects the Resource 2 and transmits a signal generated from the QPSK of the "01" signal point. When indicating a NACK to a first data sequence of a PDSCH of a primary cell, an ACK to a second data sequence of a PDSCH of a primary cell, and an ACK to a PDSCH of a secondary cell, the mobile station apparatus selects the Resource 2 and transmits a signal generated from the QPSK of the "10" signal point.

Next, a case will be described where two cells are used for Cell aggregation, and a single data transmission is performed in a primary cell and two data transmissions are performed in a secondary cell. In this case, 3-bit ACK/NACK information is indicated using the first PUCCH. Eight types of information indicated by 3 bits are divided into three groups, each group including two or four types of information. Which group is indicated as information implicitly indicated by selection of the first PUCCH resource, and what type of information in a group is indicated by a signal point of the QPSK. FIG. 17 is an explanatory diagram of a relation among ACK/NACK information, resources selected by ACK/NACK channel selection, and a signal point of the QPSK of the communication system according to an embodiment of the present invention. In FIG. 17, the 1st ACK/NACK indicates ACK/NACK information for a PDSCH of a primary cell, the 2nd ACK/NACK indicates ACK/NACK information for a first data sequence of a PDSCH of a secondary cell, and the 3rd ACK/NACK indicates ACK/NACK information for a second data sequence of a PDSCH of a secondary cell. In FIG. 17, the Resource 1 is assigned based on a PDCCH including a downlink assignment corresponding to a PDSCH of a primary cell, and the Resource 2 and a Resource 3 are assigned based on a PDCCH including a downlink assignment corresponding to a PDSCH of a secondary cell. Since a PDCCH including a downlink assignment corresponding to a PDSCH of a primary cell is transmitted only via a primary cell, a resource assigned by implicit resource assignment based on the CCE of the PDCCH is used as the Resource 1. When a PDCCH including a downlink assignment corresponding to a PDSCH of a secondary cell is transmitted via a primary cell, a resource assigned by implicit resource assignment based on the CCE of the PDCCH is used as the Resource 2 and the Resource 3. Here, first PUCCH resource having an identification number resulting from shifting the identification number by a predetermined value relative to the first PUCCH resource used as the Resource 2 is used as the Resource 3. For example, the first PUCCH resource having the same identification number as the CCE having the smallest number is used as the Resource 2, and the first PUCCH resource having an identification number resulting from shifting the identification number by a value of +1 relative to the first PUCCH resource used as the Resource 2 is used as the Resource 3. When a PDCCH including a downlink assignment corresponding to a PDSCH of a secondary cell is transmitted via a secondary cell, a resource assigned by explicit resource assignment based on the control information explicitly included in the PDCCH is used as the Resource 2 and the Resource 3. Here, the resource of the Resource 2 is explicitly indicated based on control information explicitly included in the PDCCH, and the first PUCCH resource having an identification number resulting from shifting the identification number by a predetermined value relative to the first PUCCH resource used as the Resource 2 is used as the Resource 3. For example, the first PUCCH resource having an identification number resulting from shifting the identification number by a value of +1 relative to the first PUCCH resource used as the Resource 2 is used as the Resource 3. Alternatively, a resource candidate for the Resource 2 and a resource candidate for the Resource 3 are preliminarily set by RRC signaling, respectively, and control information indicating a resource from respective resource candidates is indicated in the PDCCH. There may be a configuration in which a single piece of common control information is included in the PDCCH as control information indicating a resource from the resource candidates for the Resource 2 and control information indicating a resource from resource candidates for the Resource 3.

When indicating an ACK to a PDSCH of a primary cell, a NACK to a first data sequence of a PDSCH of a secondary cell, and a NACK to a second data sequence of a PDSCH of a secondary cell, the mobile station apparatus 5 selects the Resource 1 and transmits a signal generated from a QPSK of a "00" signal point. When indicating a NACK to a PDSCH of a primary cell, a NACK to a first data sequence of a PDSCH of a secondary cell, and a NACK to a second data sequence of a PDSCH of a secondary cell, the mobile station apparatus 5 selects the Resource 1 and transmits a signal generated from a QPSK of a "11" signal point. When indicating an ACK to a PDSCH of a primary cell, an ACK to a first data sequence of a PDSCH of a secondary cell, and a NACK to a second data sequence of a PDSCH of a secondary cell, the mobile station apparatus 5 selects the Resource 2 and transmits a signal generated from a QPSK of the "00" signal point. When indicating a NACK to a PDSCH of a primary cell, an ACK to a first data sequence of a PDSCH of a secondary cell, and a NACK to a second data sequence of a PDSCH of a secondary cell, the mobile station apparatus 5 selects the Resource 2 and transmits a signal generated from a QPSK of the "11" signal point. When indicating an ACK to a PDSCH of a primary cell, a NACK to a first data sequence of a PDSCH of a secondary cell, and an ACK to a second data sequence of a PDSCH of a secondary cell, the mobile station apparatus 5 selects the Resource 3 and transmits a signal generated from a QPSK of the "00" signal point. When indicating a NACK to a PDSCH of a primary cell, a NACK to a first data sequence of a PDSCH of a secondary cell, and an ACK to a second data sequence of a PDSCH of a secondary cell, the mobile station apparatus 5 selects the Resource 3 and transmits a signal generated from a QPSK of the "11" signal point. When indicating an ACK to a PDSCH of a primary cell, an ACK to a first data sequence of a PDSCH of a secondary cell, and an ACK to a second data sequence of a PDSCH of a secondary cell, the mobile station apparatus 5 selects the Resource 3 and transmits a signal generated from a QPSK of a "01" signal point. When indicating a NACK to a PDSCH of a primary cell, an ACK to a first data sequence of a PDSCH of a secondary cell, and an ACK to a second data sequence of a PDSCH of a secondary cell, the mobile station apparatus 5 selects the Resource 3 and transmits a signal generated from a QPSK of a "10" signal point.

Next, a case will be described where two cells are used for Cell aggregation, and two data transmissions are performed in a primary cell and two data transmissions are performed in a secondary cell. In this case, 4-bit ACK/NACK information is indicated using the first PUCCH. 16 types of information indicated by 4 bits are divided into four groups, each group including four types of information. Which group is indicated as information implicitly indicated by selection of the first PUCCH resource, and what type of information in a group is indicated by a signal point of the QPSK. FIG. 18 is an explanatory diagram of a relation among ACK/NACK information, resources selected by ACK/NACK channel selection, and a signal point of the QPSK of the communication system according to an embodiment of the present invention. In FIG. 18, the 1st ACK/NACK indicates ACK/NACK information for a first data sequence of a PDSCH of a primary cell, the 2nd ACK/NACK indicates ACK/NACK information for a second data sequence of a PDSCH of a primary cell, the 3rd ACK/NACK indicates ACK/NACK information for a first data sequence of a PDSCH of a secondary cell, and the 4th ACK/NACK indicates ACK/NACK information for a second data sequence of a PDSCH of a secondary cell. In FIG. 18, the Resource 1 and the Resource 2 are assigned based on a PDCCH including a downlink assignment corresponding to a PDSCH of a primary cell, and the Resource 3 and a Resource 4 are assigned based on a PDCCH including a downlink assignment corresponding to a PDSCH of a secondary cell. Since a PDCCH including a downlink assignment corresponding to a PDSCH of a primary cell is transmitted only via a primary cell, a resource assigned by implicit resource assignment based on the CCE of the PDCCH is used as the Resource 1 and the Resource 2. Here, the first PUCCH resource having an identification number resulting from shifting the identification number by a predetermined value relative to the first PUCCH resource used as the Resource 1 is used as the Resource 2. For example, the first PUCCH resource having the same identification number as the CCE having the smallest number is used as the Resource 1, and the first PUCCH resource having an identification number resulting from shifting the identification number by a value of +1 relative to the first PUCCH resource used as the Resource 1 is used as the Resource 2. When a PDCCH including a downlink assignment corresponding to a PDSCH of a secondary cell is transmitted via a primary cell, a resource assigned by implicit resource assignment based on the CCE of the PDCCH is used as the Resource 3 and the Resource 4. Here, the first PUCCH resource having an identification number resulting from shifting the identification number by a predetermined value relative to the first PUCCH resource used as the Resource 3 is used as the Resource 4. For example, the first PUCCH resource having the same identification number as the CCE having the smallest number is used as the Resource 3, and the first PUCCH resource having an identification number resulting from shifting the identification number by a value of +1 relative to the first PUCCH resource used as the Resource 3 is used as the Resource 4. When a PDCCH including a downlink assignment corresponding to a PDSCH of a secondary cell is transmitted via a secondary cell, a resource assigned by explicit resource assignment based on the control information explicitly included in the PDCCH is used as the Resource 3 and the Resource 4. Here, the resource of the Resource 3 is explicitly indicated based on control information explicitly included in the PDCCH, and the first PUCCH resource having an identification number resulting from shifting the identification number by a predetermined value relative to the first PUCCH resource used as the Resource 3 is used as the Resource 4. For example, the first PUCCH resource having an identification number resulting from shifting the identification number by a value of +1 relative to the first PUCCH resource used as the Resource 3 is used as the Resource 4. Alternatively, a resource candidate for the Resource 3 and a resource candidate for the Resource 4 are preliminarily set by RRC signaling respectively, and control information indicating a resource from respective resource candidates is indicated in the PDCCH. There may be a configuration in which a single piece of common control information is included in the PDCCH as control information indicating a resource from resource candidates for the Resource 3 and control information indicating a resource from resource candidates of the Resource 4. When a PDCCH including a downlink assignment corresponding to a PDSCH of a secondary cell is transmitted via a secondary cell, a resource may also be assigned as the Resource 2 by explicit resource assignment based on control information explicitly included in the PDCCH.

When indicating an ACK to a first data sequence of a PDSCH of a primary cell, a NACK to a second data sequence of a PDSCH of a primary cell, a NACK to a first data sequence of a PDSCH of a secondary cell, and a NACK to a second data sequence of a PDSCH of a secondary cell, the mobile station apparatus 5 selects the Resource 1 and transmits a signal generated from a QPSK of a "00" signal point. When indicating a NACK to a first data sequence of a PDSCH of a primary cell, a NACK to a second data sequence of a PDSCH of a primary cell, a NACK to a first data sequence of a PDSCH of a secondary cell, and a NACK to a second data sequence of a PDSCH of a secondary cell, the mobile station apparatus 5 selects the Resource 1 and transmits a signal generated from a QPSK of a "11" signal point. When indicating an ACK to a first data sequence of a PDSCH of a primary cell, a NACK to a second data sequence of a PDSCH of a primary cell, an ACK to a first data sequence of a PDSCH of a secondary cell, and an ACK to a second data sequence of a PDSCH of a secondary cell, the mobile station apparatus 5 selects the Resource 1 and transmits a signal generated from a QPSK of a "01" signal point. When indicating an ACK to a first data sequence of a PDSCH of a primary cell, an ACK to a second data sequence of a PDSCH of a primary cell, an ACK to a first data sequence of a PDSCH of a secondary cell, and a NACK to a second data sequence of a PDSCH of a secondary cell, the mobile station apparatus 5 selects the Resource 1 and transmits a signal generated from a QPSK of a "10" signal point. When indicating an ACK to a first data sequence of a PDSCH of a primary cell, an ACK to a second data sequence of a PDSCH of a primary cell, a NACK to a first data sequence of a PDSCH of a secondary cell, and a NACK to a second data sequence of a PDSCH of a secondary cell, the mobile station apparatus 5 selects the Resource 2 and transmits a signal generated from a QPSK of the "00" signal point. When indicating a NACK to a first data sequence of a PDSCH of a primary cell, an ACK to a second data sequence of a PDSCH of a primary cell, a NACK to a first data sequence of a PDSCH of a secondary cell, and a NACK to a second data sequence of a PDSCH of a secondary cell, the mobile station apparatus 5 selects the Resource 2 and transmits a signal generated from a QPSK of the "11" signal point. When indicating an ACK to a first data sequence of a PDSCH of a primary cell, an ACK to a second data sequence of a PDSCH of a primary cell, an ACK to a first data sequence of a PDSCH of a secondary cell, and an ACK to a second data sequence of a PDSCH of a secondary cell, the mobile station apparatus 5 selects the Resource 2 and transmits a signal generated from a QPSK of the "01" signal point. When indicating a NACK to a first data sequence of a PDSCH of a primary cell, an ACK to a second data sequence of a PDSCH of a primary cell, an ACK to a first data sequence of a PDSCH of a secondary cell, and an ACK to a second data sequence of a PDSCH of a secondary cell, the mobile station apparatus 5 selects the Resource 2 and transmits a signal generated from a QPSK of the "10" signal point. When indicating an ACK to a first data sequence of a PDSCH of a primary cell, a NACK to a second data sequence of a PDSCH of a primary cell, an ACK to a first data sequence of a PDSCH of a secondary cell, and a NACK to a second data sequence of a PDSCH of a secondary cell, the mobile station apparatus 5 selects the Resource 3 and transmits a signal generated from a QPSK of the "00" signal point. When indicating a NACK to a first data sequence of a PDSCH of a primary cell, a NACK to a second data sequence of a PDSCH of a primary cell, an ACK to a first data sequence of a PDSCH of a secondary cell, and a NACK to a second data sequence of a PDSCH of a secondary cell, the mobile station apparatus 5 selects the Resource 3 and transmits a signal generated from a QPSK of the "11" signal point. When indicating a NACK to a first data sequence of a PDSCH of a primary cell, a NACK to a second data sequence of a PDSCH of a primary cell, an ACK to a first data sequence of a PDSCH of a secondary cell, and an ACK to a second data sequence of a PDSCH of a secondary cell, the mobile station apparatus 5 selects the Resource 3 and transmits a signal generated from a QPSK of the "01" signal point. When indicating a NACK to a first data sequence of a PDSCH of a primary cell, an ACK to a second data sequence of a PDSCH of a primary cell, an ACK to a first data sequence of a PDSCH of a secondary cell, and a NACK to a second data sequence of a PDSCH of a secondary cell, the mobile station apparatus 5 selects the Resource 3 and transmits a signal generated from a QPSK of the "10" signal point. When indicating an ACK to a first data sequence of a PDSCH of a primary cell, a NACK to a second data sequence of a PDSCH of a primary cell, an ACK to a first data sequence of a PDSCH of a secondary cell, and a NACK to a second data sequence of a PDSCH of a secondary cell, the mobile station apparatus 5 selects the Resource 4 and transmits a signal generated from a QPSK of the "00" signal point. When indicating a NACK to a first data sequence of a PDSCH of a primary cell, a NACK to a second data sequence of a PDSCH of a primary cell, a NACK to a first data sequence of a PDSCH of a secondary cell, and an ACK to a second data sequence of a PDSCH of a secondary cell, the mobile station apparatus 5 selects the Resource 4 and transmits a signal generated from a QPSK of the "11" signal point. When indicating an ACK to a first data sequence of a PDSCH of a primary cell, an ACK to a second data sequence of a PDSCH of a primary cell, a NACK to a first data sequence of a PDSCH of a secondary cell, and an ACK to a second data sequence of a PDSCH of a secondary cell, the mobile station apparatus 5 selects the Resource 4 and transmits a signal generated from a QPSK of the "01" signal point. When indicating a NACK to a first data sequence of a PDSCH of a primary cell, an ACK to a second data sequence of a PDSCH of a primary cell, a NACK to a first data sequence of a PDSCH of a secondary cell, and an ACK to a second data sequence of a PDSCH of a secondary cell, the mobile station apparatus 5 selects the Resource 4 and transmits a signal generated from a QPSK of the "10" signal point.

Next, a case will be described where three cells are used for Cell aggregation, and a single data transmission is performed in a primary cell and a single data transmission is performed in each secondary cell (secondary cell 1 and secondary cell 2). In this case, 3-bit ACK/NACK information is indicated using the first PUCCH. Eight types of information indicated by 3 bits are divided into three groups, each group including two or four types of information. Which group is indicated as information implicitly indicated by selection of the first PUCCH resource, and what type of information in a group is indicated by a signal point of the QPSK. In this case, although ACK/NACK information, resources selected by ACK/NACK channel selection, and relation of signal points of the QPSK are approximately similar to those of FIG. 17, the 1st ACK/NACK indicates ACK/NACK information for a PDSCH of a primary cell, the 2nd ACK/NACK indicates ACK/NACK information for a PDSCH of the secondary cell 1, and the 3rd ACK/NACK indicates ACK/NACK information for a PDSCH of the secondary cell 2. In addition, resource assignment of a resource candidate used for selecting a resource of the first PUCCH performed for implicitly indicating information differs from what has been described above referring to FIG. 17. The Resource 1 is assigned based on a PDCCH including a downlink assignment corresponding to a PDSCH of a primary cell, the Resource 2 is assigned based on a PDCCH including an downlink assignment corresponding to a PDSCH of the secondary cell 1, and the Resource 3 is assigned based on a PDCCH including a downlink assignment corresponding to a PDSCH of the secondary cell 2. A resource assigned by implicit resource assignment based on the CCE of the PDCCH is used as the Resource 1. When a PDCCH including a downlink assignment corresponding to a PDSCH of the secondary cell 1 is transmitted via a primary cell, a resource assigned by implicit resource assignment based on the CCE of the PDCCH is used as the Resource 2. When a PDCCH including a downlink assignment corresponding to a PDSCH of the secondary cell 1 is transmitted via a secondary cell (secondary cell 1 or secondary cell 2), a resource assigned by explicit resource assignment based on the control information explicitly included in the PDCCH is used as the Resource 2. When a PDCCH including a downlink assignment corresponding to a PDSCH of the secondary cell 2 is transmitted via a primary cell, a resource assigned by implicit resource assignment based on the CCE of the PDCCH is used as the Resource 3. When a PDCCH including a downlink assignment corresponding to a PDSCH of the secondary cell 2 is transmitted via a secondary cell (secondary cell 1 or secondary cell 2), a resource assigned by explicit resource assignment based on the control information explicitly included in the PDCCH is used as the Resource 3.

When indicating an ACK to a PDSCH of a primary cell, a NACK to a PDSCH of the secondary cell 1, and a NACK to a PDSCH of the secondary cell 2, the mobile station apparatus 5 selects the Resource 1 and transmits a signal generated from a QPSK of a "00" signal point. When indicating a NACK to a PDSCH of a primary cell, a NACK to a PDSCH of the secondary cell 1, and a NACK to a PDSCH of the secondary cell 2, the mobile station apparatus 5 selects the Resource 1 and transmits a signal generated from a QPSK of a "11" signal point. When indicating an ACK a PDSCH of a primary cell, an ACK to a PDSCH of the secondary cell 1, and a NACK to a PDSCH of the secondary cell 2, the mobile station apparatus 5 selects the Resource 2 and transmits a signal generated from a QPSK of the "00" signal point. When indicating a NACK to a PDSCH of a primary cell, an ACK to a PDSCH of the secondary cell 1, and a NACK to a PDSCH of the secondary cell 2, the mobile station apparatus 5 selects the Resource 2 and transmits a signal generated from a QPSK of the "11" signal point. When indicating an ACK to a PDSCH of a primary cell, a NACK to a PDSCH of the secondary cell 1, and an ACK to a PDSCH of the secondary cell 2, the mobile station apparatus 5 selects the Resource 3 and transmits a signal generated from a QPSK of the "00" signal point. When indicating a NACK to a PDSCH of a primary cell, a NACK to a PDSCH of the secondary cell 1, and an ACK to a PDSCH of the secondary cell 2, the mobile station apparatus 5 selects the Resource 3 and transmits a signal generated from the QPSK of a "11" signal point. When indicating an ACK to a PDSCH of a primary cell, an ACK to a PDSCH of the secondary cell 1, and an ACK to a PDSCH of the secondary cell 2, the mobile station apparatus 5 selects the Resource 3 and transmits a signal generated from a QPSK of a "01" signal point. When indicating a NACK to a PDSCH of a primary cell, an ACK to a PDSCH of the secondary cell 1, and an ACK to a PDSCH of the secondary cell 2, the mobile station apparatus 5 selects the Resource 3 and transmits a signal generated from a QPSK of a "10" signal point.

Next, a case will be described where three cells are used for Cell aggregation, and two data transmissions are performed in a primary cell and a single data transmission is performed in each secondary cell (secondary cell 1 and secondary cell 2). In this case, 4-bit ACK/NACK information is indicated using the first PUCCH. 16 types of information indicated by 4 bits are divided into four groups, each group including four types of information. Which group is indicated as information implicitly indicated by selection of the first PUCCH resource, and what type of information in a group is indicated by a signal point of the QPSK. In this case, although ACK/NACK information, resources selected by ACK/NACK channel selection, and relation of signal points of the QPSK are approximately similar to those of FIG. 18, the 1st ACK/NACK indicates ACK/NACK information for a first data sequence of a PDSCH of a primary cell, the 2nd ACK/NACK indicates ACK/NACK information for a second data sequence of a PDSCH of a primary cell, the 3rd ACK/NACK indicates ACK/NACK information for a PDSCH of the secondary cell 1, and the 4th ACK/NACK indicates ACK/NACK information for a PDSCH of the secondary cell 2. In addition, resource assignment of a resource candidate used for selecting the first PUCCH resource performed for implicitly indicating information differs from what has been described above referring to FIG. 18. The Resource 1 and the Resource 2 are assigned based on a PDCCH including a downlink assignment corresponding to a PDSCH of a primary cell, the Resource 3 is assigned based on a PDCCH including a downlink assignment corresponding to a PDSCH of the secondary cell 1, and the Resource 4 is assigned based on a PDCCH including a downlink assignment corresponding to a PDSCH of the secondary cell 2. A resources assigned by implicit resource assignment based on the CCE of the PDCCH is used as the Resource 1 and the Resource 2. Here, the first PUCCH resource having an identification number resulting from shifting the identification number by a predetermined value relative to the first PUCCH resource used as the Resource 1 is used as the Resource 2. For example, the first PUCCH resource having the same identification number as the CCE having the smallest number is used as the Resource 1, and the first PUCCH resource having an identification number resulting from shifting the identification number by a value of +1 relative to the first PUCCH resource used as the Resource 1 is used as the Resource 2. When a PDCCH including a downlink assignment corresponding to a PDSCH of the secondary cell 1 is transmitted via a primary cell, a resource assigned by implicit resource assignment based on the CCE of the PDCCH is used as the Resource 3. When a PDCCH including a downlink assignment corresponding to a PDSCH of the secondary cell 1 is transmitted via a secondary cell (secondary cell 1 or secondary cell 2), a resource assigned by explicit resource assignment based on the control information explicitly included in the PDCCH is used as the Resource 3. When a PDCCH including a downlink assignment corresponding to a PDSCH of the secondary cell 2 is transmitted via a primary cell, a resource assigned by implicit resource assignment based on the CCE of the PDCCH is used as the Resource 4. When a PDCCH including a downlink assignment corresponding to a PDSCH of the secondary cell 2 is transmitted via a secondary cell (secondary cell 1 or secondary cell 2), a resource assigned by explicit resource assignment based on the control information explicitly included in the PDCCH is used as the Resource 4.

When indicating an ACK to a first data sequence of a PDSCH of a primary cell, a NACK to a second data sequence of a PDSCH of a primary cell, a NACK to a PDSCH of the secondary cell 1, and a NACK to a PDSCH of the secondary cell 2, the mobile station apparatus 5 selects the Resource 1 and transmits a signal generated from a QPSK of a "00" signal point. When indicating a NACK to a first data sequence of a PDSCH of a primary cell, a NACK to a second data sequence of a PDSCH of a primary cell, a NACK to a PDSCH of the secondary cell 1, and a NACK to a PDSCH of the secondary cell 2, the mobile station apparatus 5 selects the Resource 1 and transmits a signal generated from a QPSK of a "11" signal point. When indicating an ACK to a first data sequence of a PDSCH of a primary cell, a NACK to a second data sequence of a PDSCH of a primary cell, an ACK to a PDSCH of the secondary cell 1, and an ACK to a PDSCH of the secondary cell 2, the mobile station apparatus 5 selects the Resource 1 and transmits a signal generated from a QPSK of a "01" signal point. When indicating an ACK to a first data sequence of a PDSCH of a primary cell, an ACK to a second data sequence of a PDSCH of a primary cell, an ACK to a PDSCH of the secondary cell 1, and a NACK to a PDSCH of the secondary cell 2, the mobile station apparatus 5 selects the Resource 1 and transmits a signal generated from a QPSK of a "10" signal point. When indicating an ACK to a first data sequence of a PDSCH of a primary cell, an ACK to a second data sequence of a PDSCH of a primary cell, a NACK to a PDSCH of the secondary cell 1, and a NACK to a PDSCH of the secondary cell 2, the mobile station apparatus 5 selects the Resource 2 and transmits a signal generated from a QPSK of the "00" signal point. When indicating a NACK to a first data sequence of a PDSCH of a primary cell, an ACK to a second data sequence of a PDSCH of a primary cell, a NACK to a PDSCH of the secondary cell 1, and a NACK to a PDSCH of the secondary cell 2, the mobile station apparatus 5 selects the Resource 2 and transmits a signal generated from a QPSK of the "11" signal point. When indicating an ACK to a first data sequence of a PDSCH of a primary cell, an ACK to a second data sequence of a PDSCH of a primary cell, an ACK to a PDSCH of the secondary cell 1, and an ACK to a PDSCH of the secondary cell 2, the mobile station apparatus 5 selects the Resource 2 and transmits a signal generated from a QPSK of the "01" signal point. When indicating a NACK to a first data sequence of a PDSCH of a primary cell, an ACK to a second data sequence of a PDSCH of a primary cell, an ACK to a PDSCH of the secondary cell 1, and an ACK to a PDSCH of the secondary cell 2, the mobile station apparatus 5 selects the Resource 2 and transmits a signal generated from a QPSK of the "10" signal point. When indicating an ACK to a first data sequence of a PDSCH of a primary cell, a NACK to a second data sequence of a PDSCH of a primary cell, an ACK to a PDSCH of the secondary cell 1, and a NACK to a PDSCH of the secondary cell 2, the mobile station apparatus 5 selects the Resource 3 and transmits a signal generated from a QPSK of the "00" signal point. When indicating a NACK to a first data sequence of a PDSCH of a primary cell, a NACK to a second data sequence of a PDSCH of a primary cell, an ACK to a PDSCH of the secondary cell 1, and a NACK to a PDSCH of the secondary cell 2, the mobile station apparatus 5 selects the Resource 3 and transmits a signal generated from a QPSK of the "11" signal point. When indicating a NACK to a first data sequence of a PDSCH of a primary cell, a NACK to a second data sequence of a PDSCH of a primary cell, an ACK to a PDSCH of the secondary cell 1, and an ACK to a PDSCH of the secondary cell 2, the mobile station apparatus 5 selects the Resource 3 and transmits a signal generated from a QPSK of the "01" signal point. When indicating a NACK to a first data sequence of a PDSCH of a primary cell, an ACK to a second data sequence of a PDSCH of a primary cell, an ACK to a PDSCH of the secondary cell 1, and a NACK to a PDSCH of the secondary cell 2, the mobile station apparatus 5 selects the Resource 3 and transmits a signal generated from a QPSK of the "10" signal point. When indicating an ACK to a first data sequence of a PDSCH of a primary cell, a NACK to a second data sequence of a PDSCH of a primary cell, a NACK to a PDSCH of the secondary cell 1, and an ACK to a PDSCH of the secondary cell 2, the mobile station apparatus 5 selects the Resource 4 and transmits a signal generated from a QPSK of the "00" signal point. When indicating a NACK to a first data sequence of a PDSCH of a primary cell, a NACK to a second data sequence of a PDSCH of a primary cell, a NACK to a PDSCH of the secondary cell 1, and an ACK to a PDSCH of the secondary cell 2, the mobile station apparatus 5 selects the Resource 4 and transmits a signal generated from a QPSK of the "11" signal point. When indicating an ACK to a first data sequence of a PDSCH of a primary cell, an ACK to a second data sequence of a PDSCH of a primary cell, a NACK to a PDSCH of the secondary cell 1, and an ACK to a PDSCH of the secondary cell 2, the mobile station apparatus 5 selects the Resource 4 and transmits a signal generated from a QPSK of the "01" signal point. When indicating a NACK to a first data sequence of a PDSCH of a primary cell, an ACK to a second data sequence of a PDSCH of a primary cell, a NACK to a PDSCH of the secondary cell 1, and an ACK to a PDSCH of the secondary cell 2, the mobile station apparatus 5 selects the Resource 4 and transmits a signal generated from a QPSK of the "10" signal point.

The present invention can also be applied to a case where three cells are used for Cell aggregation, a single data transmission is performed in a primary cell, a single data transmission is performed in one of the secondary cells (secondary cell 1) and two data transmissions are performed in the other secondary cell (secondary cell 2).

Next, a case will be described where four cells are used for Cell aggregation, and a single data transmission is performed in a primary cell and a single data transmission is performed in each secondary cell (secondary cell 1, secondary cell 2, and secondary cell 3). In this case, 4-bit ACK/NACK information is indicated using the first PUCCH. 16 types of information indicated by 4 bits are divided into four groups, each group including four types of information. Which group is indicated as information implicitly indicated by selection of the first PUCCH resource, and what type of information in a group is indicated by a signal point of the QPSK. In this case, although ACK/NACK information, resources selected by ACK/NACK channel selection, and relation of signal points of the QPSK are approximately similar to those of FIG. 18, the 1st ACK/NACK indicates ACK/NACK information to a PDSCH of a primary cell, the 2nd ACK/NACK indicates ACK/NACK information for a PDSCH of the secondary cell 1, the 3rd ACK/NACK indicates ACK/NACK information for a PDSCH of the secondary cell 2, and the 4th ACK/NACK indicates ACK/NACK information for a PDSCH of a secondary cell 3. In addition, resource assignment of a resource candidate used for selecting the first PUCCH resource performed for implicitly indicating information differs from what has been described above referring to FIG. 18. The Resource 1 is assigned based on a PDCCH including a downlink assignment corresponding to a PDSCH of a primary cell, the Resource 2 is assigned based on a PDCCH including an downlink assignment corresponding to a PDSCH of the secondary cell 1, the Resource 3 is assigned based on a PDCCH including a downlink assignment corresponding to a PDSCH of the secondary cell 2, and the Resource 4 is assigned based on a PDCCH including a downlink assignment corresponding to a PDSCH of the secondary cell 3. Since a PDCCH including a downlink assignment corresponding to a PDSCH of a primary cell is transmitted only via a primary cell, a resource assigned by implicit resource assignment based on the CCE of the PDCCH is used as the Resource 1. When a PDCCH including a downlink assignment corresponding to a PDSCH of a secondary cell is transmitted via a primary cell, a resource assigned by implicit resource assignment based on the CCE of the PDCCH is used as the Resource 2, the Resource 3, and the Resource 4. When a PDCCH including a downlink assignment corresponding to a PDSCH of a secondary cell is transmitted via a secondary cell, a resource assigned by explicit resource assignment based on control information explicitly included in the PDCCH is used as the Resource 2, the Resource 3, and the Resource 4.

When indicating an ACK to a PDSCH of a primary cell, a NACK to a PDSCH of the secondary cell 1, a NACK to a PDSCH of the secondary cell 2, and a NACK to a PDSCH of the secondary cell 3, the mobile station apparatus 5 selects the Resource 1 and transmits a signal generated from a QPSK of a "00" signal point. When indicating a NACK to a PDSCH of a primary cell, a NACK to a PDSCH of the secondary cell 1, a NACK to a PDSCH of the secondary cell 2, and a NACK to a PDSCH of the secondary cell 3, the mobile station apparatus 5 selects the Resource 1 and transmits a signal generated from a QPSK of a "11" signal point. When indicating an ACK to a PDSCH of a primary cell, a NACK to a PDSCH of the secondary cell 1, an ACK to a PDSCH of the secondary cell 2, and an ACK to a PDSCH of the secondary cell 3, the mobile station apparatus 5 selects the Resource 1 and transmits a signal generated from a QPSK of a "01" signal point. When indicating an ACK to a PDSCH of a primary cell, an ACK to a PDSCH of the secondary cell 1, an ACK to a PDSCH of the secondary cell 2, and a NACK to a PDSCH of the secondary cell 3, the mobile station apparatus 5 selects the Resource 1 and transmits a signal generated from a QPSK of a "10" signal point. When indicating an ACK to a PDSCH of a primary cell, an ACK to a PDSCH of the secondary cell 1, a NACK to a PDSCH of the secondary cell 2, and a NACK to a PDSCH of the secondary cell 3, the mobile station apparatus 5 selects the Resource 2 and transmits a signal generated from a QPSK of the "00" signal point. When indicating a NACK to a PDSCH of a primary cell, an ACK to a PDSCH of the secondary cell 1, a NACK to a PDSCH of the secondary cell 2, and a NACK to a PDSCH of the secondary cell 3, the mobile station apparatus 5 selects the Resource 2 and transmits a signal generated from a QPSK of the "11" signal point. When indicating an ACK to a PDSCH of a primary cell, an ACK to a PDSCH of the secondary cell 1, an ACK to a PDSCH of the secondary cell 2, and an ACK to a PDSCH of the secondary cell 3, the mobile station apparatus 5 selects the Resource 2 and transmits a signal generated from a QPSK of the "01" signal point. When indicating a NACK to a PDSCH of a primary cell, an ACK to a PDSCH of the secondary cell 1, an ACK to a PDSCH of the secondary cell 2, and an ACK to a PDSCH of the secondary cell 3, the mobile station apparatus selects the Resource 2 and transmits a signal generated from a QPSK of the "10" signal point. When indicating an ACK to a PDSCH of a primary cell, a NACK to a PDSCH of the secondary cell 1, an ACK to PDSCH of the secondary cell 2, and a NACK to a PDSCH of the secondary cell 3, the mobile station apparatus 5 selects the Resource 3 and transmits a signal generated from a QPSK of the "00" signal point. When indicating a NACK to a PDSCH of a primary cell, a NACK to a PDSCH of the secondary cell 1, an ACK to a PDSCH of the secondary cell 2, and a NACK to a PDSCH of the secondary cell 3, the mobile station apparatus 5 selects the Resource 3 and transmits a signal generated from a QPSK of the "11" signal point. When indicating a NACK to a PDSCH of a primary cell, a NACK to a PDSCH of the secondary cell 1, an ACK to a PDSCH of the secondary cell 2, and an ACK to a PDSCH of the secondary cell 3, the mobile station apparatus 5 selects the Resource 3 and transmits a signal generated from a QPSK of the "01" signal point. When indicating a NACK to a PDSCH of a primary cell, an ACK to a PDSCH of the secondary cell 1, an ACK to a PDSCH of the secondary cell 2, and a NACK to a PDSCH of the secondary cell 3, the mobile station apparatus 5 selects the Resource 3 and transmits a signal generated from a QPSK of the "10" signal point. When indicating an ACK to a PDSCH of a primary cell, a NACK to a PDSCH of the secondary cell 1, an ACK to a PDSCH of the secondary cell 2, and a NACK to a PDSCH of the secondary cell 3, the mobile station apparatus 5 selects the Resource 4 and transmits a signal generated from a QPSK of the "00" signal point. When indicating a NACK to a PDSCH of a primary cell, a NACK to a PDSCH of the secondary cell 1, a NACK to a PDSCH of the secondary cell 2, and an ACK to a PDSCH of the secondary cell 3, the mobile station apparatus 5 selects the Resource 4 and transmits a signal generated from a QPSK of the "11" signal point. When indicating an ACK to a PDSCH of a primary cell, an ACK to a PDSCH of the secondary cell 1, a NACK to a PDSCH of the secondary cell 2, and an ACK to a PDSCH of the secondary cell 3, the mobile station apparatus 5 selects the Resource 4 and transmits a signal generated from a QPSK of the "01" signal point. When indicating a NACK to a PDSCH of a primary cell, an ACK to a PDSCH of the secondary cell 1, a NACK to a PDSCH of the secondary cell 2, and an ACK to a PDSCH of the secondary cell 3, the mobile station apparatus 5 selects the Resource 4 and transmits a signal generated from a QPSK of the "10" signal point.

With regard to ACK/NACK information, resources selected by ACK/NACK channel selection, configuration of Cell aggregation set about relation of signal points of the QPSK, the mobile station apparatus 5 selects which relation will be applied, according to the transmission mode. Configuration of Cell aggregation includes the number of cells used for Cell aggregation and setting of a primary cell and a secondary cell. The transmission mode is a setting as to whether a single data transmission is performed or basically two data transmissions are performed in each cell. In other words, the transmission mode refers to the largest amount of data that can be transmitted in a downlink subframe. Even if the transmission mode of basically performing two data transmissions has been set, single-data or two-data transmission may be performed for each downlink subframe. If the transmission mode of performing a single data transmission has been set, only single data is transmitted and two pieces of data will not be transmitted in any downlink subframe.

When the corresponding ACK/NACK information is not detected, the mobile station apparatus 5 sets information of the corresponding ACK/NACK to be a NACK and performs ACK/NACK channel selection. If there is not much data to transmit to the mobile station apparatus 5, or assignment of a resource to other mobile station apparatuses 5 has a higher priority, the base station apparatus 3 may perform transmission only in a part of the cells, without performing data transmission in all the cells which have been set in the mobile station apparatus 5. In such a case, the mobile station apparatus 5 neither detects a PDCCH corresponding to the PDSCH of a part of the cells nor can detect ACK/NACK information corresponding to the PDSCH of a part of the cells. In addition, even if the base station apparatus 3 has transmitted a PDCCH, the mobile station apparatus 5 may not be able to detect a PDCCH corresponding to the PDSCH of a part of the cells if the channel environment is poor due to effect of interference, fading or the like. Also in such a case, the mobile station apparatus cannot detect ACK/NACK information corresponding to the PDSCH of a part of the cells. For example, if a PDCCH corresponding to a PDSCH of a primary cell has been detected but no PDCCH corresponding to a PDSCH of a secondary cell has been detected in the mobile station apparatus 5 to which the relation among ACK/NACK information, resources selected by ACK/NACK channel selection, and signal points of the QPSK shown in FIG. 15 is applied, the mobile station apparatus 5 sets the 2nd ACK/NACK to be a NACK and performs ACK/NACK channel selection.

Here, the ACK/NACK information transmitted by a PUCCH (PUCCH format 3) using DFT-Spread-OFDM method is an aggregation of all the information of, for example, the 1st ACK/NACK, the 2nd ACK/NACK, the 3rd ACK/NACK, and the 4th ACK/NACK shown in FIG. 18, and is explicitly indicated by a modulated signal. The 1st ACK/NACK, the 2nd ACK/NACK, the 3rd ACK/NACK, and the 4th ACK/NACK are ACKs/NACKs for the data of a PDSCH in which assignment of a resource is indicated by downlink assignments included in PDCCHs received in a same subframe.

<Resource of PUCCH Used for Transmission Diversity>

In order to transmit PUCCH with transmission diversity, two transmitting antennas (first transmitting antenna and second transmitting antenna) are used. A resource similar to the case of transmitting a PUCCH via a single transmitting antenna, without transmission diversity being applied, is used as the resource of the PUCCH to be used for the first transmitting antenna. Since the mobile station apparatus 5 of the present invention controls so as to apply transmission diversity when a resource assigned by implicit resource assignment is used, and controls so as not to apply transmission diversity when a resource assigned by explicit resource assignment is used, the resource of the PUCCH used for the first transmitting antenna is assigned by implicit resource assignment. A resource having the next identification number to the resource of the PUCCH used for the first transmitting antenna is used as the resource of the PUCCH used for the second transmitting antenna.

<Overall Configuration of Base Station Apparatus 3>

Figure 2:
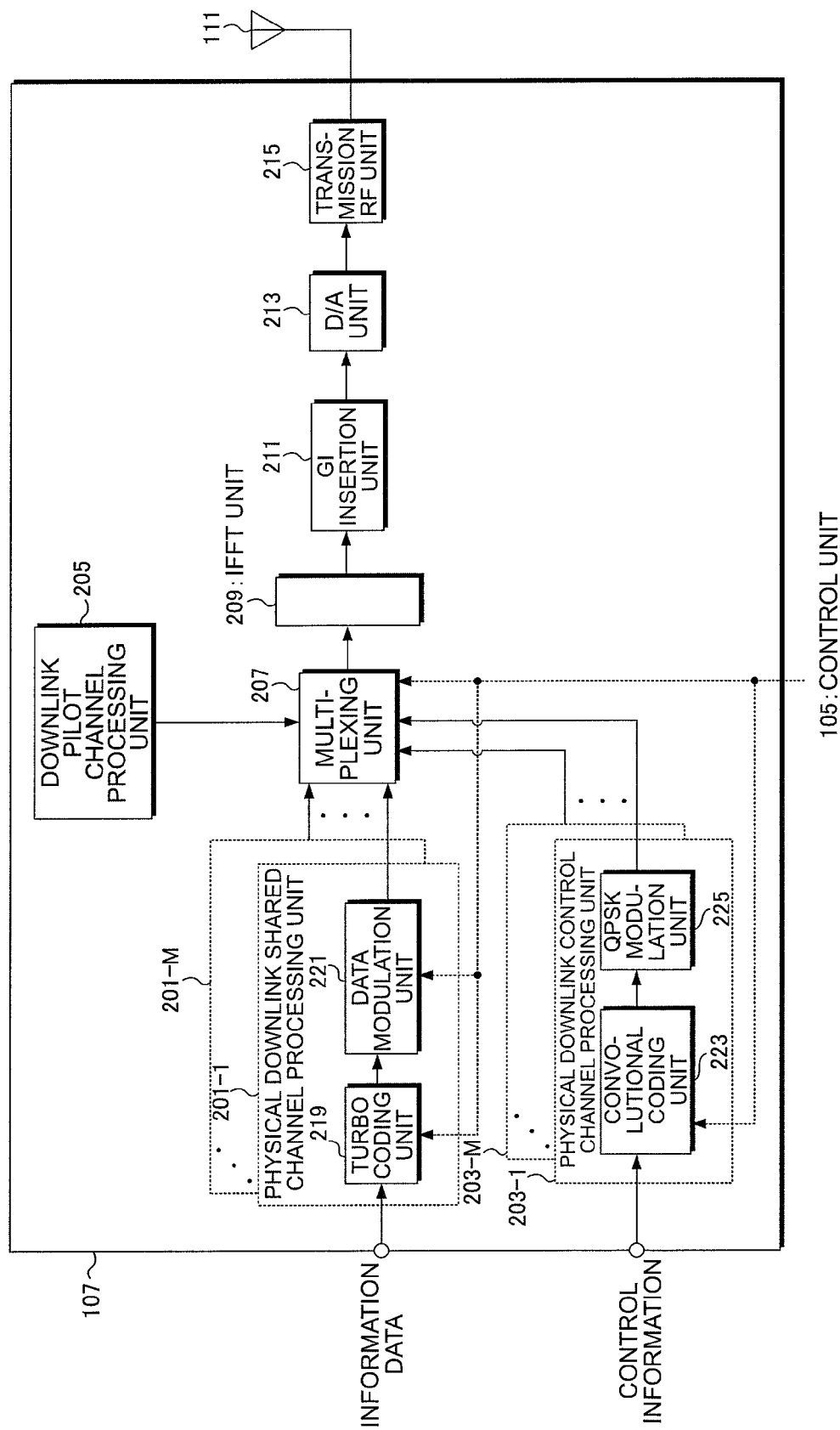
FIG. 2 is a schematic block diagram illustrating a configuration of a transmission processing unit 107 of the base station apparatus 3 according to an embodiment of the present invention.
Figure 3:
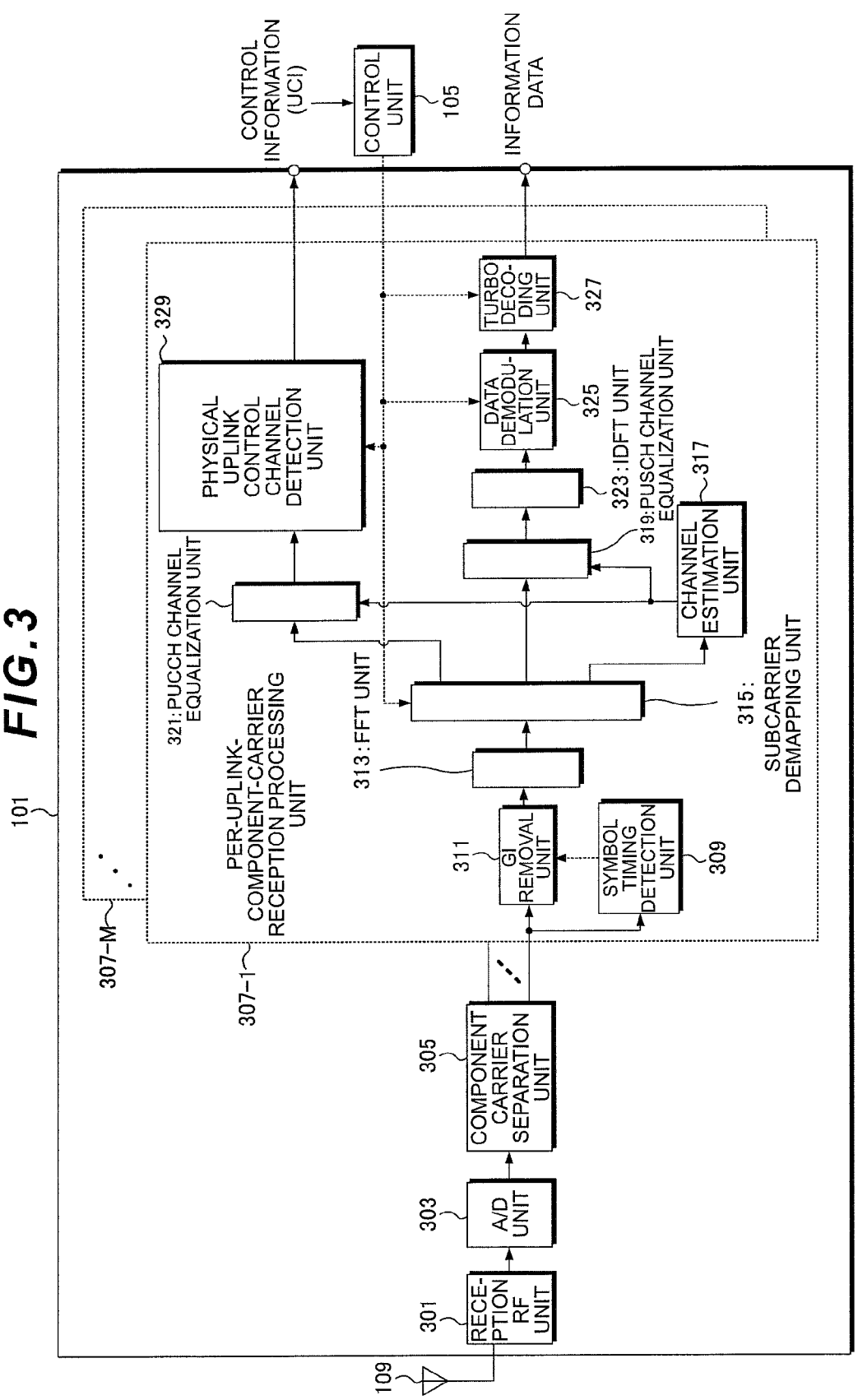
FIG. 3 is a schematic block diagram illustrating a configuration of a reception processing unit 101 of the base station apparatus 3 according to an embodiment of the present invention.

A configuration of the base station apparatus 3 according to the present embodiment will be described in the following, referring to FIGS. 1, 2 and 3. FIG. 1 is a schematic block diagram illustrating the configuration of the base station apparatus 3 according to an embodiment of the present invention. As shown in the drawing, the base station apparatus 3 includes a reception processing unit (receiving unit) 101, a radio resource control unit 103, a control unit 105, and a transmission processing unit (transmitting unit) 107.

According to an instruction from the control unit 105, the reception processing unit 101 uses an uplink reference signal to demodulate and decode the received signals of the PUCCH and PUSCH received from the mobile station apparatus 5 via a receiving antenna 109, and extracts control information and information data. The reception processing unit 101 performs processing of extracting UCI for the uplink subframe and the uplink physical resource block in which the own apparatus has assigned a PUCCH resource to the mobile station apparatus 5. The reception processing unit 101 is instructed by the control unit 105 with regard to performing what kind of process on which uplink subframe or which uplink physical resource block. For example, the reception processing unit 101 is instructed by the control unit 105 to perform detection processing which performs multiplication and combining of the code sequence in the time domain on a signal of the second PUCCH. For example, the reception processing unit 101 is instructed by the control unit 105 to perform detection processing which performs multiplication and combining of the code sequence in the time domain and multiplication and combining of the code sequence in the frequency domain on a signal of the first PUCCH for ACK/NACK. In addition, the reception processing unit 101 receives, from the control unit 105, indication of the code sequence in the frequency domain and/or the code sequence in the time domain to be used in the processing of detecting the UCI from the PUCCH. For example, the reception processing unit 101 extracts ACK/NACK from the received signal of the first PUCCH or the received signal of the second PUCCH, when Cell aggregation is used. For example, the reception processing unit 101 performs, on the received signal of the first PUCCH, processing of combining a plurality of signals transmitted using transmission diversity to detect UCI, or performs processing of detecting the UCI without combining the signals. The reception processing unit 101 outputs the extracted UCI to the control unit 105 and outputs the information data to a higher layer. Details of the reception processing unit 101 will be described below.

The Radio resource control unit 103 performs setting of assigning a resource to the PDCCH of each of the mobile station apparatuses 5, assigning a resource to the PUCCH, assigning a downlink physical resource block to the PDSCH, assigning an uplink physical resource block to the PUSCH, modulation scheme/coding rate/transmit power control value of various channels, or the like. The radio resource control unit 103 also sets the code sequence in the frequency domain or the code sequence in the time domain for the PUCCH. In addition, the radio resource control unit 103 outputs, to the control unit 105, information indicating the assignment of a resource to the PUCCH which has been set. In addition, the radio resource control unit 103 sets the transmission method of an ACK/NACK when using Cell aggregation. The transmission method of an ACK/NACK when using Cell aggregation is a method which transmits ACK/NACK by ACK/NACK channel selection using the first PUCCH resource, or a method which transmits ACK/NACK by the DFT-Spread-OFDM method using the second PUCCH resource. A part of the information set by the radio resource control unit 103 is notified to the mobile station apparatus 5 via the transmission processing unit 107. For example, information indicating the transmission method of an ACK/NACK when Cell aggregation is used is notified to the mobile station apparatus 5.

In addition, the radio resource control unit 103 performs a setting, for the mobile station apparatus 5 having a plurality of transmitting antenna ports, of whether or not to permit application of transmission diversity to a PUCCH. The radio resource control unit 103 outputs, to the control unit 105, information indicating whether or not to permit application of transmission diversity to a PUCCH, so as to notify the mobile station apparatus 5 of the information, via the transmission processing unit 107. In addition, the radio resource control unit 103 may use, instead of the information indicating whether or not to permit application of transmission diversity to a PUCCH, information indicating whether or not to permit application of transmission using a plurality of transmitting antenna ports for a PUCCH. In addition, the radio resource control unit 103 may use, instead of the information indicating whether or not to permit application of transmission diversity to a PUCCH, information indicating whether or not to apply transmission using a plurality of transmitting antenna ports or apply transmission using a single antenna port. In addition, the radio resource control unit 103 performs a setting of assignment of a radio resource of the PDSCH based on the UCI acquired by the reception processing unit 101 using a PUCCH and input via the control unit 105. For example, upon input of an ACK/NACK acquired using the first PUCCH or the second PUCCH, the radio resource control unit 103 performs an assignment to the mobile station apparatus 5 of resources of the PDSCH for which NACK of an ACK/NACK has been indicated.

When the own apparatus performs communication using Cell aggregation, the radio resource control unit 103 configures a plurality of downlink component carriers and a plurality of uplink component carriers for the mobile station apparatus 5. In addition, the radio resource control unit 103 sets a PDCCH CC, a PDSCH CC associated with the PDCCH CC, a primary cell, and a secondary cell for the mobile station apparatus 5. The radio resource control unit 103 outputs, to the control unit 105 via the transmission processing unit 107 so as to notify the mobile station apparatus 5 of information indicating which cell will be set as a primary cell and information indicating a downlink component carrier associated with the PDSCH CC of each secondary cell as a PDCCH CC.

The radio resource control unit 103 outputs various control signals to the control unit 105. For example, included in the control signals are a control signal indicating an assignment of the PUCCH resource and a control signal indicating detection processing to be performed on a signal of the PUCCH received by the reception processing unit 101. For example, the radio resource control unit 103 outputs a control signal indicating, as the second PUCCH resource, an uplink subframe, an uplink physical resource block, and a code sequence in the time domain. For example, the radio resource control unit 103 outputs a control signal indicating detection processing which performs multiplication and combining of the code sequence in the time domain for a signal of the second PUCCH. For example, the radio resource control unit 103 outputs a control signal indicating, as the first PUCCH resource for ACK/NACK, an uplink subframe, an uplink physical resource block, a code sequence in the time domain, and a code sequence in the frequency domain. For example, the radio resource control unit 103 outputs a control signal indicating detection processing which performs multiplication and combining of a code sequence in the time domain, as well as multiplication and combining of a code sequence in the frequency domain for a signal of the first PUCCH for ACK/NACK. For example, the radio resource control unit 103 uses a control signal indicating, as detection processing to be performed on signals of PUCCHs, processing to detect the UCI by combining signals of a plurality of PUCCHs transmitted with transmission diversity using a plurality of transmitting antennas, or processing to detect the UCI from a signal of a PUCCH transmitted using a single transmitting antenna without combining it with other signals.

Based on the control signal input from the radio resource control unit 103, the control unit 105 performs, for the transmission processing unit 107, control such as assigning a downlink physical resource block to the PDSCH, assigning a resource to the PDCCH, setting a modulation scheme for the PDSCH, setting a coding rate for the PDSCH and the PDCCH, or the like. In addition, the control unit 105 generates DCI to be transmitted using the PDCCH, based on the control signal input from the radio resource control unit 103, and outputs it to the transmission processing unit 107. The DCI to be transmitted using the PDCCH includes a downlink assignment, an uplink grant, or the like. In addition, the control unit 105 controls so as to transmit, to the mobile station apparatus 5 via the transmission processing unit 107 using the PDSCH, information indicating a downlink component carrier and an uplink component carrier to be used for communication, information indicating a primary cell, information indicating the association between the PDSCH CC and the PDCCH CC, the transmission method of an ACK/NACK to be used in Cell aggregation, information indicating the assignment of the PUCCH resource, information indicating whether or not to permit application of transmission diversity, or the like. In addition, the control unit 105 controls so as to transmit, to the mobile station apparatus 5 via the transmission processing unit 107 using the PDCCH, a resource of the PUCCH to be assigned for transmission of an ACK/NACK in Cell aggregation.

Based on the control signal input from the radio resource control unit 103, the control unit 105 performs, for the reception processing unit 101, control such as assigning an uplink physical resource block to the PUSCH, assigning a resource to the PUCCH, setting a modulation scheme for the PUSCH and PUCCH, setting a coding rate of the PUSCH, detection processing to the PUCCH, setting a code sequence for the PUCCH, or the like. In addition, the control unit 105 receives, from the reception processing unit 101, the UCI which has been transmitted by the mobile station apparatus 5 using the PUCCH outputs, and outputs the input UCI to the radio resource control unit 103.

In addition, the control unit 105 performs, for the reception processing unit 101, a setting of processing used for detecting the UCI transmitted in the PUCCH, based on the control signal input from the radio resource control unit 103. For example, if information indicating a method of transmitting the PUCCH using a single transmitting antenna has been input from the radio resource control unit 103 as the transmission method of the PUCCH, the control unit 105 sets, for the reception processing unit 101, processing to detect the UCI without combining signals of a plurality of PUCCHs. For example, if information indicating a transmission method with transmission diversity using a plurality of transmitting antennas has been input from the radio resource control unit 103 as a transmission method of the PUCCH, the control unit 105 sets, for the reception processing unit 101, processing to detect the UCI by combining signals of a plurality of PUCCHs transmitted with transmission diversity, or processing to detect the UCI without combining signals of a plurality of PUCCHs, according to the resource assignment of the PDCCH or the like. The control unit 105 receives, from the radio resource control unit 103, a control signal indicating an assignment of a PUCCH resource for each type of UCI for which a resource is assigned.

Based on the control signal input from the control unit 105, the transmission processing unit 107 generates a signal to be transmitted using the PDCCH and the PDSCH, and transmits it via a transmitting antenna 111. The transmission processing unit 107 transmits, to the mobile station apparatus 5 using the PDSCH, information indicating a downlink component carrier and an uplink component carrier to be used for communication using Cell aggregation, information indicating a primary cell, information indicating the association between the PDSCH CC and the PDCCH CC, a transmission method of an ACK/NACK to be used in Cell aggregation, information indicating candidates of the first PUCCH resource, information indicating candidates of the second PUCCH resource, information indicating whether or not to permit application of transmission diversity which have been input from the radio resource control unit 103, information data input from a higher layer or the like, and transmits, to the mobile station apparatus 5 using the PDCCH, the DCI input from the control unit 105, information indicating the first PUCCH resource, and information indicating the second PUCCH resource. For simplicity, it is assumed in the following that the information data includes information relating to several types of control. Details of the transmission processing unit 107 will be described below.

<Configuration of Transmission Processing Unit 107 of Base Station Apparatus 3>

In the following, details of the transmission processing unit 107 of the base station apparatus 3 will be described. FIG. 2 is a schematic block diagram illustrating a configuration of the transmission processing unit 107 of the base station apparatus 3 according to an embodiment of the present invention. As shown in the drawing, the transmission processing unit 107 includes a plurality of physical down link shared channel processing units 201-1 to 201-M (in the following, the physical downlink shared channel processing units 201-1 to 201-M are collectively expressed as a physical downlink shared channel processing unit 201), a plurality of physical downlink control channel processing units 203-1 to 203-M (in the following, physical downlink control channel processing units 203-1 to 203-M are collectively expressed as a physical downlink control channel processing unit 203), a downlink pilot channel processing unit 205, a multiplexing unit 207, an Inverse Fast Fourier Transform (IFFT) unit 209, a Guard Interval (GI) insertion unit 211, a Digital/Analog converter (D/A) unit 213, a transmission Radio Frequency (RF) unit 215, and a transmitting antenna 111. Since the physical downlink shared channel processing units 201 and the physical downlink control channel processing units 203 respectively have a similar configuration and function, description will be provided to a single unit representing thereof. Description of the transmission processing unit 107 will be provided for a case where the number of transmitting antennas is one, and description is omitted for a case where a plurality of transmitting antennas is included and a processing unit which performs spatial multiplexing for the PDSCH is included, for convenience of explanation.

In addition, as shown in the drawing, each of the physical downlink shared channel processing units 201 has a turbo coding unit 219 and a data modulation unit 221. In addition, as shown in the drawing, each of the physical downlink control channel processing units 203 has a convolutional coding unit 223 and a QPSK modulation unit 225. The physical downlink shared channel processing unit 201 performs baseband signal processing for transmitting information data to the mobile station apparatus 5 by OFDM method. The turbo coding unit 219 performs turbo coding of the input information data with a coding rate input from the control unit 105 in order to enhance error tolerance of data, and outputs the result to the data modulation unit 221. The data modulation unit 221 uses a modulation scheme input from the control unit 105 such as QPSK (Quadrature Phase Shift Keying), 16QAM (16 Quadrature Amplitude Modulation), or 64QAM (64 Quadrature Amplitude Modulation), for example, to modulate the data encoded by the turbo coding unit 219, and generates a signal sequence of modulated symbols. The data modulation unit 221 outputs the generated signal sequence to the multiplexing unit 207.

The physical downlink control channel processing unit 203 performs baseband signal processing for transmitting the DCI input from the control unit 105 by OFDM method. The convolutional coding unit 223 performs convolutional coding based on the coding rate input from the control unit 105 in order to enhance error tolerance of the DCI. Here, DCI is controlled in a bit-by-bit manner. In addition, the convolutional coding unit 223 performs rate matching based on the coding rate input from the control unit 105 in order to adjust the number of output bits for the bits which have been subject to convolutional coding. The convolutional coding unit 223 outputs the encoded DCI to the QPSK modulation unit 225. The QPSK modulation unit 225 modulates the DCI encoded by the convolutional coding unit 223 with the QPSK modulation scheme, and outputs a signal sequence of the modulated symbols to the multiplexing unit 207. The downlink pilot channel processing unit 205 generates a downlink reference signal (also referred to as Cell specific RS) which is a signal already known to the mobile station apparatus 5, and outputs it to the multiplexing unit 207.

The multiplexing unit 207 multiplexes the signal input from the downlink pilot channel processing unit 205, the signal input from each of the physical downlink shared channel processing units 201, and the signal input from each physical downlink control channel processing unit 203, into a downlink radio frame according to an instruction from the control unit 105. A control signal relating to an assignment of a downlink physical resource block to the PDSCH set by the radio resource control unit 103 and an assignment of a resource to the PDCCH is input to the control unit 105 and, based on the control signal, the control unit 105 controls processing of the multiplexing unit 207.

The multiplexing unit 207 performs multiplexing of the PDSCH and PDCCH according to time multiplexing as shown in FIG. 10. In addition, the multiplexing unit 207 performs multiplexing between the downlink pilot channel and another channel according to time/frequency multiplexing. In addition, the multiplexing unit 207 may perform multiplexing of the PDSCH addressed to each of the mobile station apparatuses 5 for each pair of downlink physical resource blocks, or may perform multiplexing of the PDSCH using a plurality of downlink physical resource block pairs for a single mobile station apparatus 5. In addition, the multiplexing unit 207 performs multiplexing of the PDCCH addressed to each of the mobile station apparatuses 5 using the CCE in the same downlink component carrier. The multiplexing unit 207 outputs the multiplexed signal to the IFFT unit 209.

The IFFT unit 209 performs Inverse Fast Fourier Transform and OFDM based modulation of the signal which has been multiplexed by the multiplexing unit 207, and outputs the result to the GI insertion unit 211. The GI insertion unit 211 generates a baseband digital signal including symbols in OFDM method by adding a guard interval to the signal modulated according to OFDM method by the IFFT unit 209. As known in the art, a guard interval is generated by reproducing a part of the top or the end of an OFDM symbol to be transmitted. The GI insertion unit 211 outputs the generated baseband digital signal to the D/A unit 213. The D/A unit 213 converts the baseband digital signal input from the GI insertion unit 211 into an analog signal, and outputs the result to the transmission RF unit 215. The transmission RE unit 215 generates in-phase components and quadrature-phase components of an intermediate frequency from the analog signal input from the D/A unit 213, and removes frequency components unnecessary for the intermediate frequency band. Next, the transmission RF unit 215 converts (up-converts) the intermediate-frequency signal to a high-frequency signal, removes unnecessary frequency components, amplifies electric power thereof, and transmits it to the mobile station apparatus 5 via the transmitting antenna 111.

<Configuration of Reception Processing Unit 101 of Base Station Apparatus 3>

In the following, details of the reception processing unit 101 of the base station apparatus 3 will be described. FIG. 3 is a schematic block diagram illustrating a configuration of the reception processing unit 101 of the base station apparatus 3 according to an embodiment of the present invention. As shown in the drawing, the reception processing unit 101 includes a reception RF unit 301, an A/D (Analog/Digital converter) unit 303, a component carrier separation unit 305, a plurality of per-uplink-component-carrier reception processing units 307-1 to 307-M (in the following, the per-uplink-component-carrier reception processing units 307-1 to 307-M are collectively expressed as a per-uplink-component-carrier reception processing unit 307). In addition, as shown in the drawing, the per-uplink-component-carrier reception processing unit 307 has a symbol timing detection unit 309, a GI removal unit 311, an FFT unit 313, a subcarrier demapping unit 315, a channel estimation unit 317, a PUSCH channel equalization unit 319, a PUCCH channel equalization unit 321, an IDFT unit 323, a data demodulation unit 325, a turbo decoding unit 327, and a physical uplink control channel detection unit 329. Since the respective reception processing units 307 have a similar configuration and a function, description will be provided to a representative single unit thereof.

The reception RF unit 301 appropriately amplifies a signal received by the receiving antenna 109, converts (down-converts) it into an intermediate frequency, removes unnecessary frequency components, controls the amplification level to maintain an appropriate signal level, and performs quadrature-demodulation based on in-phase components and quadrature-phase components of the received signal. The reception RF unit 301 outputs the quadrature-demodulated analog signal to the A/D unit 303. The A/D unit 303 converts the analog signal which has been quadrature-demodulated by the reception RE unit 301 into a digital signal, and outputs the converted digital signal to the component carrier separation unit 305. The component carrier separation unit 305 separates the received signal for each uplink component carrier having an uplink system bandwidth, and outputs the result to each per-uplink-component-carrier reception processing unit 307.

The per-uplink-component-carrier reception processing unit 307 performs demodulation and decoding of the PUSCH and PUCCH in the uplink component carrier to detect information data and UCI.

The symbol timing detection unit 309 detects a timing of a symbol based on a signal input from the component carrier separation unit 305, and outputs a control signal indicating the timing of the detected symbol boundary to the GI removal unit 311. The GI removal unit 311 removes a part corresponding to the guard interval from the signal input from the component carrier separation unit 305, based on the control signal from the symbol timing detection unit 309, and outputs the signal of the remaining part to the FFT unit 313. The FFT unit 313 performs Fast Fourier Transform on the signal input from the GI removal unit 311, performs demodulation according to DFT-Spread-OFDM method, and outputs the result to a subcarrier demapping unit 315. The number of points of the FFT unit 313 is equal to the number of points of the IFFT unit of the mobile station apparatus 5 described below.

Based on a control signal input from the control unit 105, the subcarrier demapping unit 315 separates the signal demodulated by the FFT unit 313 into an uplink reference signal of the uplink pilot channel, a signal of the PUSCH, and a signal of the PUCCH. The subcarrier demapping unit 315 outputs the separated uplink reference signal to the channel estimation unit 317, outputs the separated signal of the PUSCH to the PUSCH channel equalization unit 319, and outputs the separated signal of the PUCCH to the PUCCH channel equalization unit 321.

The channel estimation unit 317 estimates variation of the channel, using the uplink reference signal separated by the subcarrier demapping unit 315 and a known signal. The channel estimation unit 317 outputs the estimated channel estimation value to the PUSCH channel equalization unit 319 and the PUCCH channel equalization unit 321. The PUSCH channel equalization unit 319 equalizes the amplitude and phase of the PUSCH signal separated by the subcarrier demapping unit 315 based on the channel estimation value input from the channel estimation unit 317. Here, equalization refers to processing to restore the variation of the channel that a signal has received during radio communication. The PUSCH channel equalization unit 319 outputs the adjusted signal to the IDFT unit 323.

The IDFT unit 323 performs Inverse Discrete Fourier Transform on the signal input from the PUSCH channel equalization unit 319 and outputs the result to the data demodulation unit 325. The data demodulation unit 325 performs demodulation of the signal of the PUSCH converted by the IDFT unit 323, and outputs the demodulated signal of the PUSCH to the turbo decoding unit 327. The demodulation is a demodulation corresponding to the modulation scheme used in the data modulation unit of the mobile station apparatus 5, the modulation scheme being input from the control unit 105. The turbo decoding unit 327 decodes information data from the signal of the PUSCH input from the data demodulation unit 325 and demodulated therein. The coding rate is input from the control unit 105.

Based on the channel estimation value input from the channel estimation unit 317, the PUCCH channel equalization unit 321 equalizes the amplitude and phase of the signal of the PUCCH separated in the subcarrier demapping unit 315. The PUCCH channel equalization unit 321 outputs the equalized signal to the physical uplink control channel detection unit 329.

The physical uplink control channel detection unit 329 demodulates and decodes the signal input from the PUCCH channel equalization unit 321 to detect UCI. The physical uplink control channel detection unit 329 performs processing to separate the signal which has been code-multiplexed in the frequency domain and/or the time domain. The physical uplink control channel detection unit 329 performs processing to detect ACK/NACK information from the signal of the first PUCCH which has been code-multiplexed in the frequency domain and/or the time domain using the code sequence used at the transmitting side. In addition, physical uplink control channel detection unit 329 performs processing to detect ACK/NACK information from the signals of the second PUCCH which has been code-multiplexed in the time domain using the code sequence used at the transmitting side. Specifically, the physical uplink control channel detection unit 329 multiplies the signal for each subcarrier of the PUCCH with each code of the code sequence, and then combines the signal multiplied with the code, as the detection processing using the code sequence in the frequency domain, i.e., processing to separate the signal which has been code-multiplexed in the frequency domain. Specifically, the physical uplink control channel detection unit 329 multiplies the signal for each SC-FDMA symbol of the PUCCH with each code of the code sequence, and then combines the signal multiplied with the code, as the detection processing using the code sequence in the time domain, i.e., processing to separate the signal which has been code-multiplexed in the time domain. In addition, the physical uplink control channel detection unit 329 sets the type of detection processing based on the control signal from the control unit 105, and detects the UCI transmitted in the PUCCH by the detection processing which has been set. For example, the physical uplink control channel detection unit 329 sets the processing to detect the UCI without combining signals of a plurality of PUCCHs. For example, the physical uplink control channel detection unit 329 sets processing to combine signals of a plurality of the PUCCHs to detect the UCI. The physical uplink control channel detection unit 329 sets processing to detect signals of the PUCCHs (first PUCCH and second PUCCH), based on the control signal from the control unit 105.

Based on the control information (DCI) transmitted using PDCCH and the control information transmitted using PUSCH by the base station apparatus 3 to the mobile station apparatus 5, the control unit 105 controls the subcarrier demapping unit 315, the data demodulation unit 325, the turbo decoding unit 327, the channel estimation unit 317, and the physical uplink control channel detection unit 329. In addition, based on the control information transmitted by the base station apparatus 3 to the mobile station apparatus 5, the control unit 105 recognizes which resources (uplink subframe, uplink physical resource block, code sequence in the frequency domain, code sequence in the time domain) are included in the PUSCH and PUCCH transmitted by each of the mobile station apparatuses 5.

<Overall Configuration of Mobile Station Apparatus 5>

Figure 4:
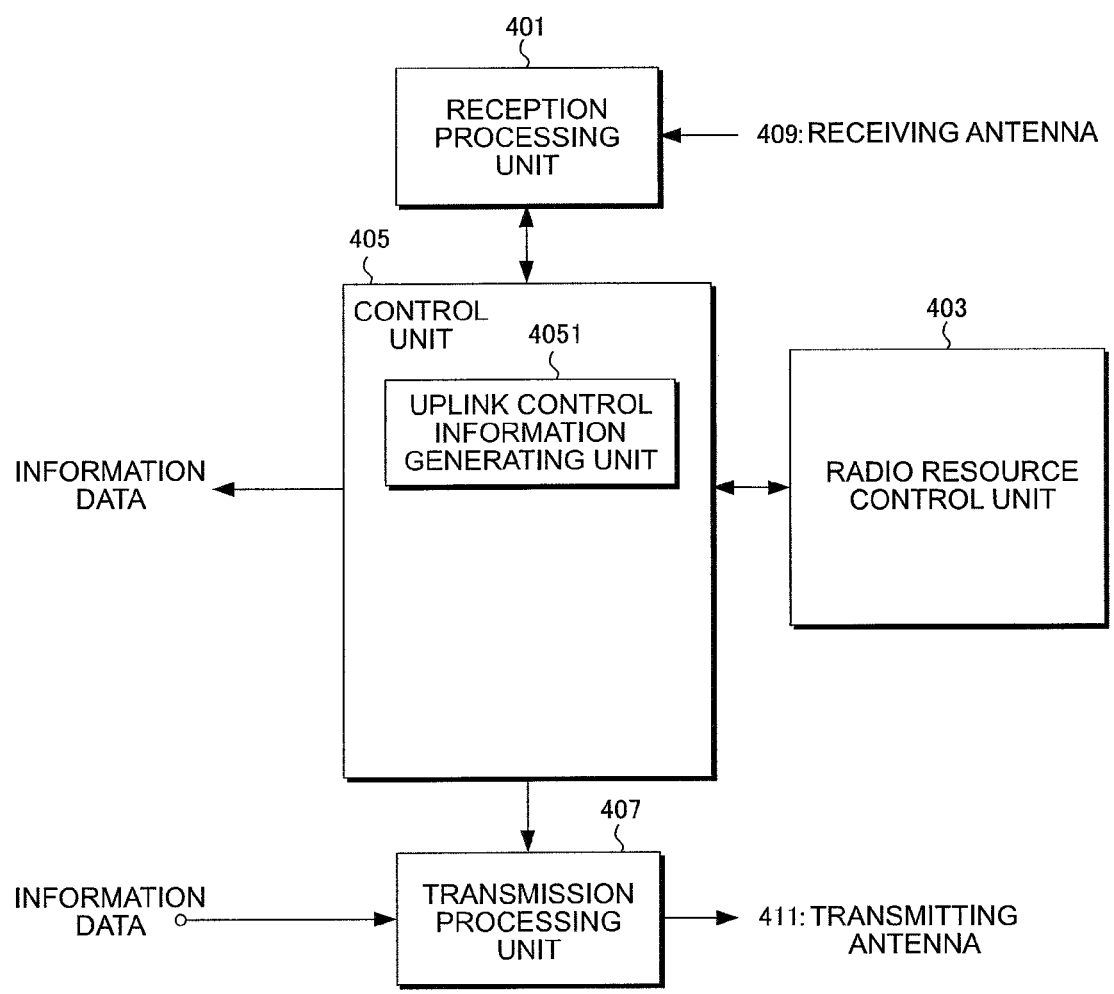
FIG. 4 is a schematic block diagram illustrating a configuration of a mobile station apparatus 5 according to an embodiment of the present invention.
Figure 5:
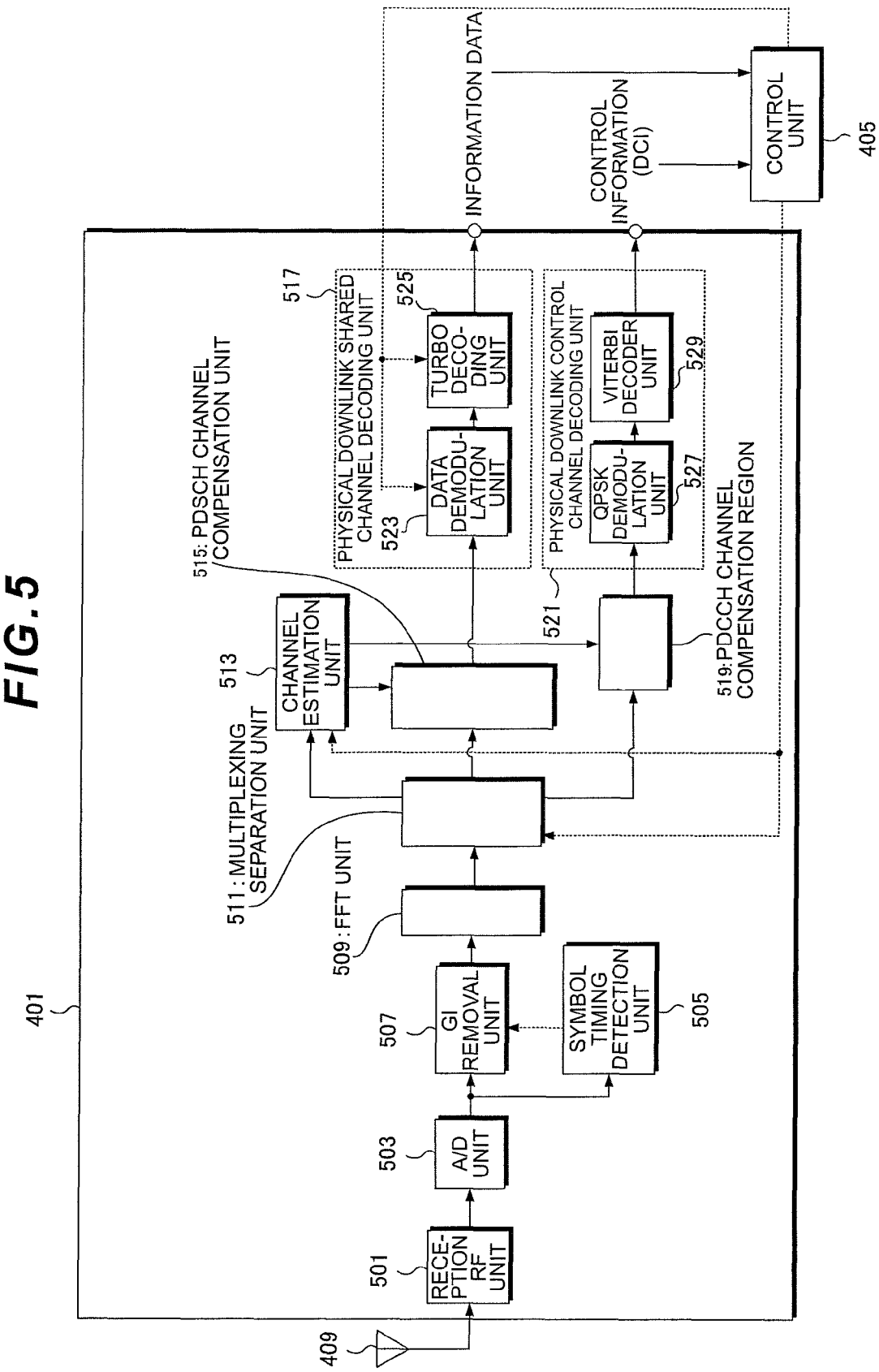
FIG. 5 is a schematic block diagram illustrating a configuration of a reception processing unit 401 of the mobile station apparatus 5 according to an embodiment of the present invention.

In the following, a configuration of the mobile station apparatus 5 according to the present embodiment will be described, referring to FIGS. 4, 5 and 6. FIG. 4 is a schematic block diagram illustrating the configuration of the mobile station apparatus 5 according to an embodiment of the present invention. As shown in the drawing, the mobile station apparatus 5 includes a reception processing unit 401, a radio resource control unit 403, a control unit 405, and a transmission processing unit 407. In addition, the control unit 405 has an uplink control information generating unit 4051.

The reception processing unit 401 receives a signal from the base station apparatus 3 and, according to an instruction from the control unit 405, demodulates and decodes the received signal. Upon detecting a signal of the PDCCH addressed to its own apparatus, the reception processing unit 401 outputs the DCI acquired by decoding the signal of the PDCCH to the control unit 405. For example, the reception processing unit 401 outputs, to the control unit 405, control information indicating a first PUCCH resource included in the PDCCH, or control information indicating a second PUCCH resource. In addition, based on an instruction from the control unit 405 after having output the DCI included in the PDCCH to the control unit 405, the reception processing unit 401 outputs, to a higher layer via the control unit 405, information data acquired by decoding the PDSCH addressed to its own apparatus. The downlink assignment includes information indicating the assignment of the PDSCH resource in the DCI included in the PDCCH. In addition, the reception processing unit 401 outputs, to the control unit 405, the control information generated in the radio resource control unit 103 of the base station apparatus 3 by decoding the PDSCH, and also outputs it to the radio resource control unit 403 of its own apparatus via the control unit 405. For example, the control information generated in the radio resource control unit 103 of the base station apparatus 3 includes information indicating candidates of the first PUCCH resource, information indicating candidates of a the second PUCCH resource, information indicating a primary cell, information indicating the transmission method of an ACK/NACK when using Cell aggregation, information indicating whether or not to permit application of transmission diversity, or the like.

In addition, the reception processing unit 401 outputs a Cyclic Redundancy Check (CRC) code included in the PDSCH to the control unit 405. Although omitted in the description of the base station apparatus 3, the transmission processing unit 107 of the base station apparatus 3 generates a CRC code from the information data, and transmits the information data and the CRC code via the PDSCH. The CRC code is used to determine whether the data included in the PDSCH is erroneous or not erroneous, where it is determined that the data is not erroneous if the information generated from the data using a predetermined generator polynomial and the CRC code are identical, it is determined that the data is erroneous if the information generated from the data using a predetermined generator polynomial and the CRC code are different. Details of the reception processing unit 401 will be described below.

The control unit 405 has an uplink control information generating unit 4051. The control unit 405 confirms the data transmitted from the base station apparatus 3 using the PDSCH and input from the reception processing unit 401, outputs information data, among the data, to a higher layer and, based on the control information, among the data, generated in the radio resource control unit 103 of the base station apparatus 3, controls the reception processing unit 401 and the transmission processing unit 407. In addition, the control unit 405 controls the reception processing unit 401 and the transmission processing unit 407, based on the instruction from the radio resource control unit 403. For example, the control unit 405 controls the transmission processing unit 407 so as to transmit the UCI via the PUCCH of the resource instructed from the radio resource control unit 403. In addition, the control unit 405 controls the reception processing unit 401 and the transmission processing unit 407, based on the DCI transmitted from the base station apparatus 3 using the PDCCH and input from the reception processing unit 401. Specifically, the control unit 405 controls the reception processing unit 401 based on the detected downlink assignment, and controls the transmission processing unit 407, based on the detected uplink grant.

In addition, according to the situation of the cell in which the PDCCH is detected by the reception processing unit 401, the control unit 405 controls application of transmission diversity to the PUCCH to be used for transmitting the ACK/NACK generated by the uplink control information generating unit 4051. If information allowing application of transmission diversity has been notified to its own apparatus from the base station apparatus 3, the control unit 405 controls application of transmission diversity to the PUCCH. When information not allowing application of transmission diversity is notified to its own apparatus from the base station apparatus 3, the control unit 405 does not control application of transmission diversity to the PUCCH but controls so as to transmit PUCCH using a single antenna port. Transmission diversity is a method which uses a plurality of transmitting antennas (e.g., two transmitting antennas) to transmit signals generated from a same ACK/NACK using orthogonal resources in the frequency domain and/or the code domain between respective transmitting antennas. More specifically, it suffices that the mobile station apparatus 5 using transmission diversity performs any of the following at least three types of processing of transmitting, via respective transmitting antennas, signals generated from a same ACK/NACK and multiplied with code sequences which are different in the frequency domain, transmitting, via respective transmitting antennas, signals generated from a same ACK/NACK and multiplied with code sequences which are different in the time domain, or transmitting, via respective transmitting antennas, signals generated from a same ACK/NACK using an uplink physical resource block including different time/frequency resources, or a plurality of processing may be used together. Here, the transmitting antennas are also referred to as transmitting antenna ports. Here, transmitting antenna ports mean logical transmitting antennas used for signal processing, and a single transmitting antenna port may include a plurality of physical transmitting antennas. A plurality of physical transmitting antennas constituting the same transmitting antenna port transmits a same signal. Although delay diversity or CDD (Cyclic Delay Diversity) can be applied in the same transmitting antenna port using a plurality of physical transmitting antennas, other types of signal processing cannot be used. The cell situation includes at least two different situations, namely, a first and a second situation, the first situation is a situation that the PDCCH has been detected only in a primary cell, and the second situation is a situation that at least one of the cells in which the PDCCH has been detected is a secondary cell. The control unit 405 controls so as to apply transmission diversity to the PUCCH in the first situation and controls so as not to apply transmission diversity to the PUCCH in the second situation. Here, not applying transmission diversity means that signals are transmitted via a single antenna port.

The uplink control information generating unit 4051 manages generation of UCI in its own apparatus. For example, when data and a CRC code have been input from the reception processing unit 401 to the control unit 405, the management unit 4051 generates an ACK/NACK. If the information generated from the data using a predetermined generator polynomial and the CRC code are identical, ACK is indicated in the ACK/NACK, whereas NACK is indicated in ACK/NACK if the generated information and the CRC code are different. The uplink control information generating unit 4051 generates an ACK/NACK indicating an ACK or a NACK to the data of the PDSCH for which an assignment of a resource is indicated in the DCI included in the PDCCH detected by the reception processing unit 401. When communication is performed without using Cell aggregation in its own apparatus, the uplink control information generating unit 4051 generates only one ACK/NACK for the PDSCH of any downlink subframe. When communication using Cell aggregation is being performed in its own apparatus, the uplink control information generating unit 4051 generates a plurality of ACKs/NACKs for a plurality of PDSCHs of an arbitrary downlink subframe. In other words, when communication using Cell aggregation is being performed in its own apparatus, the uplink control information generating unit 4051 generates an ACK/NACK for data for one or more PDSCHs for which an assignment of a resource is indicated by a downlink assignment included in one or more PDCCHs received in a same subframe. For example, the uplink control information generating unit 4051 generates an SR at a timing corresponding to the uplink subframe in which a resource of the PUCCH for an SR has been preliminarily assigned by the base station apparatus 3. For example, if it is determined that there is a shortage of uplink resources in the radio resource control unit 403, and a control signal requesting generation of an SR has been input from the radio resource control unit 403, the uplink control information generating unit 4051 generates an SR. Having determined that there is a shortage of uplink resources, the radio resource control unit 403 outputs a control signal of generating an SR to the control unit 405 in correspondence with the uplink subframe in which a resource of the PUCCH for an SR which has been preliminarily assigned by the base station apparatus 3 is assigned. Determination of a shortage of uplink resources is made in such a case where the amount of data accumulated in the transmission buffer has exceeded a predetermined threshold value. Here, the timing corresponding to the uplink subframe refers to a timing earlier than the uplink subframe by at least a time of processing delay, so that a signal can be transmitted in the uplink subframe. For example, the uplink control information generating unit 4051 generates CQI at a timing corresponding to the uplink subframe in which a resource of the PUCCH for CQI has been preliminarily assigned by the base station apparatus 3.

The radio resource control unit 403 stores and maintains control information generated in the radio resource control unit 103 of the base station apparatus 3 and notified from the base station apparatus 3, and also controls the reception processing unit 401 and the transmission processing unit 407 via the control unit 405. In other words, the radio resource control unit 403 has a function of memory which maintains various parameters. For example, the radio resource control unit 403 maintains control information relating to candidates of the first PUCCH resource, and outputs a control signal to the control unit 405 so as to transmit a signal including ACK/NACK information in the transmission processing unit 407 using a resource selected from the candidates based on the control information indicating the first PUCCH resource input from the reception processing unit 401. For example, the radio resource control unit 403 maintains control information relating to candidates of the second PUCCH resource, and outputs a control signal to the control unit 405 so as to transmit a signal including ACK/NACK information in the transmission processing unit 407 using a resource selected from the candidates based on the control information indicating the second PUCCH resource input from the reception processing unit 401.

According to an instruction from the control unit 405, the transmission processing unit 407 encodes the information data and the UCI, and transmits the modulated signal to the base station apparatus 3 via a transmitting antenna 411 using resources of the PUSCH and PUCCH. For example, the transmission processing unit 407 transmits an ACK/NACK signal to be allocated in resources of a plurality of PUCCHs with transmission diversity using a plurality of transmitting antennas 411. For example, the transmission processing unit 407 transmits an ACK/NACK signal allocated in a resource of a single PUCCH using a single transmitting antenna 411. According to an instruction from the control unit 405, the transmission processing unit 407 transmits a PUCCH using a resource implicitly associated with the CCE used for the detected PDCCH in the first situation, and transmits a PUCCH using a resources at least explicitly indicated in the second situation. Details of the transmission processing unit 407 will be described below.

<Reception Processing Unit 401 of Mobile Station Apparatus 5>

Details of the reception processing unit 401 of the mobile station apparatus 5 will be described below. FIG. 5 is a schematic block diagram illustrating a configuration of the reception processing unit 401 of the mobile station apparatus 5 according to an embodiment of the present invention. As shown in the drawing, the reception processing unit 401 includes a reception RF unit 501, an A/D unit 503, a symbol timing detection unit 505, a GI removal unit 507, an FFT unit 509, a multiplexing separation unit 511, a channel estimation unit 513, a PDSCH channel compensation unit 515, a physical downlink shared channel decoding unit 517, a PDCCH channel compensation unit 519, and a physical downlink control channel decoding unit 521. In addition, as shown in the drawing, the physical downlink shared channel decoding unit 517 has a data demodulation unit 523 and a turbo decoding unit 525. In addition, as shown in the drawing, the physical downlink control channel decoding unit 521 has a QPSK demodulation unit 527 and a Viterbi decoder unit 529.

The reception RF unit 501 appropriately amplifies a signal received with a receiving antenna 409, converts (down-converts) it into an intermediate frequency, removes unnecessary frequency components, controls the amplification level so that the signal level is appropriately maintained, and performs quadrature-demodulation based on the in-phase component and the quadrature-phase component of the received signal. The reception RF unit 501 outputs the quadrature-demodulated analog signal to the A/D unit 503.

The A/D unit 503 converts the analog signal quadrature-demodulated by the reception RF unit 501 into a digital signal, and outputs the converted digital signal to the symbol timing detection unit 505 and the GI removal unit 507. Based on the digital signal converted by the A/D unit 503, the symbol timing detection unit 505 detects a timing of the symbol, and outputs a control signal indicating the timing of the detected symbol boundary to the GI removal unit 507. Based on the control signal from the symbol timing detection unit 505, the GI removal unit 507 removes a part corresponding to the guard interval from the digital signal output by the A/D unit 503, and outputs the remaining part of the signal to the FFT unit 509. The FFT unit 509 performs Fast Fourier Transform on the signal input from the GI removal unit 507, performs OFDM demodulation, and outputs it to the multiplexing separation unit 511.

Based on the control signal input from the control unit 405, the multiplexing separation unit 511 separates the signal demodulated by the FFT unit 509 into a signal of the PDCCH and a signal of the PDSCH. The multiplexing separation unit 511 outputs the separated signal of the PDSCH to the PDSCH channel compensation unit 515, and outputs the separated signal of the PDCCH to a PDCCH channel compensation unit 519. In addition, the multiplexing separation unit 511 separates the downlink resource element in which the downlink pilot channel is allocated, and outputs the downlink reference signal of the downlink pilot channel to the channel estimation unit 513. The multiplexing separation unit 511 outputs the signal of the PDCCH CC to the PDCCH channel compensation unit 519, and outputs the signal of the PDSCH CC to the PDSCH channel compensation unit 515.

The channel estimation unit 513 estimates variation of the channel using the downlink reference signal of the downlink pilot channel separated by the multiplexing separation unit 511 and a known signal, and outputs a channel compensation value for adjusting the amplitude and phase to the PDSCH channel compensation unit 515 and the PDCCH channel compensation unit 519 so as to compensate the variation of the channel. The PDSCH channel compensation unit 515 adjusts the amplitude and phase of the signal of the PDSCH separated by the multiplexing separation unit 511, according to the channel compensation value input from the channel estimation unit 513. The PDSCH channel compensation unit 515 outputs the channel-adjusted signal to the data demodulation unit 523 of the physical downlink shared channel decoding unit 517.

Based on instructions from the control unit 405, the physical downlink shared channel decoding unit 517 demodulates and decodes the PDSCH to detect information data. The data demodulation unit 523 demodulates the signal of the PDSCH input from the channel compensation unit 515, and outputs the demodulated signal of the PDSCH to the turbo decoding unit 525. This demodulation is a demodulation corresponding to the modulation scheme used in the data modulation unit 221 of the base station apparatus 3. The turbo decoding unit 525 decodes information data from the signal of the PDSCH input from and demodulated in the data demodulation unit 523, and outputs it to a higher layer via the control unit 405. Here, also the control information or the like generated in the radio resource control unit 103 of the base station apparatus 3 and transmitted using the PDSCH is output to the control unit 405, and is also output to the radio resource control unit 403 via the control unit 405. The CRC code included in the PDSCH is also output to the control unit 405.

The PDCCH channel compensation unit 519 adjusts the amplitude and phase of the signal of the PDCCH separated by the multiplexing separation unit 511, according to the channel compensation value input from the channel estimation unit 513. The PDCCH channel compensation unit 519 outputs the adjusted signal to the QPSK demodulation unit 527 of the physical downlink control channel decoding unit 521.

The physical downlink control channel decoding unit 521 demodulates and decodes the signal input from the PDCCH channel compensation unit 519 in the following manner to detect control data. The QPSK demodulation unit 527 performs QPSK demodulation of the signal of the PDCCH and outputs it to the Viterbi decoder unit 529. The Viterbi decoder unit 529 decodes the signal demodulated by the QPSK demodulation unit 527 and outputs the decoded DCI to the control unit 405. Here, with the signal being expressed in bits, the Viterbi decoder unit 529 performs rate dematching in order to adjust the number of bits subjected to Viterbi decoding for the input bits.

Assuming a plurality of CCE aggregation numbers, the mobile station apparatus 5 performs processing to detect DCI addressed to its own apparatus. The mobile station apparatus 5 performs different decoding processing for the signal of the PDCCH for every assumed CCE aggregation number, and acquires DCI included in a PDCCH having no error detected in the CRC code to be added to the PDCCH together with the DCI. Such processing is referred to as blind decoding. Instead of performing blind decoding for signals of all the CCEs of the downlink component carrier, the mobile station apparatus 5 may perform blind decoding only for a part of the CCEs. The part of the CCEs subjected to blind coding is referred to as Search space. In addition, blind decoding may be performed on a different CCE for each CCE aggregation number.

The control unit 405 determines whether or not the DCI input from the Viterbi decoder unit 529 has no errors and is addressed to its own apparatus, and if the DCI is determined to have no errors and is addressed to its own apparatus, the control unit 405 controls, based on the DCI, the multiplexing separation unit 511, the data demodulation unit 523, the turbo decoding unit 525, and the transmission processing unit 407. If, for example, the DCI is a downlink assignment, the control unit 405 controls so as to decode the signal of the PDSCH with a downlink component carrier having a resource assigned to the reception processing unit 401. Here, the PDCCH also includes the CRC code as with the PDSCH, and thus the control unit 405 uses the CRC code to determine whether or not the DCI of the PDCCH is erroneous.

<Transmission Processing Unit 407 of Mobile Station Apparatus 5>

FIG. 6 is a schematic block diagram illustrating a configuration of the transmission processing unit 407 of the mobile station apparatus 5 according to an embodiment of the present invention. As shown in the drawing, the transmission processing unit 407 includes a plurality of per-uplink-component-carrier transmission processing units 601-1 to 601-M (in the following, the per-uplink-component-carrier transmission processing units 601-1 to 601-M are collectively expressed as a per-uplink-component-carrier transmission processing unit 601), component carrier synthesis units 603-1 to 603-2 (in the following, the component carrier synthesis units 603-1 to 603-2 are collectively expressed as a component carrier synthesis unit 603), D/A units 605-1 to 605-2 (in the following, the D/A units 605-1 to 605-2 are collectively expressed as a D/A unit 605), transmission RF units 607-1 to 607-2 (in the following, the transmission RF units 607-1 to 607-2 are collectively expressed as a transmission RF unit 607), and transmitting antennas 411-1 to 411-2 (in the following, the transmitting antennas 411-1 to 411-2 are collectively expressed as a transmitting antenna 411). In addition, as shown in the drawing, the per-uplink-component-carrier transmission processing unit 601 has a turbo coding unit 611, a data modulation unit 613, a DFT unit 615, an uplink pilot channel processing unit 617, a physical uplink control channel processing unit 619, subcarrier mapping units 621-1 to 621-2 (in the following, the subcarrier mapping units 621-1 to 621-2 are collectively expressed as a subcarrier mapping unit 621), IFFT units 623-1 to 623-2 (in the following, the IFFT units 623-1 to 623-2 are collectively expressed as an IFFT unit 623), GI insertion units 625-1 to 625-2 (in the following, the GI insertion units 625-1 to 625-2 are collectively expressed as a GI insertion unit 625), and transmit power adjustment units 627-1 to 627-2 (in the following, the transmit power adjustment units 627-1 to 627-2 are collectively expressed as a transmit power adjustment unit 627). In the mobile station apparatus 5, there are as many per-uplink-component-carrier transmission processing units 601 as the corresponding number of uplink component carriers. Since the per-uplink-component-carrier transmission processing units 601, the component carrier synthesis units 603, the D/A units 605, the transmission RF units, the transmitting antennas 411, the subcarrier mapping units 621, the IFFT units 623, the GI insertion units 625, and the transmit power adjustment units 627 respectively have a similar configuration and function, description will be provided to a single unit representing thereof.

In addition, although the present invention describes a case where the number of transmitting antennas 411 in the mobile station apparatus 5 is two, for convenience of explanation, there may be three or more transmitting antennas 411, and three or more related processing units (subcarrier mapping units 621, IFFT units 623, GI insertion units 625, transmit power adjustment units 627, component carrier synthesis units 603, D/A units 605, and transmission RF units 607). In addition, the present invention describes a configuration for transmitting signals of the PUSCH using a single transmitting antenna (transmitting antenna 411-1) in the mobile station apparatus 5, for convenience of explanation, the signals of the PUSCH may be transmitted using a plurality of transmitting antennas, and a plurality of turbo coding units 611, data modulation units 613, and DFT units 615, may be included in the mobile station apparatus 5, as well as processing units for performing spatial multiplexing using a plurality of transmitting antennas.

The per-uplink-component-carrier transmission processing unit 601 encodes and modulates information data and UCI, generates a signal to be transmitted using the PUSCH and PUCCH in the uplink component carrier, and adjusts transmit power of the PUSCH and PUCCH. The turbo coding unit 611 performs turbo coding on the input information data to enhance error tolerance of the data at a coding rate instructed from the control unit 405, and outputs it to the data modulation unit 613. The data modulation unit 613 modulates the code data encoded in the turbo coding unit 611, using a modulation scheme instructed from the control unit 405 such, for example, QPSK, 16QAM, 64QAM or the like, and generates a signal sequence of modulated symbols. The data modulation unit 613 outputs the generated signal sequence of modulated symbols to the DFT unit 615. The DFT unit 615 performs Discrete Fourier Transform on the signal output from the data modulation unit 613, and outputs it to the subcarrier mapping unit 621.

The physical uplink control channel processing unit 619 performs baseband signal processing for transmitting the UCI input from the control unit 405. The UCI input to the physical uplink control channel processing unit 619 includes an ACK/NACK, an SR, and a CQI. The physical uplink control channel processing unit 619 performs baseband signal processing, and outputs the generated signal to the subcarrier mapping unit 621. The physical uplink control channel processing unit 619 performs different baseband signal processing on a signal for the first PUCCH from that on a signal for the second PUCCH. The physical uplink control channel processing unit 619 encodes information bits of the UCI to generate a signal. For example, the physical uplink control channel processing unit 619 applies block coding to a plurality of ACK/NACK information bits to generate a signal to be transmitted via the second PUCCH. For example, block coding is performed using Reed-Muller codes. For example, the physical uplink control channel processing unit 619 applies repetition coding to ACK/NACK information bits to generate a signal to be transmitted via the first PUCCH.

The physical uplink control channel processing unit 619 performs DFT-Spread-OFDM based baseband signal processing on a signal for the second PUCCH, but does not perform DFT-Spread-OFDM based baseband signal processing on a signal for the first PUCCH. Here, with DFT-Spread-OFDM based baseband signal processing, which means to perform DFT processing on a signal of the UCI to convert it into a signal in the frequency domain, and subsequently allocate the signal in an arbitrary subcarrier to perform IFFT, the signal of the UCI is directly allocated in an arbitrary subcarrier to be subjected to IFFT when DFT-Spread-OFDM based baseband signal processing is not performed. The physical uplink control channel processing unit 619 generates signals for the first PUCCH when generating a signal from ACK/NACK information bits, generating a signal from SR information bits, or generating a signal from CQI information bits. Here ACK/NACK information bits include information explicitly indicated by the modulated signal in ACK/NACK channel selection, and also ACK/NACK information for a single PDSCH without application of the ACK/NACK channel selection. The physical uplink control channel processing unit 619 generates a signal for the second PUCCH when generating a signal from a plurality of ACK/NACK information bits as information explicitly indicated by the modulated signal.

In addition, the physical uplink control channel processing unit 619 performs signal processing related to code multiplexing in the frequency domain and/or code multiplexing in the time domain on the signal generated from the UCI. The physical uplink control channel processing unit 619 multiplies the signal of the first PUCCH with a code sequence instructed from the control unit 405 in order to realize code multiplexing in the frequency domain. The physical uplink control channel processing unit 619 multiplies a signal of the first PUCCH or a signal of the second PUCCH with a code sequence instructed from the control unit 405 in order to realize code multiplexing in the time domain.

In addition, the physical uplink control channel processing unit 619 performs signal processing which applies transmission diversity on a signal of the PUCCH, based on the instruction from the control unit 405. As a method of transmission diversity, there is used a method of transmitting, using a plurality of transmitting antenna ports, signals generated from the same information using orthogonal resources between each transmitting antenna ports in the frequency domain and/or the code domain. A mobile station apparatus 5 which does not include a plurality of transmitting antennas does not perform signal processing which applies transmission diversity. Also with a mobile station apparatus 5 having a plurality of transmitting antennas, it may be preliminarily set in the initial setting of communication that a plurality of transmitting antennas will not be used for communication, and signal processing which applies transmission diversity will not be performed also in such a case. If an instruction indicating not to apply transmission diversity is issued from the control unit 405 to the physical uplink control channel processing unit 619, signals of the PUCCH are transmitted using a single transmitting antenna, and the single transmitting antenna used in this case is defined as a transmitting antenna 411-1, and description is provided for a case using the subcarrier mapping unit 621-1, the IFFT unit 623-1, the GI insertion unit 625-1, the transmit power adjustment unit 627-1, the component carrier synthesis unit 603-1, the D/A unit 605-1, and the transmission RF unit 607-1. Using a code sequence input from the control unit 405 for a piece of input ACK/NACK information, the physical uplink control channel processing unit 619 generates a signal to be transmitted using a PUCCH resource, and outputs it to the subcarrier mapping unit 621-1.

Next, a case will be described where application of transmission diversity is instructed from the control unit 405 to the physical uplink control channel processing unit 619. First, a case will be described where orthogonal resources in the code domain are used for transmission diversity, and a code sequence used for code multiplexing in the time domain is used as orthogonal resources. Using a code sequence to be used for two types of code multiplexing in the time domain, input from the control unit 405 for a piece of the input ACK/NACK information, the physical uplink control channel processing unit 619 generates signals to be transmitted using two PUCCH resources, and outputs each of the generated signals to the subcarrier mapping unit 621-1 and the subcarrier mapping unit 621-2. The physical uplink control channel processing unit 619 multiplies each code in the code sequence with a signal allocated in each SC-FDMA symbol. Next, a case will be described where orthogonal resources in the code domain are used for transmission diversity, and a code sequence used for code multiplexing in the frequency domain is used as orthogonal resources. Using a code sequence to be used for two types of code multiplexing in the frequency domain, input from the control unit 405 for a piece of the input ACK/NACK information, the physical uplink control channel processing unit 619 generates signals to be transmitted using two PUCCH resources, and outputs each of the generated signals to the subcarrier mapping unit 621-1 and the subcarrier mapping unit 621-2. The physical uplink control channel processing unit 619 multiplies each code in the code sequence with a signal allocated in each subcarrier. Next, a case will be described where orthogonal resources in the frequency domain are used for transmission diversity. The physical uplink control channel processing unit 619 generates two signals for a piece of the input ACK/NACK information, and outputs each of the generated signals to the subcarrier mapping unit 621-1 and the subcarrier mapping unit 621-2. In the subcarrier mapping unit 621-1 and the subcarrier mapping unit 621-2, signals are allocated in PUCCH resources in different uplink physical resource blocks.

Based on the instruction from the control unit 405, the uplink pilot channel processing unit 617 generates an uplink reference signal which is a signal known to the base station apparatus 3, and outputs it to the subcarrier mapping unit 621. When the signal generated from the UCI is output from the physical uplink control channel processing unit 619 to both subcarrier mapping units 621 (subcarrier mapping units 621-1 and 621-2), the uplink pilot channel processing unit 617 outputs the uplink reference signal to both the subcarrier mapping units 621, based on the instruction from the control unit 405.

According to the instruction from the control unit 405, the subcarrier mapping unit 621 allocates signals input from the uplink pilot channel processing unit 617, signals input from the DFT unit 615, and signals input from the physical uplink control channel processing unit 619 to a subcarrier, and outputs it to the IFFT unit 623.

The IFFT unit 623 performs Inverse Fast Fourier Transform on the signal output from the subcarrier mapping unit 621, and outputs it to the GI insertion unit 625. Here, the number of points of the IFFT unit 623 is larger than the number of points of the DFT unit 615, and thus the mobile station apparatus 5 uses the DFT unit 615, the subcarrier mapping unit 621, and the IFFT unit 623 to perform DFT-Spread-OFDM based modulation on signals to be transmitted using the PUSCH. In addition, the mobile station apparatus 5 uses the physical uplink control channel processing unit 619, the subcarrier mapping unit 621, and the IFFT unit 623 to realize DFT-Spread-OFDM based modulation on signals to be transmitted using the second PUCCH. The GI insertion unit 625 adds a guard interval to the signal input from the IFFT unit 623, and outputs it to the transmit power adjustment unit 627.

For the signal input from the GI insertion unit 625, the transmit power adjustment unit 627 adjusts transmit power based on the control signal from the control unit 405, and outputs it to component carrier synthesis unit 603. The transmit power adjustment unit 627 controls the average transmit power of the PUSCH, the PUCCH, and the uplink pilot channel for each uplink subframe.

The component carrier synthesis unit 603 synthesizes the signal for each uplink component carrier input from each of the per-uplink-component carrier transmission processing units 601, and outputs it to the D/A unit 605. The D/A unit 605 converts the baseband digital signal input from the component carrier synthesis unit 603 into an analog signal, and outputs it to the transmission RF unit 607. The transmission RF unit 607 generates in-phase components and quadrature-phase components of the intermediate frequency from the analog signal input from the D/A unit 605, and removes unnecessary frequency components for the intermediate frequency band. Next, the transmission RF unit 607 converts (up-converts) the intermediate frequency signal into a high frequency signal, removes unnecessary frequency components, amplifies its power, and transmits it to the base station apparatus 3 via the transmitting antenna 411.

With the above configuration, the transmission processing unit 407 transmits the signal of the PUCCH applying transmission diversity according to the control result of the control unit 405, or transmits it without applying transmission diversity. For example, two signals are generated in the physical uplink control channel processing unit 619 based on one ACK/NACK, in other words, signals to be transmitted using two PUCCH resources are generated, and PUCCHs including signals based on the same ACK/NACK information are transmitted from two transmitting antennas 411 (transmitting antennas 411-1 and 411-2).

<Control of Application of Transmission Diversity>

The control unit 405 of the mobile station apparatus 5 controls application of transmission diversity to a PUCCH to be used for transmitting an ACK/NACK generated in the uplink control information generating unit 4051, according to the situation of the cell in which the PDCCH has been detected. The control unit 405 controls application of transmission diversity, according to at least two different situations, namely, the first and the second situations, with regard to the situation of the cell. The first situation is a situation where the PDCCH has been detected only in a primary cell. The second situation is a situation where at least one of the cells in which the PDCCH has been detected is a secondary cell. The control unit 405 controls so as to apply transmission diversity to the PUCCH in the first situation and controls so as not to apply transmission diversity to the PUCCH in the second situation.

A case will be described where ACK/NACK channel selection is applied. First, description will be provided to processing in the mobile station apparatus 5 to which applied is the relation among ACK/NACK information, resources selected by ACK/NACK channel selection, and signal points of the QPSK shown in FIG. 15. A resource assigned by implicit resource assignment based on the CCE of the PDCCH is used as the Resource 1. When a PDCCH corresponding to a PDSCH of a secondary cell is transmitted via a primary cell, a resource assigned by implicit resource assignment based on the CCE of the PDCCH is used as the Resource 2. In such a case, since the PDCCH has been detected only in a primary cell, the control unit 405 controls, upon detecting a PDCCH, so as to apply transmission diversity to the PUCCH. The transmission processing unit 407 transmits the PUCCH with transmission diversity using a resource (Resource 1 or Resource 2) of the first PUCCH implicitly associated with the CCE used for the PDCCH. If the first PUCCH resource assigned by implicit resource assignment to the first transmitting antenna to be used for transmission diversity of the PUCCH is used, the first PUCCH resource assigned to the second transmitting antenna similarly by implicit resource assignment will be used. Specifically, the first PUCCH resource used for the second transmitting antenna is a resource having the next identification number to the first PUCCH resource used for the first transmitting antenna. For simplicity, description of the first PUCCH resource used for the second transmitting antenna to be used for transmission diversity is omitted in the following.

When a PDCCH corresponding to a PDSCH of a secondary cell is transmitted via the secondary cell, a resource assigned by explicit resource assignment based on the control information explicitly included in the PDCCH is used as the Resource 2. In such a case, the control unit 405 controls, upon detecting a PDCCH only in a primary cell, so as to apply transmission diversity to the PUCCH. The transmission processing unit 407 transmits the PUCCH with transmission diversity using the first PUCCH resource (Resource 1) implicitly associated with the CCE used for the PDCCH. On the other hand, the control unit 405 controls, upon detecting a PDCCH in at least a secondary cell, so as not to apply transmission diversity to the PUCCH. The transmission processing unit 407 transmits the PUCCH via a single transmitting antenna using the first PUCCH resource (Resource 1) implicitly associated with the CCE used for the PDCCH, or the first PUCCH resource (Resource 2) explicitly indicated in the control information explicitly included in the PDCCH. Since transmission diversity is performed using only the first PUCCH resource implicitly associated with the CCE as described above, it is not necessary to newly reserve a resource for transmission diversity for the mobile station apparatus 5 with regard to an explicit resource, and whereby increase of overhead can be avoided.

Next, description will be provided to processing in the mobile station apparatus 5 to which applied is the relation among ACK/NACK information, resources selected in ACK/NACK channel selection, and signal points of the QPSK shown in FIG. 16. A resource assigned by implicit resource assignment based on the CCE of the PDCCH is used as the Resource 1. When a PDCCH corresponding to a PDSCH of a secondary cell is transmitted via a primary cell, a resource assigned by implicit resource assignment based on the CCE of the PDCCH is used as the Resource 2. In such a case, since the PDCCH has been detected only in a primary cell, the control unit 405 controls, upon detecting a PDCCH, so as to apply transmission diversity to the PUCCH. The transmission processing unit 407 transmits the PUCCH with transmission diversity using the first PUCCH resource (Resource 1 or Resource 2) implicitly associated with the CCE used for the PDCCH.

When a PDCCH corresponding to a PDSCH of a secondary cell is transmitted via a secondary cell, a resource assigned by explicit resource assignment based on the control information explicitly included in the PDCCH is used as the Resource 2. In such a case, the control unit 405 controls, upon detecting a PDCCH only in a primary cell, so as to apply transmission diversity to the PUCCH. The transmission processing unit 407 transmits the PUCCH with transmission diversity using the first PUCCH resource (Resource 1) implicitly associated with the CCE used for the PDCCH. On the other hand, the control unit 405 controls, upon detecting a PDCCH in at least a secondary cell, so as not to apply transmission diversity to the PUCCH. The transmission processing unit 407 transmits the PUCCH via a single transmitting antenna using the first PUCCH resource (Resource 1) implicitly associated with the CCE used for the PDCCH, or the first PUCCH resource (Resource 2) explicitly indicated in the control information explicitly included in the PDCCH.

Next, description will be provided to processing in the mobile station apparatus 5 to which applied is the relation among ACK/NACK information, resources selected in ACK/NACK channel selection, and signal points of the QPSK shown in FIG. 17. First, a case will be described where two cells are used for Cell aggregation to perform a single data transmission in a primary cell and two data transmissions in a secondary cell. A resource assigned by implicit resource assignment based on the CCE of the PDCCH is used as the Resource 1. When a PDCCH corresponding to a PDSCH of a secondary cell is transmitted via a primary cell, a resource assigned by implicit resource assignment based on the CCE of the PDCCH is used as the Resource 2 and the Resources 3. In such a case, since the PDCCH has been detected only in a primary cell, the control unit 405 controls, upon detecting a PDCCH, so as to apply transmission diversity to the PUCCH. The transmission processing unit 407 transmits the PUCCH with transmission diversity using the first PUCCH resource (Resource 1, Resource 2, or Resource 3) implicitly associated with the CCE used for the PDCCH. When a PDCCH corresponding to a PDSCH of a secondary cell is transmitted via a secondary cell, a resource assigned by explicit resource assignment based on the control information explicitly included in the PDCCH is used as the Resource 2 and the Resource 3. In such a case, the control unit 405 controls, upon detecting a PDCCH only in a primary cell, so as to apply transmission diversity to the PUCCH. The transmission processing unit 407 transmits the PUCCH with transmission diversity using the first PUCCH resource (Resource 1) implicitly associated with the CCE used for the PDCCH. On the other hand, the control unit 405 controls, upon detecting a PDCCH in at least a secondary cell, so as not to apply transmission diversity to the PUCCH. The transmission processing unit 407 transmits the PUCCH via a single transmitting antenna using the first PUCCH resource (Resource 1) implicitly associated with the CCE used for the PDCCH, or the first PUCCH resource (Resource 2 or Resource 3) explicitly indicated in the control information explicitly included in the PDCCH. Since transmission diversity is performed using only the first PUCCH resource implicitly associated with the CCE as described above, it is not necessary to newly reserve a resource for transmission diversity for the mobile station apparatus 5 with regard to an explicit resource, and whereby increase of overhead can be avoided.

Next, a case will be described where three cells are used for Cell aggregation to perform a single data transmission in a primary cell and a single data transmission in each secondary cell (secondary cell 1 and secondary cell 2). A resource assigned by implicit resource assignment based on the CCE of the PDCCH is used as the Resource 1. When a PDCCH corresponding to a PDSCH of a secondary cell 1 and a PDCCH corresponding to a PDSCH of a secondary cell 2 are transmitted via a primary cell, a resource assigned by implicit resource assignment based on the CCE of the PDCCH is used as the Resource 2 and the Resources 3. In such a case, since the PDCCH has been detected only in a primary cell, the control unit 405 controls, upon detecting a PDCCH, so as to apply transmission diversity to the PUCCH. The transmission processing unit 407 transmits the PUCCH with transmission diversity using the first PUCCH resource (Resource 1, Resource 2, or Resource 3) implicitly associated with the CCE used for the PDCCH.

When a PDCCH corresponding to a PDSCH of a secondary cell 1 is transmitted via the primary cell and a PDCCH corresponding to a PDSCH of a secondary cell 2 is transmitted via the secondary cell 2, a resource assigned by implicit resource assignment based on the CCE of the PDCCH is used as the Resource 2, and a resource assigned by explicit resource assignment based on the control information explicitly included in the PDCCH is used as the Resource 3. In such a case, the control unit 405 controls, upon detecting a PDCCH only in a primary cell, so as to apply transmission diversity to the PUCCH. The transmission processing unit 407 transmits the PUCCH with transmission diversity using the first PUCCH resource (Resource 1 or Resource 2) implicitly associated with the CCE used for the PDCCH. On the other hand, the control unit 405 controls, upon detecting a PDCCH in at least the secondary cell 2, so as not to apply transmission diversity to the PUCCH. The transmission processing unit 407 transmits the PUCCH via a single transmitting antenna using the first PUCCH resource (Resource 1 or Resource 2) implicitly associated with the CCE used for the PDCCH, or the first PUCCH resource (Resource 3) explicitly indicated in the control information explicitly included in the PDCCH.

When a PDCCH corresponding to a PDSCH of a secondary cell 1 is transmitted via the secondary cell 1 and a PDCCH corresponding to a PDSCH of a secondary cell 2 is transmitted via the primary cell, a resource assigned by explicit resource assignment based on the control information explicitly included in the PDCCH is used as the Resource 2, and a resource assigned by implicit resource assignment based on the CCE of the PDCCH is used as the Resource 3. In such a case, the control unit 405 controls, upon detecting a PDCCH only in a primary cell, so as to apply transmission diversity to the PUCCH. The transmission processing unit 407 transmits the PUCCH with transmission diversity using the first PUCCH resource (Resource 1 or the Resource 3) implicitly associated with the CCE used for the PDCCH. On the other hand, the control unit 405 controls, upon detecting a PDCCH in at least the secondary cell 1, so as not to apply transmission diversity to the PUCCH. The transmission processing unit 407 transmits the PUCCH via a single transmitting antenna using the first PUCCH resource (Resource 1 or Resource 3) implicitly associated with the CCE used for the PDCCH, or the first PUCCH resource (Resource 2) explicitly indicated in the control information explicitly included in the PDCCH. Since transmission diversity is performed using only the first PUCCH resource implicitly associated with the CCE as described above, it is not necessary to newly reserve a resource for transmission diversity for the mobile station apparatus 5 with regard to an explicit resource, and whereby increase of overhead can be avoided.

Next, description will be provided to processing in the mobile station apparatus 5 to which applied is the relation among ACK/NACK information, resources selected in ACK/NACK channel selection, and signal points of the QPSK shown in FIG. 18. First, a case will be described where two cells are used for Cell aggregation to perform two data transmissions in a primary cell and two data transmissions in a secondary cell. A resource assigned by implicit resource assignment based on the CCE of the PDCCH is used as the Resource 1 and the Resource 2. When a PDCCH corresponding to a PDSCH of a secondary cell is transmitted via a primary cell, a resource assigned by implicit resource assignment based on the CCE of the PDCCH is used as the Resource 3 and the Resource 4. In such a case, since the PDCCH has been detected only in a primary cell, the control unit 405 controls, upon detecting a PDCCH, so as to apply transmission diversity to a PUCCH. The transmission processing unit 407 transmits the PUCCH with transmission diversity using the first PUCCH resource (Resource 1, Resource 2, Resource 3, or Resource 4) implicitly associated with the CCE used for the PDCCH.

When a PDCCH corresponding to a PDSCH of a secondary cell is transmitted via a secondary cell, a resource assigned by explicit resource assignment based on the control information explicitly included in the PDCCH is used as the Resource 3 and the Resource 4. In such a case, the control unit 405 controls, upon detecting a PDCCH only in a primary cell, so as to apply transmission diversity to the PUCCH. The transmission processing unit 407 transmits the PUCCH with transmission diversity using the first PUCCH resource (Resource 1) implicitly associated with the CCE used for the PDCCH. On the other hand, the control unit 405 controls, upon detecting a PDCCH in at least a secondary cell, so as not to apply transmission diversity to the PUCCH. The transmission processing unit 407 transmits the PUCCH via a single transmitting antenna using the first PUCCH resource (Resource 1 or Resource 2) implicitly associated with the CCE used for the PDCCH, or the first PUCCH resource (Resource 3 or Resource 4) explicitly indicated in the control information explicitly included in the PDCCH. Since transmission diversity is performed using only the first PUCCH resource implicitly associated with the CCE as described above, it is not necessary to newly reserve a resource for transmission diversity for the mobile station apparatus 5 with regard to an explicit resource, and whereby increase of overhead can be avoided.

Next, a case will be described where three cells are used for Cell aggregation to perform a single data transmission in a primary cell and two data transmissions in each secondary cell (secondary cell 1 and secondary cell 2). A resource assigned by implicit resource assignment based on the CCE of the PDCCH is used as the Resource 1 and the Resource 2. When a PDCCH corresponding to a PDSCH of the secondary cell 1 and a PDCCH corresponding to a PDSCH of the secondary cell 2 are transmitted via a primary cell, a resource assigned by implicit resource assignment based on the CCE of the PDCCH is used as the Resource 3 and the Resource 4. In such a case, since the PDCCH has been detected only in a primary cell, the control unit 405 controls, upon detecting a PDCCH, so as to apply transmission diversity to a PUCCH. The transmission processing unit 407 transmits the PUCCH with transmission diversity using the first PUCCH resource (Resource 1, Resource 2, Resource 3, or Resource 4) implicitly associated with the CCE used for the PDCCH.

When a PDCCH corresponding to a PDSCH of the secondary cell 1 is transmitted via a primary cell and a PDCCH corresponding to a PDSCH of the secondary cell 2 is transmitted via the secondary cell 2, a resource assigned by implicit resource assignment based on the CCE of the PDCCH is used as the Resource 3, and a resource assigned by explicit resource assignment based on the control information explicitly included in the PDCCH is used as the Resource 4. In such a case, the control unit 405 controls, upon detecting a PDCCH only in a primary cell, so as to apply transmission diversity to the PUCCH. The transmission processing unit 407 transmits the PUCCH with transmission diversity using the first PUCCH resource (Resource 1 or Resource 2) implicitly associated with the CCE used for the PDCCH. On the other hand, the control unit 405 controls, upon detecting a PDCCH in at least the secondary cell 2, so as not to apply transmission diversity to the PUCCH. The transmission processing unit 407 transmits the PUCCH via a single transmitting antenna using the first PUCCH resource (Resource 1, Resource 2, or Resource 3) implicitly associated with the CCE used for the PDCCH, or the first PUCCH resource (Resource 4) explicitly indicated in the control information explicitly included in the PDCCH.

When a PDCCH corresponding to a PDSCH of the secondary cell 1 is transmitted via the secondary cell 1 and a PDCCH corresponding to a PDSCH of the secondary cell 2 is transmitted via the primary cell, a resource assigned by explicit resource assignment based on the control information explicitly included in the PDCCH is used as the Resource 3, and a resource assigned by implicit resource assignment based on the CCE of the PDCCH is used as the Resource 4. In such a case, the control unit 405 controls, upon detecting a PDCCH only in a primary cell, so as to apply transmission diversity to the PUCCH. The transmission processing unit 407 transmits the PUCCH with transmission diversity using the first PUCCH resource (Resource 1, Resource 2, or Resource 4) implicitly associated with the CCE used for the PDCCH. On the other hand, the control unit 405 controls, upon detecting a PDCCH in at least the secondary cell 1, so as not to apply transmission diversity to the PUCCH. The transmission processing unit 407 transmits the PUCCH via a single transmitting antenna using the first PUCCH resource (Resource 1, Resource 2, or Resource 4) implicitly associated with the CCE used for the PDCCH, or the first PUCCH resource (Resource 3) explicitly indicated in the control information explicitly included in the PDCCH. Since transmission diversity is performed using only the first PUCCH resource implicitly associated with the CCE as described above, it is not necessary to newly reserve a resource for transmission diversity for the mobile station apparatus 5 with regard to an explicit resource, and whereby increase of overhead can be avoided.

Next, a case will be described where four cells are used for Cell aggregation to perform a single data transmission in a primary cell and a single data transmission in each secondary cell (secondary cell 1, secondary cell 2, and secondary cell 3). A resource assigned by implicit resource assignment based on the CCE of the PDCCH is used as the Resource 1. When a PDCCH corresponding to a PDSCH of the secondary cell 1, a PDCCH corresponding to a PDSCH of the secondary cell 2 and a PDCCH corresponding to a PDSCH of the secondary cell 3 are transmitted via a primary cell, a resource assigned by implicit resource assignment based on the CCE of the PDCCH is used as the Resource 2, the Resource 3, and the Resource 4. In such a case, since the PDCCH has been detected only in a primary cell, the control unit 405 controls, upon detecting a PDCCH, so as to apply transmission diversity to a PUCCH. The transmission processing unit 407 transmits the PUCCH with transmission diversity using the first PUCCH resource (Resource 1, Resource 2, Resource 3, or Resource 4) implicitly associated with the CCE used for the PDCCH.

When a PDCCH corresponding to a PDSCH of the secondary cell 1 is transmitted via a primary cell, a PDCCH corresponding to a PDSCH of the secondary cell 2 is transmitted via the secondary cell 2, and a PDCCH corresponding to a PDSCH of the secondary cell 3 is transmitted via the secondary cell 3, a resource assigned by implicit resource assignment based on the CCE of the PDCCH is used as the Resource 2, and a resource assigned by explicit resource assignment based on the control information explicitly included in the PDCCH is used as the Resource 3 and the Resource 4. In such a case, the control unit 405 controls, upon detecting a PDCCH only in a primary cell, so as to apply transmission diversity to the PUCCH. The transmission processing unit 407 transmits the PUCCH with transmission diversity using the first PUCCH resource (Resource 1 or Resource 2) implicitly associated with the CCE used for the PDCCH. On the other hand, the control unit 405 controls, upon detecting a PDCCH in at least a secondary cell (secondary cell 2 or secondary cell 3), so as not to apply transmission diversity to the PUCCH. The transmission processing unit 407 transmits the PUCCH via a single transmitting antenna using the first PUCCH resource (Resource 1 or Resource 2) implicitly associated with the CCE used for the PDCCH, or the first PUCCH resource (Resource 3 or Resource 4) explicitly indicated in the control information explicitly included in the PDCCH. Since transmission diversity is performed using only the first PUCCH resource implicitly associated with the CCE as described above, it is not necessary to newly reserve a resource for transmission diversity for the mobile station apparatus 5 with regard to an explicit resource, and whereby increase of overhead can be avoided.

Since substantially similar processing is performed when a PDCCH corresponding to a PDSCH of the secondary cell 1 is transmitted via the secondary cell 1, a PDCCH corresponding to a PDSCH of the secondary cell 2 is transmitted via a primary cell, and a PDCCH corresponding to a PDSCH of the secondary cell 3 is transmitted via the secondary cell 3, as when a PDCCH corresponding to a PDSCH of the secondary cell 1 is transmitted via a primary cell, a PDCCH corresponding to a PDSCH of the secondary cell 2 is transmitted via the secondary cell 2, and a PDCCH corresponding to a PDSCH of the secondary cell 3 is transmitted via the secondary cell 3, description thereof is omitted. Since substantially similar processing is performed when a PDCCH corresponding to a PDSCH of the secondary cell 1 is transmitted via the secondary cell 1, a PDCCH corresponding to a PDSCH of the secondary cell 2 is transmitted via the secondary cell 2, and a PDCCH corresponding to a PDSCH of the secondary cell 3 is transmitted via the primary cell 3, as when a PDCCH corresponding to a PDSCH of the secondary cell 1 is transmitted via a primary cell, a PDCCH corresponding to a PDSCH of the secondary cell 2 is transmitted via the secondary cell 2, and a PDCCH corresponding to a PDSCH of the secondary cell 3 is transmitted via the secondary cell 3, description thereof is omitted.

When a PDCCH corresponding to a PDSCH of the secondary cell 1 is transmitted via the secondary cell 1, a PDCCH corresponding to a PDSCH of the secondary cell 2 is transmitted via the secondary cell 2, and a PDCCH corresponding to a PDSCH of the secondary cell 3 is transmitted via the secondary cell 3, a resource assigned by explicit resource assignment based on the control information explicitly included in the PDCCH is used as the Resource 2, the Resource 3, and the Resource 4. In such a case, the control unit 405 controls, upon detecting a PDCCH only in a primary cell, so as to apply transmission diversity to the PUCCH. The transmission processing unit 407 transmits the PUCCH with transmission diversity using the first PUCCH resource (Resource 1) implicitly associated with the CCE used for the PDCCH. On the other hand, the control unit 405 controls, upon detecting a PDCCH in at least a secondary cell (secondary cell 1, secondary cell 2, or secondary cell 3), so as not to apply transmission diversity to the PUCCH. The transmission processing unit 407 transmits the PUCCH via a single transmitting antenna using the first PUCCH resource (Resource 1) implicitly associated with the CCE used for the PDCCH, or the first PUCCH resource (Resource 2, Resource 3, or Resource 4) explicitly indicated in the control information explicitly included in PDCCH. Since transmission diversity is performed using only the first PUCCH resource implicitly associated with the CCE as described above, it is not necessary to newly reserve a resource for transmission diversity for the mobile station apparatus 5 with regard to an explicit resource, and whereby increase of overhead can be avoided. Since essentially similar processing is performed when Cross CC scheduling is applied between secondary cells and no PDCCH corresponding to a PDSCH of a secondary cell is transmitted via a primary cell, description thereof is omitted.

A case will be described where a PUCCH (PUCCH format 3) using a DFT-Spread-OFDM method is applied for transmitting an ACK/NACK. The control unit 405 of the mobile station apparatus 5 controls application of transmission diversity to a PUCCH used for transmitting an ACK/NACK generated in the uplink control information generating unit 4051, according to the situation of a cell in which the PDSCH has been received. The control unit 405 controls application of transmission diversity according to at least two different situations, namely, the third and the fourth situations, with regard to the situation of a cell. The third situation is a situation where the PDSCH has been received only in a primary cell. The fourth situation is a situation where at least one of the cells in which the PDSCH has been received is a secondary cell. The control unit 405 controls so as to apply transmission diversity to the PUCCH in the third situation and controls so as not to apply transmission diversity to the PUCCH in the fourth situation. Since transmission diversity is performed using only the first PUCCH resource implicitly associated with the CCE as described above, it is not necessary to newly reserve a resource for transmission diversity for the mobile station apparatus 5 with regard to an explicit resource, and whereby increase of overhead can be avoided.

It is also possible to apply similar processing to simplify the processing with regard to the control of applying transmission diversity for both the case where ACK/NACK channel selection is applied and the case where a PUCCH using a DFT-Spread-OFDM method is applied. In both cases, the control unit 405 may control, upon receiving a PDSCH only in a primary cell, so as to apply transmission diversity to the PUCCH, and may control, upon receiving a PDSCH in at least a secondary cell, so as not to apply transmission diversity to the PUCCH.

FIG. 7 is a flow chart illustrating exemplary processing relating to the control of applying transmission diversity to a PUCCH of the control unit 405 of the mobile station apparatus 5 according to an embodiment of the present invention. Here, processing for a case where ACK/NACK channel selection is applied as a method of transmitting an ACK/NACK will be described. In other words, a case will be described where the base station apparatus 3 has allowed the mobile station apparatus 5 to apply transmission diversity, and has set ACK/NACK channel selection as the transmission method of an ACK/NACK. Here, the base station apparatus 3 preliminarily has notified the mobile station apparatus 5 having a plurality of transmitting antenna ports, of information indicating whether or not to allow application of transmission diversity to the PUCCH using signaling (RRC signaling). The mobile station apparatus 5 which has been preliminarily allowed to apply transmission diversity by the base station apparatus 3 using RRC signaling actually controls whether or not to apply transmission diversity to the PUCCH according to the situation of the cell in which the PDCCH is detected. The mobile station apparatus 5 which has not been preliminarily allowed to apply transmission diversity by the base station apparatus 3 using RRC signaling always controls so as not to apply transmission diversity to the PUCCH. When transmission diversity is not applied, the mobile station apparatus 5 controls so as to transmit the PUCCH using a single antenna port. Here, instead of the information indicating whether or not to allow application of transmission diversity to the PUCCH, information indicating whether or not to allow application of transmission using a plurality of transmitting antenna ports to the PUCCH may be notified from the base station apparatus 3 to the mobile station apparatus 5 using RRC signaling.

The control unit 405 of the mobile station apparatus 5 determines whether or not an ACK/NACK has been generated in the uplink control information generating unit 4051 (step S101). The control unit 405, when determining that an ACK/NACK has been generated in the uplink control information generating unit 4051 (YES in step S101), determines whether or not the PDCCH has been detected by the reception processing unit 401 only in a primary cell (step S102). The control unit 405, when determining that the PDCCH has been detected by the reception processing unit 401 only in a primary cell (YES in step S102), controls so as to apply transmission diversity to the PUCCH in the transmission processing unit 407 (step S103). In other words, if it is indicated that a PDCCH has been detected only in a primary cell in the reception processing unit 401 and a PDSCH has been transmitted (YES in step S102), the control unit 405 controls so as to apply transmission diversity to the PUCCH in the transmission processing unit 407 (step S103). The control unit 405, when determining that the cell in which the PDCCH has been detected by the reception processing unit 401 is not only the primary cell (NO in step S102), in other words, when determining that the cell in which the PDCCH has been detected includes at least a secondary cell, controls so as not to apply transmission diversity to the PUCCH in the transmission processing unit 407 (step S104). On the other hand, the control unit 405, when determining that no ACK/NACK has been generated in the uplink control information generating unit 4051 (No in step S101), performs no processing with regard to application of transmission diversity to the PUCCH. The mobile station apparatus 5 transmits a signal of the first PUCCH after step S103 or step S104.

FIG. 8 is a flow chart illustrating exemplary processing relating to the control of applying transmission diversity to a PUCCH of the control unit 405 of the mobile station apparatus 5 according to an embodiment of the present invention. Here, processing for a case where a PUCCH (PUCCH format 3) using a DFT-Spread-OFDM method is applied will be described. In other words, a case will be described where the base station apparatus 3 has allowed the mobile station apparatus 5 to apply transmission diversity, and has set a PUCCH (PUCCH format 3) using a DFT-Spread-OFDM method as the transmission method of an ACK/NACK. Here, the base station apparatus 3 has preliminarily notified the mobile station apparatus 5 having a plurality of transmitting antenna ports, of information indicating whether or not to allow application of transmission diversity to the PUCCH, using signaling (RRC signaling). The mobile station apparatus 5 which has been preliminarily allowed to apply transmission diversity by the base station apparatus 3 using RRC signaling controls whether or not to actually apply transmission diversity to the PUCCH according to the situation of the cell in which the PDSCH is detected. The mobile station apparatus 5 which has not been preliminarily allowed to apply transmission diversity by the base station apparatus 3 using RRC signaling always controls so as not to apply transmission diversity to the PUCCH. When transmission diversity is not applied, the mobile station apparatus 5 controls so as to transmit the PUCCH using a single antenna port. Here, instead of the information indicating whether or not to allow application of transmission diversity to the PUCCH, information indicating whether or not to allow application of transmitting using a plurality of transmitting antenna ports to the PUCCH may be notified from the base station apparatus 3 to the mobile station apparatus 5 using RRC signaling.

The control unit 405 of the mobile station apparatus 5 determines whether or not an ACK/NACK has been generated in the uplink control information generating unit 4051 (step T101). The control unit 405, when determining that an ACK/NACK has been generated in the uplink control information generating unit 4051 (YES in step T101), determines whether or not the PDSCH has been received by the reception processing unit 401 only in a primary cell (step T102). The control unit 405, when determining that the PDSCH has been received by the reception processing unit 401 only in a primary cell (YES in step T102), controls so as to apply transmission diversity to the PUCCH in the transmission processing unit 407 (step T103). In other words, if it is indicated that a PDCCH has been detected in the reception processing unit 401 and a PDSCH has been transmitted only via a primary cell (YES in step T102), the control unit 405 controls so as to apply transmission diversity to the PUCCH in the transmission processing unit 407 (step T103). The control unit 405, when determining that the cells in which the PDSCH has been received by the reception processing unit 401 are not only the primary cell (NO in step T102), in other words, when determining that the cells in which the PDSCH has been received include at least a secondary cell, controls so as not to apply transmission diversity to the PUCCH in the transmission processing unit 407 (step T104). On the other hand, the control unit 405, when determining that no ACK/NACK has been generated in the uplink control information generating unit 4051 (NO in step T101), performs no processing with regard to application of transmission diversity of the PUCCH. The mobile station apparatus 5 transmits a signal of the first PUCCH after step T103 or step T104.

Also in a case where the base station apparatus 3 has allowed the mobile station apparatus 5 to apply transmission diversity and has set ACK/NACK channel selection as the method of transmitting an ACK/NACK, the mobile station apparatus 5 may control whether or not to apply transmission diversity to the PUCCH according to the situation of the cell in which a PDSCH is received. It is possible to apply similar processing to simplify the processing with regard to the control of applying transmission diversity for both the case where ACK/NACK channel selection is applied and the case where a PUCCH using a DFT-Spread-OFDM method is applied.

In the embodiment of the present invention, as described above, the mobile station apparatus 5 can control, according to the situation of the cell in which the PDCCH has been detected, so as to apply transmission diversity when a resource is implicitly assigned to the PUCCH and control so as not to apply transmission diversity when a resource is explicitly assigned to the PUCCH by controlling application of transmission diversity to the PUCCH used for transmitting an ACK/NACK, and consequently, it becomes unnecessary to reserve many PUCCH resources for transmission diversity for explicit resource assignment, and whereby increase of overhead can be avoided. More specifically, the mobile station apparatus 5 can avoid increase of overhead of the PUCCH resources by controlling application of transmission diversity according to the first situation where the PDCCH has been detected only in a primary cell and the second situation where at least one of the cells in which the PDCCH has been detected is a secondary cell, controlling so as to apply transmission diversity to the PUCCH in the first situation, and controlling so as not to apply transmission diversity to the PUCCH in the second situation. The present invention performs the above operation when ACK/NACK channel selection is applied as a method of transmitting an ACK/NACK, and whereby can transmit a signal of the PUCCH by applying transmission diversity as much as possible, while avoiding increase of overhead.

The present invention can apply transmission diversity as much as possible to enhance reception quality, while avoiding increase of overhead of PUCCH resources used for explicit resource assignment, by controlling application of transmission diversity according to the third situation where the PDSCH has been received only in a primary cell and the fourth situation where at least one of the cells in which the PDSCH has been received is a secondary cell, in a case where a PUCCH using a DFT-Spread-OFDM method is applied with regard to ACK/NACK transmission, controlling so as to apply transmission diversity to the PUCCH in the third situation and controlling so as not to apply transmission diversity to the PUCCH in the fourth situation.

When ACK/NACK channel selection is applied, application of transmission diversity to the PUCCH may be controlled according to the type of resource selected according to the ACK/NACK information of the PDSCH in the selection processing of the first PUCCH resource performed to implicitly indicate ACK/NACK information. In other words, application of transmission diversity to the PUCCH may be controlled according to whether the first PUCCH resource selected to be used for transmitting a modulated signal explicitly indicating ACK/NACK information is a resource assigned by implicit resource assignment or a resource assigned by explicit resource assignment. For example, description will be provided referring to FIG. 15. The Resource 1 is a resource assigned by implicit resource assignment based on the CCE. When a PDCCH corresponding to a PDSCH of a secondary cell is detected in a primary cell, the Resource 2 is a resource assigned by implicit resource assignment based on the CCE. In this case, since the selected resources (Resource 1 or Resource 2) are all resources assigned by implicit resource assignment, the mobile station apparatus 5, upon detecting a PDCCH, applies transmission diversity to transmit the PUCCH used for transmitting an ACK/NACK. When a PDCCH corresponding to a PDSCH of a secondary cell is detected in a secondary cell, the Resource 2 is assigned by explicit resource assignment based on the control information included in the PDCCH. The, the mobile station apparatus 5 controls so as to transmit the signal applying transmission diversity when transmitting the signal using the Resource 1 and to transmit a signal without applying transmission diversity when transmitting the signal using the Resource 2. The mobile station apparatus 5, when indicating an ACK to the PDSCH of a primary cell and indicating a NACK to the PDSCH of a secondary cell, transmits the signal using the Resource 1 and the first PUCCH resource having the next identification number in comparison with the first PUCCH resource used as the Resource 1, applying transmission diversity. The mobile station apparatus 5, when indicating a NACK to the PDSCH of a primary cell and indicating a NACK to the PDSCH of a secondary cell, transmits the signal using the first PUCCH resource having the next identification number as a result of comparison between the Resource 1 and the first PUCCH resource used as the Resource 1, applying transmission diversity. The mobile station apparatus 5, when indicating an ACK to the PDSCH of a primary cell and indicating an ACK to the PDSCH of a secondary cell, transmits the signal using only the Resource 2, without applying transmission diversity. The mobile station apparatus 5, when indicating a NACK to the PDSCH of a primary cell and indicating an ACK to the PDSCH of a secondary cell, transmits the signal using only the Resource 2, without applying transmission diversity. Accordingly, reception quality can be enhanced by applying transmission diversity as much as possible, while avoiding increase of overhead of PUCCH resources used for explicit resource assignment.

Here, the mobile station apparatus 5 is not limited to a mobile terminal, and the present invention may be realized by implementing the functions of the mobile station apparatus 5 on a fixed terminal.

The characteristic means of the invention described above can also be realized by implementing and controlling the functions on an integrated circuit. In other words, an integrated circuit of the present invention is an integrated circuit which causes the mobile station apparatus 5 to exhibit a plurality of functions by being mounted on the mobile station apparatus 5, and characterized by causing the mobile station apparatus 5 to exhibit a series of functions including a function of communicating with the base station apparatus 3 simultaneously using a plurality of cells, a function of performing detection processing of the physical downlink control channel in a plurality of cells, a function of generating a reception confirmation response to data of one or more physical downlink shared channels for which assignment of a resource is indicated in downlink control information included in one or more physical downlink control channels detected in a same subframe, a function of controlling application of transmission diversity to a physical uplink control channel according to the situation of the cell in which the physical downlink control channel has been detected, and a function of transmitting the generated reception confirmation response using the physical uplink control channel according to the result of controlling application of transmission diversity.

As thus described, the mobile station apparatus 5 using the integrated circuit of the present invention can enhance reception quality by applying transmission diversity as much as possible, while avoiding increase of overhead of PUCCH resources used for explicit resource assignment by controlling application of transmission diversity according to the first situation where the PDCCH has been detected only in a primary cell and the second situation where at least one of the cells in which the PDCCH has been detected is a secondary cell, controlling so as to apply transmission diversity to the PUCCH in the first situation, and controlling so as not to apply transmission diversity to the PUCCH in the second situation.

The operation described in the embodiment of the present invention may be realized by a program. The program which operates on the mobile station apparatus 5 and the base station apparatus 3 according to the present invention is a program which controls the CPU or the like to realize the functions of the above-mentioned embodiments according to the present invention (program which causes a computer to function). Information processed in such apparatuses is temporarily accumulated in a RAM at the time of processing, subsequently stored in various types of ROM and HDD, read out, modified or written by the CPU as necessary. As a recording medium for storing the program, any of a semiconductor medium (e.g, ROM, non-volatile memory card, etc.), an optical recording medium (e.g., DVD, MO, MD, CD, BD, etc.), a magnetic storage medium (e.g., magnetic tape, flexible disk, etc.) will be used. In addition to realizing the functions of the above-mentioned embodiments by executing the loaded program, functions of the present invention can also be realized by performing, based on the instruction of the program thereof, processing in conjunction with the operating system or other application programs.

In addition, for distribution in the market, the program may be stored and distributed in a portable recording medium, or transferred to a server computer connected via a network such as the Internet. In this case, the storage device of the server computer is also included in the present invention. In addition, a part or the whole of the mobile station apparatus 5 and the base station apparatus 3 in the above-mentioned embodiment may be realized as an LSI which is typically an integrated circuit. Each functional block of the mobile station apparatus 5 and the base station apparatus 3 may be implemented on a chip individually, or a part of the whole thereof may be integrated into a chip. In addition, the technique of forming an integrated circuit is not limited to that for the LSI and may be realized using a dedicated circuit or a general-purpose processor. In addition, if progress of semiconductor technology brings about a technology for forming an integrated circuit which replaces the LSI, an integrated circuit according to the technology may also be used.

(A) In addition, the present invention can employ the following aspect. That is, the mobile station apparatus of the present invention is a mobile station apparatus which communicates with a base station apparatus using a plurality of cells simultaneously, and includes a reception processing unit which performs detection processing of a physical downlink control channel for the plurality of cells, an uplink control information generating unit which generates a reception confirmation response to data of one or more physical downlink shared channels for which resource assignment is indicated by downlink control information included in one or more physical downlink control channels detected by the reception processing unit in a same subframe, a control unit which controls application of transmission diversity to a physical uplink control channel according to the situation of a cell in which the physical downlink control channel has been detected by the reception processing unit, and a transmission processing unit which transmits the reception confirmation response generated by the uplink control information generating unit according to the control result of the control unit, using the physical uplink control channel.

As thus described, by controlling application of transmission diversity to the PUCCH used for transmitting an ACK/NACK according to the situation of the cell in which the PDCCH has been detected, it is possible to control so as to apply transmission diversity when implicit resource assignment is performed on the PUCCH and control so as not to apply transmission diversity when explicit resource assignment is performed on the PUCCH, and consequently, it becomes unnecessary to reserve many PUCCH resources for transmission diversity for explicit resource assignment, whereby enabling transmission of signals of the PUCCH by applying transmission diversity as much as possible, while avoiding increase of overhead.

(B) Additionally, the mobile station apparatus of the present invention is characterized in that the transmission diversity is a method of transmitting signals generated from a same reception confirmation response using a plurality of transmitting antenna ports and using orthogonal resources in the frequency domain and/or the code domain between respective transmitting antenna ports.

As thus described, by using transmission diversity which transmits signals generated from a same ACK/NACK by using a plurality of transmitting antenna ports and by using orthogonal resources in the frequency domain and/or the code domain between respective transmitting antenna ports, and by controlling application of transmission diversity to the PUCCH used for transmitting an ACK/NACK according to the situation of the cell in which the PDCCH has been detected, it becomes unnecessary to reserve many PUCCH resources for transmission diversity for explicit resource assignment, whereby enabling transmission of signals of the PUCCH by applying transmission diversity as much as possible, while avoiding increase of overhead.

(C) In addition, the mobile station apparatus of the present invention is characterized in that the plurality of cells includes one primary cell and one or more secondary cells, and the situation of the cell includes at least two different situations, namely, a first and a second situation, the first situation is a situation where the physical downlink control channel has been detected only in a primary cell, and the second situation a situation where at least one of the cells in which the physical downlink control channel has been detected is a secondary cell.

As thus described, by controlling application of transmission diversity to the PUCCH used for transmitting an ACK/NACK according to the first situation where the PDCCH has been detected only in a primary cell and the second situation where at least one of the cells in which the PDCCH has been detected is a secondary cell, it is possible to control so as to apply transmission diversity when implicit resource assignment is performed on the PUCCH and control so as not to apply transmission diversity when explicit resource assignment is performed on the PUCCH, and consequently, it becomes unnecessary to reserve many PUCCH resources for transmission diversity for explicit resource assignment, whereby enabling transmission of signals of the PUCCH by applying transmission diversity as much as possible, while avoiding increase of overhead.

(D) In addition, the mobile station apparatus of the present invention is characterized in that the control unit controls so as to apply transmission diversity to the physical uplink control channel in the first situation, and controls so as not to apply transmission diversity to the physical uplink control channel in the second situation.

As thus described, by controlling application of transmission diversity to the PUCCH used for transmitting an ACK/NACK according to the first situation where the PDCCH has been detected only in a primary cell and the second situation where at least one of the cells in which the PDCCH has been detected is a secondary cell, controlling so as to apply transmission diversity to the PUCCH in the first situation, and controlling so as not to apply transmission diversity to the PUCCH in the second situation, it is possible to control so as not to apply transmission diversity when explicit resource assignment is performed on the PUCCH, and consequently, it becomes unnecessary to reserve many PUCCH resources for transmission diversity for explicit resource assignment, whereby enabling transmission of signals of the PUCCH by applying transmission diversity as much as possible, while avoiding increase of overhead.

(E) In addition, the mobile station apparatus of the present invention is characterized in that the transmission processing unit transmits the physical uplink control channel using a resource implicitly associated with a control channel element used for the detected physical downlink control channel in the first situation, and transmits the physical uplink control channel using at least an explicitly indicated resource in the second situation.

As thus described, by controlling application of transmission diversity to the PUCCH used for transmitting an ACK/NACK according to the first situation where the PDCCH has been detected only in a primary cell and the second situation where at least one of the cells in which the PDCCH has been detected is a secondary cell, controlling so as to apply transmission diversity to the PUCCH in the first situation, controlling so as not to apply transmission diversity to the PUCCH in the second situation, transmitting the PUCCH using an implicitly assigned resource in the first situation, and transmitting the PUCCH using an explicitly assigned resource in the second situation, it becomes unnecessary to reserve many PUCCH resources for transmission diversity for explicit resource assignment, whereby enabling transmission of signals of the PUCCH by applying transmission diversity as much as possible, while avoiding increase of overhead.

(F) In addition, the communication system of the present invention is a communication system that includes a plurality of mobile station apparatuses and a base station apparatus which communicates with the mobile station apparatuses and that performs communication using a plurality of cells simultaneously, and characterized in that the base station apparatus has a transmitting unit which transmits signals to the mobile station apparatus and a receiving unit which receives signals from the mobile station apparatus, and the mobile station apparatus has a reception processing unit which performs detection processing of a physical downlink control channel in a plurality of cells, an uplink control information generating unit which generates a reception confirmation response to data of one or more physical downlink shared channels for which resource assignment is indicated by downlink control information included in one or more physical downlink control channels detected by the reception processing unit in a same subframe, a control unit which controls application of transmission diversity to a physical uplink control channel according to the situation of a cell in which the physical downlink control channel has been detected by the reception processing unit, and a transmission processing unit which transmits, using the physical uplink control channel, the reception confirmation response generated in the uplink control information generating unit according to the control result of the control unit.

As thus described, by controlling application of transmission diversity to the PUCCH used for transmitting an ACK/NACK according to the situation of the cell in which the PDCCH has been detected, it is possible to control so as to apply transmission diversity when implicit resource assignment is performed on the PUCCH and control so as not to apply transmission diversity when explicit resource assignment is performed on the PUCCH, and consequently, it becomes unnecessary to reserve many PUCCH resources for transmission diversity for explicit resource assignment, whereby enabling transmission of signals of the PUCCH by applying transmission diversity as much as possible, while avoiding increase of overhead.

(G) In addition, the communication method of the present invention is a communication method used for a mobile station apparatus which communicates with a base station apparatus using a plurality of cells simultaneously, and characterized by including at least steps of performing detection processing of a physical downlink control channel for a plurality of cells, generating a reception confirmation response to data of one or more physical downlink shared channels for which resource assignment is indicated by downlink control information included in one or more physical downlink control channels detected in a same subframe, controlling application of transmission diversity to a physical uplink control channel according to the situation of a cell in which the physical downlink control channel has been detected, and transmitting the generated reception confirmation response according to the control result of application of the transmission diversity, using the physical uplink control channel.

As thus described, by controlling application of transmission diversity to the PUCCH used for transmitting an ACK/NACK according to the situation of the cell in which the PDCCH has been detected, it is possible to control so as to apply transmission diversity when implicit resource assignment is performed on the PUCCH and control so as not to apply transmission diversity when explicit resource assignment is performed on the PUCCH, and consequently, it becomes unnecessary to reserve many PUCCH resources for transmission diversity for explicit resource assignment, whereby enabling transmission of signals of the PUCCH by applying transmission diversity as much as possible, while avoiding increase of overhead.

(H) In addition, the integrated circuit of the present invention is an integrated circuit which causes the mobile station apparatus to exhibit a plurality of functions by being mounted on the mobile station apparatus, and characterized by causing the mobile station apparatus to exhibit a series of functions including a function of communicating with the base station apparatus using a plurality of cells simultaneously, a function of performing detection processing of the physical downlink control channel in a plurality of cells, a function of generating a reception confirmation response to data of one or more physical downlink shared channels for which resource assignment is indicated in downlink control information included in one or more physical downlink control channels detected in a same subframe, a function of controlling application of transmission diversity to a physical uplink control channel according to the situation of the cell in which the physical downlink control channel has been detected, and a function of transmitting the generated reception confirmation response according to the control result of application of transmission diversity using the physical uplink control channel.

As thus described, by controlling application of transmission diversity to the PUCCH used for transmitting an ACK/NACK according to the situation of the cell in which the PDCCH has been detected, it is possible to control so as to apply transmission diversity when implicit resource assignment is performed on the PUCCH and control so as not to apply transmission diversity when explicit resource assignment is performed on the PUCCH, and consequently, it becomes unnecessary to reserve many PUCCH resources for transmission diversity for explicit resource assignment, whereby enabling transmission of signals of the PUCCH by applying transmission diversity as much as possible, while avoiding increase of overhead.

Although embodiments of the invention have been described in detail above referring to the drawings, specific configurations are not limited to the embodiments, and designs or the like in a range not deviating from the gist of the invention are also included in the scope of claims.

REFERENCE NUMERALS 3 base station apparatus
5 (A-C) mobile station apparatus
101 reception processing unit
103 radio resource control unit
105 control unit
107 transmission processing unit
109 receiving antenna
111 transmitting antenna
201 physical downlink shared channel processing unit
203 physical downlink control channel processing unit
205 downlink pilot channel processing unit
207 multiplexing unit
209 IFFT unit
211 GI insertion unit
213 D/A unit
215 transmission RF unit
219 turbo coding unit
221 data modulation unit
223 convolutional coding unit
225 QPSK modulation unit
301 reception RF unit
303 A/D unit
305 component carrier separation unit
307 per-uplink-component-carrier reception processing unit
309 symbol timing detection unit
311 GI removal unit
313 FFT unit
315 subcarrier demapping unit
317 channel estimation unit
319 PUSCH channel equalization unit
321 PUCCH channel equalization unit
323 IDFT unit
325 data demodulation unit
327 turbo decoding unit
329 physical uplink control channel detection unit 401 reception processing unit
403 radio resource control unit
405 control unit
407 transmission processing unit
409 receiving antenna
411 transmitting antenna
501 reception RF unit
503 A/D unit
505 symbol timing detection unit
507 GI removal unit
509 FFT unit
511 multiplexing separation unit
513 channel estimation unit
515 PDSCH channel compensation unit
517 physical downlink shared channel decoding unit
519 PDCCH channel compensation unit
521 physical downlink control channel decoding unit
523 data demodulation unit
525 turbo decoding unit
527 QPSK demodulation unit
529 Viterbi decoder unit
601 per-uplink-component-carrier transmission processing unit
603 component carrier synthesis unit
605 D/A unit
607 transmission RF unit
611 turbo coding unit
613 data modulation unit
615 DFT unit
617 uplink pilot channel processing unit
619 physical uplink control channel processing unit
621 subcarrier mapping unit
623 IFFT unit
625 GI insertion unit
627 transmit power adjustment unit
4051 uplink control information generating unit

The invention claimed is:

1. A mobile station apparatus configured to and/or programmed to communicate with a base station apparatus by using a plurality of downlink component carriers, the plurality of downlink component carriers including a first downlink component carrier and a second downlink component carrier, the mobile station apparatus comprising:
a transmitter configured to and/or programmed to transmit, to the base station apparatus, information of ACK/NACK for a physical downlink shared channel transmission indicated by a detection of a physical downlink control channel, the information of ACK/NACK being transmitted using one of a first physical uplink control channel format and a second physical uplink control channel format, wherein
in a case that there is the physical downlink shared channel transmission only on the first downlink component carrier, the first physical uplink control channel format is used for the transmission of the information of ACK/NACK,
in a case that there is the physical downlink shared channel transmission on the second downlink component carrier, the second physical uplink control channel format is used for the transmission of the information of ACK/NACK, and
the transmitter is configured to and/or programmed to use one of at least a first method and a second method to transmit the information of ACK/NACK, the first method being a method of using two first physical uplink control channel resources for two antenna ports with the first physical uplink control channel format, and the second method being a method of using one second physical uplink control channel resource for one antenna port with the second physical uplink control channel format.

2. The mobile station apparatus according to claim 1, wherein the transmitter is configured to transmit signals respectively on different ones of the two antenna ports, using the two first physical uplink control channel resources in a case that the information of ACK/NACK is transmitted by using the two first physical uplink control channel resources, and
each of the signals is generated from the information of ACK/NACK.

3. The mobile station apparatus according to claim 1, wherein
the one second physical uplink control channel resource is explicitly indicated, and
the two first physical uplink control channel resources are given by an index of a first control channel element used to construct the physical downlink control channel.

4. A communication system comprising:
a plurality of mobile station apparatus; and
a base station apparatus configured to and/or programmed to communicate with the plurality of mobile station apparatus by using a plurality of downlink component carriers, the plurality of downlink component carriers including a first downlink component carrier and a second downlink component carrier, wherein
the base station apparatus comprises:
a first transmitter configured to and/or programmed to transmit signals to the mobile station apparatus; and
a receiver configured to and/or programmed to receive a signal from the mobile station apparatus,
the mobile station apparatus comprises:
a second transmitter configured to and/or programmed to transmit, to the base station apparatus, information of ACK/NACK for a physical downlink shared channel transmission indicated by a detection of a physical downlink control channel, the information of ACK/NACK being transmitted using one of a first physical uplink control channel format and a second physical uplink control channel format, wherein
in a case that there is the physical downlink shared channel transmission only on the first downlink component carrier, the first physical uplink control channel format is used for the transmission of the information of ACK/NACK,
in a case that there is the physical downlink shared channel transmission on the second downlink component carrier, the second physical uplink control channel format is used for the transmission of the information of ACK/NACK, and
the second transmitter is configured to and/or programmed to use one of at least a first method and a second method to transmit the information of ACK/NACK, the first method being a method of using two first physical uplink control channel resources for two antenna ports with the first physical uplink control channel format, and the second method being a method of using one second physical uplink control channel resource for one antenna port with the second physical uplink control channel format.

5. A communication method of a mobile station apparatus configured to and/or programmed to communicate with a base station apparatus by using a plurality of downlink component carriers, the plurality of downlink component carriers including a first downlink component carrier and a second downlink component carrier, the communication method comprising:

transmitting, to the base station apparatus, information of ACK/NACK for a physical downlink shared channel transmission indicated by a detection of a physical downlink control channel, the information of ACK/NACK being transmitted using one of a first physical uplink control channel format and a second physical uplink control channel format, wherein in a case that there is the physical downlink shared channel transmission only on the first downlink component carrier, the first physical uplink control channel format is used for the transmission of the information of ACK/NACK, in a case that there is the physical downlink shared channel transmission on the second downlink component carrier, the second physical uplink control channel format is used for the transmission of the information of ACK/NACK; and one of at least a first method and a second method is used for transmitting the information of ACK/NACK, the first method being a method of using two first physical uplink control channel resources for two antenna ports with the first physical uplink control channel format, and the second method being a method of using one second physical uplink control channel resource for one antenna port with the second physical uplink control channel format.

6. An integrated circuit to be mounted on a mobile station apparatus configured to and/or programmed to communicate with a base station apparatus by using a plurality of downlink component carriers, the plurality of downlink component carriers including a first downlink component carrier and a second downlink component carrier, the integrated allowing the mobile station apparatus to execute:

a function of transmitting, to the base station apparatus, information of ACK/NACK for a physical downlink shared channel transmission indicated by a detection of a physical downlink control channel, the information of ACK/NACK being transmitted using one of a first physical uplink control channel format and a second physical uplink control channel format, wherein in a case that there is the physical downlink shared channel transmission only on the first downlink component carrier, the first physical uplink control channel format is used for the transmission of the information of ACK/NACK, in a case that there is the physical downlink shared channel transmission on the second downlink component carrier, the second physical uplink control channel format is used for the transmission of the information of ACK/NACK; and one of at least a first method and a second method is used for transmitting the information of ACK/NACK, the first method being a method of using two first physical uplink control channel resources for two antenna ports with the first physical uplink control channel format, and the second method being a method of using one second physical uplink control channel resource for one antenna port with the second physical uplink control channel format.

\* \* \* \* \*